US007430535B2

(12) United States Patent
Dougherty et al.

(10) Patent No.: US 7,430,535 B2
(45) Date of Patent: Sep. 30, 2008

(54) METHODS AND SYSTEMS FOR IDENTIFYING PROSPECTIVE CUSTOMERS AND MANAGING DEALS

(75) Inventors: Karen Ann Dougherty, Pound Ridge, NY (US); AnneMarie Jonason, Trumbull, CT (US); Kevin Michael McCarthy, Shelton, CT (US); Jannic Georges Cheyns, Antwerp (BE)

(73) Assignee: General Electric Capital Corporation, Stamford, CT (US)

( * ) Notice: Subject to any disclaimer, the term of this patent is extended or adjusted under 35 U.S.C. 154(b) by 549 days.

(21) Appl. No.: 10/125,034

(22) Filed: Apr. 18, 2002

(65) Prior Publication Data
US 2002/0169650 A1 Nov. 14, 2002

Related U.S. Application Data

(63) Continuation-in-part of application No. 10/123,095, filed on Apr. 12, 2002, now abandoned, which is a continuation-in-part of application No. 09/771,358, filed on Jan. 27, 2001.

(51) Int. Cl.
G06Q 40/00 (2006.01)
G06F 17/30 (2006.01)
G06F 15/173 (2006.01)
(52) U.S. Cl. .............................. 705/38; 705/10; 709/224
(58) Field of Classification Search ................... 705/50, 705/10, 38; 709/224
See application file for complete search history.

(56) References Cited
U.S. PATENT DOCUMENTS 5,627,973 A    5/1997    Armstrong et al.
6,055,519 A    4/2000    Kennedy et al.
6,061,789 A    5/2000    Hauser et al.
6,073,839 A    6/2000    Mori et al.
6,119,149 A    9/2000    Notani
6,157,915 A    12/2000   Bhaskaran et al.
6,341,291 B1   1/2002    Bentley et al.
6,560,620 B1*  5/2003    Ching ........................ 715/511
6,901,384 B2*  5/2005    Lynch et al. .................. 705/38
6,920,495 B1*  7/2005    Fuselier et al. .............. 709/224
2001/0027463 A1 10/2001  Kobayashi
2001/0047276 A1 11/2001  Eisenhart
2002/0010741 A1 1/2002   Stewart et al.
2002/0023176 A1 2/2002   Kwicinski
2002/0040352 A1 4/2002   McCormick (Continued)

OTHER PUBLICATIONS http://www.webreprints.djreprints.com; Ellen Byron, "IntralLinks Puts Distant Parties on Same Page" *The Wall Street Journal*; Jan. 17, 2002 Copyright 2002 Dow Jones & Company, Inc., 3 pages.

(Continued)

*Primary Examiner*—Andrew J. Fischer
*Assistant Examiner*—Charles C Agwumezie
(74) *Attorney, Agent, or Firm*—Armstrong Teasdale LLP

(57) ABSTRACT

A system including at least one computer configured as a server that contains a database of deal information, business rules, libraries and templates for deals for at least one business entity is provided. The system further includes at least one client system connected to the server through a network. The server is configured to prompt a user to create a deal, including identifying deal team members, notify members of the deal team of tasks to perform and milestones accomplished, receive documents relating to a deal from a client system that are submitted for approval by a user, and provide access to the deal documents through a client system for review and approval.

27 Claims, 127 Drawing Sheets

U.S. PATENT DOCUMENTS

2002/0042755 A1    4/2002    Kumar et al.
2002/0042757 A1    4/2002    Albazz et al.
2002/0059095 A1*   5/2002    Cook .......................... 705/10

OTHER PUBLICATIONS http://www.wallstreetandtech.com;Jim Middlemiss; "It Challenge" *Wall Street & Technology* Dec. 10, 2001; 3 pages.

eroom.com.DWP/index.asp; "V60 Your Digital Workplace" eRoom Technology, Inc., 5 pages.

http://www.eroom.com/news and press/media releasr_V6_launch.asp; V60 Your Digital Workplace; 3 pages.

http://www.eroom.com/whitepapers/when%20to20Use%20%eRoom%20Real%20Time%20services%20whitepaper.pdf; "When to Use eRoom Real Time Services:" pp. 1-6.

http://www.eroom.com; "eRoom 5 Security"; Copyright 2001-2002 eRoom Technology, Inc. 10 pages.

http://www.eroom.com/whitepapers/V6D_0205.pdf; eRoom Digital Workplace Version 6; 14 pages.

http://www.eroom.com/whitepapers/eRoom_DigWrk_V12.pdf; 8 pages.

http://www.dealbench.com/content/outside_about.html; About DealBench; Copyright 2001 DealBench; 3 pages.

http://www.matrixone.com/about/company_information.html; "Changing the Way the World Brings Products to Market"; 10 pages.

http://www.opentext.com/livelink/;"About Livelink"; Copyright 2002 Open Text Corporation; 13 pages.

http://www.intraspect.com/; product information; Copyright 2002 Intraspect Software, Inc.; 12 pages.

HTTP://www.info@doculabs.com; John Balla, Lisa Matway, and Linda Andrews; "Doculabs White Paper"; Copyright 1999 Doculabs; 28 pages.

http://www.eroom.net/eRoomNet/projectu/papers/projectcollaboration.pdf; David Weinberger; "Project collaboration: How we've wanted to work together all along"; Copyright Instinctive Technology, Inc. 1999; 16 pages.

* cited by examiner

| | |
|---|---|
| Deal Dashboard | Business Profile |
| > Deals | Business Profile Information: |
|   Resource Center | |
| > Search | |
| > Templates | |
| > Meetings | |
| > Admin | |
|   Help | |

| | |
|---|---|
| *Business Name: | SFG |
| *Go To Market Name: | Capital |
| *Left Header Graphic: | menuLogo.gif    [ATTACH] |
| *Right Header Graphic: | formatHeader.jpg    [ATTACH] |
| *Address 1: | Address 1 |
| Address 2: | |
| *City/Town: | City |
| *State/Province: | State |
| *Country: | Country |
| *Zip/Postal Code: | 12345 |
| *Phone Number: | 111-111-1111 Note 1 |
| Fax Number: | Note 1 |
| *Voice of Customer Inbox: | voc@capital.com |

Note 1: Phone number example: 1-(555)554-4575 or 01-44(0)535 545 7506
*Required

System Functionality:

| Feature/Function | Description |
|---|---|
| ☑ Deal Groups | This checkbox enables permissioned Users to assign companies to one of three predefined groups, Group, Customer Group, or Other Group. These groups, in turn, can be permissioned on Dealroom content. |
| ☐ Personalized Portal | This checkbox enables Personal Portal functionality within the Dealroom. Note: Once you check this checkbox and save the change, it cannot be undone. |

| ☑ Meeting Scheduler/Meeting Minutes | This checkbox enables permissioned Users to utilize the Meeting Scheduler/ Meeting Minutes functionality within the Dealroom. |
|---|---|
| ☑ Document Approval | This checkbox enables permissioned Users to utilize the Document Approval functionality within the Dealroom. |

Ownership/Sharing Level:
Deals and Companies in the e-Deal Room are owned/shared at the [Business ▼] level. Note 2

Note 2. Changes to Deal Visibility settings will affect all deals created from this point forward. Permissions are not changed retroactively on existing deals.

Deal Visibility: Note 3

| Authority Level | Deals | |
|---|---|---|
| | View | Modify |
| All users within the business | ☑ | ☐ |
| SFG managers only | ☑ | ☑ |
| SFG admin only | ☑ | ☑ |

Note 3: Permissions selected will apply to Deals within SFG and any division below SFG.

[ DONE ]  [ CANCEL ]
[ APPLICATION PERMISSIONS ]   [ BUSINESS HIERARCHY ]

[ LOGOUT ]
Kevin Approver

FIG. 5B

BUSINESS UNIT HIERARCHY

| SFG | DIVISION/SUB DIVISION | GO TO MARKET NAME |
|---|---|---|
| ENERGY | (CREATE SUB DIVISION) | ENERGY |
| COAL | | COAL |
| GAS | | NATURAL GAS |
| PIPELINE | | PIPELINE |
| TELECOM | (CREATE SUB DIVISION) | TELE-COMMUNICATIONS |
| CABLE | | CABLE |
| CELLULAR | | CELLULAR & WIRELESS |

(CREATE DIVISION)

[DONE] [CANCEL]

Create Division Profile — 230

Business Profile Information:

| | |
|---|---|
| *Division Name: | |
| *Go To Market Name: | |
| *Left Header Graphic: | menuLogo.gif  [ATTACH] |
| *Right Header Graphic: | formatHeader.jpg  [ATTACH] |
| *Address 1: | |
| Address 2: | |
| *City/Town: | |
| *State/Province: | |
| *Country: | |
| *Zip/Postal Code: | |
| *Phone Number: | ☐ Note 1 |
| Fax Number: | |

Note 1: Phone number example: 1-(555)554-4575 or 01-44(0)535 545 7506
*Required

Data Management:

Profile Fields
Define the database fields used to create the Deal Profile page.

Profile Layout
Design Deal Profile layouts by Deal Type.

Data Sources
Configure the available options for form elements in the Dealroom.

Deal Visibility:

| Authority Level | Deals | |
|---|---|---|
| | View | Modify |
| All users within the division Note 2 | ☐ | ☐ |
| Division managers only | ☐ | ☐ |
| Division admin only | ☐ | ☐ |

Note 2: Permissions selected will apply to Deals within the division and any subdivision below it.

[DONE]  [CANCEL]                    [APPLICATION PERMISSIONS]

FIG. 8

Create Subdivision Profile

Business Profile Information:

| | |
|---|---|
| Division Name: | Marross Brothers Division |
| *Subdivision Name: | |
| *Go To Market Name: | |
| *Left Header Graphic: | menuLogo.gif [ATTACH] |
| *Right Header Graphic: | formatHeader.jpg [ATTACH] |
| *Address 1: | |
| Address 2: | |
| *City/Town: | |
| *State/Province: | |
| *Country: | |
| *Zip/Postal Code: | |
| *Phone Number: | [   ] Note 1 |
| Fax Number: | |

Note 1: Phone number example: 1-(555)554-4575 or 01-44(0)535 545 7506
*Required

Data Management:

Profile Fields
    Define the database fields used to create the Deal Profile page.

Profile Layout
    Design Deal Profile layouts by Deal Type.

Data Sources
    Configure the available options for form elements in the Dealroom.

Deal Visibility:

| Authority Level | Deals | |
|---|---|---|
| | View | Modify |
| All users within the subdivision | ☐ | ☐ |
| Subdivision managers only | ☐ | ☐ |
| Subdivision admin only | ☐ | ☐ |

[DONE] [CANCEL]      [APPLICATION PERMISSIONS]

| LIBRARY TEMPLATES | | | | |
|---|---|---|---|---|
| | | | DIVISIONS TO VIEW: | SELECT VIEW ▼ |
| DIVISION: DIVISION 1 | | | | |
| TEMPLATE | DEFAULT | LAST MODIFIED BY | LAST MODIFIED | REMOVE |
| NEW TEMPLATE FOR DIVISION 1 | | TRENT | 01/01/2000 | |
| TEMPLATE 1 | ✓ | TRENT | 01/01/2000 | ☐ |
| TEMPLATE2 | | TRENT | 01/01/2000 | ☐ |
| DIVISION: DIVISION 2 | | | | |
| TEMPLATE | DEFAULT | LAST MODIFIED BY | LAST MODIFIED | REMOVE |
| TEMPLATE 1 | | JOHN | 01/01/2000 | ☐ |
| TEMPLATE2 | ✓ | TOM | 01/01/2000 | ☐ |
| DIVISION: DIVISION 3 | | | | |
| TEMPLATE | DEFAULT | LAST MODIFIED BY | LAST MODIFIED | REMOVE |
| TEMPLATE 1 | ✓ | JOHN | 01/01/2000 | ☐ |
| TEMPLATE2 | | JILL | 01/01/2000 | ☐ |

[CREATE TEMPLATE]   [REMOVE]

CREATE/MODIFY
LIBRARY TEMPLATE

TEMPLATE NAME: [        ]          DESCRIPTION:
DIVISION: [SELECT DIVISION ▼]     [          ]
          ☐ DEFAULT TEMPLATE FOR DIVISION

◉ NAME OF TEMPLATE ROOT FOLDER
○ FOLDER 1
  ○ FOLDER 2
  ○ FOLDER 3
    ○ FOLDER 4

[CREATE FOLDER]  [REMOVE]  [DONE]

FIG. 10

CREATE/MODIFY LIBRARY TEMPLATE FOLDER

SUMMARY INFORMATION:

PARENT FOLDER: ROOT FOLDER [SELECT]

FOLDER NAME:

DESCRIPTION:

☐ INHERITED FOLDER (NOTE: FILES PLACED INTO THIS FOLDER WILL AUTOMATICALLY INHERIT THE PERMISSIONS OF THIS FOLDER)

☐ GE FOLDER (NOTE: THE SPONSORING GE BUSINESS USERS WILL BE AUTOMATICALLY PERMISSIONED ON THIS FOLDER)

DEFAULT PERMISSION INFORMATION

| GROUP | PERMISSIONS |
|---|---|
| GE GROUP | SELECT PERMISSION |
| CUSTOMER GROUP | SELECT PERMISSION |
| OTHER | SELECT PERMISSION |

[DONE] [CANCEL]

| Master Template List | | | | | ❓ Divisions to view: | All Divisions |
|---|---|---|---|---|---|---|
| Business Master Templates | | | | | | |
| Template | Final | Active | Last Modified By | Last Modified | Copy | Remove |
| Business Master A | ✓ | ✓ | SFG1Last,SFGAdminFirst | 29-Oct-2001 | 📋 | |
| Division: Energy | | | | | | |
| Template | Final | Active | Last Modified By | Last Modified | Copy | Remove |
| Oil & Gas Template 🔘 | ✓ | ✓ | SFG1Last,SFGAdminFirst | 29-Oct-2001 | 📋 | |
| Division: Concept Clarity | | | | | | |
| Template | Final | Active | Last Modified By | Last Modified | Copy | Remove |
| Template with Association | ✓ | ✓ | SFG1Last,SFGAdminFirst | 13-Nov-2001 | 📋 | |
| Division: Structured Finance (SF) | | | | | | |
| There are no templates for this division | | | | | | |
| Division: Telecom | | | | | | |
| Template | Final | Active | Last Modified By | Last Modified | Copy | Remove |
| Fake Telecom 🔘 | ✓ | | SFG1Last,SFGAdminFirst | 29-Oct-2001 | 📋 | |
| Division: Testing/Training | | | | | | |
| Template | Final | Active | Last Modified By | Last Modified | Copy | Remove |
| Business Development - Sample Test | | ✓ | User88, User88 | 14-Aug-2001 | 📋 | |
| Legal Matters Mgmt. Demo Template 🔘 | ✓ | ✓ | SFG1Last,SFGAdminFirst | 29-Oct-2001 | 📋 | ☐ |

| CREATE BUSINESS TEMPLATE | CREATE DIVISION TEMPLATE | | | | REMOVE |

| Deal Summary | | | | | RETURN TO SEARCH RESULTS | ? | FEEDBACK | PRINT |

380 →

ABC Deal

| Summary | Deal Team | Tasks/Timeline | Alerts | Discussions | Library | Profile | Finance | Doc Approval |

| Company Name | ABC Company | Date Created 5-Dec-2001 |
|---|---|---|
| Primary Contact | SFG1Last, SFGAdminFirst | 123-123-1311 |
| Client Primary Contact | A, A | 123-123-1311 |

Timeline Summary [GO]

| Milestone Name | Current Status | Customer Request Date | Current Due Date | Actual Completion Date |
|---|---|---|---|---|
| Reporting Milestone | Not Started | — | — | — |

Meeting Summary

| Meeting Type | There are currently no meetings associated with this deal. |
|---|---|
| Meeting Data | |

Deal Activity                              SHOW SINCE  [My last login ▸]

Documents [GO]

| X | Date | Title |
|---|---|---|
| | No new Document notifications | |

Alerts [GO]

| X | Date | Title |
|---|---|---|
| | No new Alerts | |

Tasks [GO]

| X | Date | Title |
|---|---|---|
| | No new Task notifications | |

Discussions [GO]

| X | Date | Title |
|---|---|---|
| | No new Discussion notifications | |

FIG. 15

Deal List | ? FEEDBACK

Records (1-7 of 7)     Division/Subdivision to Filter on: Energy/Oil & Gas ▼

| Deal Name | Primary Company ▲ | Date Created | Deal Size Note 1 | Division/ Subdivision | GE Primary Contact | Last Milestone | Deal Status |
|---|---|---|---|---|---|---|---|
| Belden | Belden | 13-Aug-2001 | 90.00 | Energy/Oil & Gas | Paul | --- | Active |
| Block | Block | 16-Aug-2001 | 5.00 | Energy/Oil & Gas | Paul | Qualified Lead | Active |
| Journey | Journey | 13-Aug-2001 | 67.87 | Energy/Oil & Gas | John | Qualified Lead | Active |
| Journey Hunt | Journey | 13-Aug-2001 | 38.70 | Energy/Oil & Gas | John | Qualified Lead | Inactive |
| Lamamco Producing! | Lamamco | 31-Aug-2001 | 27.08 | Energy/Oil & Gas | John | --- | Closed/Manage |
| Merchant Resources | Randall & Dewey | 13-Aug-2001 | 65.00 | Energy/Oil & Gas | John | Qualified Lead | Inactive |
| TransRepublic1 | Trans Republic | 10-Sep-2001 | 45.00 | Energy/Oil & Gas | User81, User81 | Qualified Lead | Active |

Note 1 Amounts are in millions of US Dollars ($1,000,000 = 1.00)

Result Page: 1     To search for documents within these deals click here

SELECT COMPANY

SELECT THE FIRST LETTER: A B C D E F G H I J K L M N O P Q R S T U V W X Y Z
OR
SEARCH: BEGINS WITH: ⊙
 CONTAINS: ○

COMPANY NAME: LOADSURE
EAGLE FINANCIAL
XYZ DATA SYSTEMS

[SEARCH]
[NEW COMPANY]

[CANCEL] [CONTINUE]

FIG. 18

COMPANY RELATIONSHIPS

PERMISSIONS FOR:  ENTERPRISES

ADD TO DEAL GROUPS:
○ GE TEAM  ○ CUSTOMER TEAM  ○ OTHER  ⊙ NONE

SELECT THE COMPANIES ENTERPRISES CAN VIEW ON THE DEAL:
NOTE: THIS COMPANY MAY ONLY VIEW GE AND THE COMPANIES CHECKED BELOW.
RELATIONSHIPS ARE TWO-WAY.

LOADSURE ☐

[BACK]  [DONE]

FIG. 19

| My Profile | |
|---|---|
| *First Name: | CEFAdminFirst |
| *Last Name: | CEF1Last |
| *Job Title: | Administrator |
| *User Role: | Select a role... |
| Employing Company: | CEF Corporate |
| User Type: | Administrator |
| *Business Phone: | 123-123-1311 | Note 1 |
| Extension: | |
| Mobile Phone: | | Note 1 |
| Fax: | | Note 1 |
| *Email Address: | peter.t@.com |
| *Address 1: | (Street Address) |
| Address 2: | |
| Address 3: | |
| City/Town: | Boston |
| State/Province: | MA |
| Country: | USA |
| Zip/Postal Code: | 897654 |
| *Personal Access Code: | CEF1111 |
| Time Zone: | EST |

Note 1: Phone number example: 1-(555)554-4575 or 01-44(0)535 545 7506
*Required

[DONE] [CANCEL]   [MODIFY REGISTRATION] [MY NOTIFICATION PREFERENCES]

| User Profile | |
|---|---|
| *First Name: | Laurie |
| *Last Name: | Maho |
| *Job Title: | user |
| Employing Company: | British |
| *Business Phone: | 432-234 | Note 1 |
| Extension: | |
| Mobile Phone: | | Note 1 |
| Fax: | | Note 1 |
| *Email Address: | stephen@.com |
| *Address 1: | 1242 Main Street |
| Address 2: | |
| Address 3: | |
| City/Town: | London |
| State/Province: | |
| Country: | UK |
| Zip/Postal Code: | |
| *Personal Access Code: | 3UZL |
| Time Zone: | GMT |
| Disable Login: | ☑ Disable User  ⊙ Temporarily  ○ Permanently |

Note 1: Phone number example: 1-(555)554-4575 or 01-44(0)535 545 7506
*Required

[DONE] [CANCEL]

| User Profile | |
|---|---|
| User10, User10 | |
| Job Title: | A |
| User Role: | BD Leader |
| Business Phone: | 123-123-1311 |
| Extension: | |
| Mobile Phone: | |
| Fax: | |
| Email Address: | peter.t@.com |
| Employing Company: | ABC Company |
| Address 1: | 123 ABC |
| Address 2: | |
| City/Town: | Tucson |
| State/Province: | |
| Zip/Postal Code: | |
| Country: | USA |
| To modify, go to "User Profile" under Admin on left Navigation Bar | |
| CLOSE | |

COMPANY PROFILE
COMPANY NAME:
COMPANY TYPE: [CSS ▽]
ADDRESS 1:
ADDRESS 2:
CITY/TOWN:
STATE/PROVINCE:
COUNTRY:
ZIP/POSTAL CODE:
PHONE NUMBER:

FAX NUMBER:
WEB URL:
LOGIC:  UNKNOWN           [ATTACH]  [CLEAR]

[DONE] [CANCEL]

COMPANY PROFILE

G.K. ENTERPRISES

ADDRESS 1:        ADDRESS 1
ADDRESS 2:        ADDRESS 2
CITY/TOWN:        CITY/TOWN
STATE/PROVINCE:   STATE
COUNTRY:          COUNTRY
ZIP/POSTAL CODE   9999
PHONE NUMBER:     444-555-9999
FAX NUMBER:       444-555-9999
WEB URL:          WWW.GKENTERPRISES.COM

[DONE]

FIG. 26

Create Milestone

*Milestone:

Description:

Note: This text area does not support more than 255 characters.

Reporting Code:

*Required

DONE  CANCEL

CREATE/MODIFY
MILESTONE

MILESTONE:
HIDE FROM EXTERNAL PARTIES: ☐
STATUS: SELECT STATUS ▼
DESCRIPTION:

| CUSTOMER REQUEST DATE | DUE DATE | | ACTUAL COMPLETION DATE |
|---|---|---|---|
| | ORIGINAL | CURRENT | |
| ☐ | ☐ | ☐ | ☐ |

DONE  CANCEL

| Modify Task | |
|---|---|
| *Milestone: | Milestone 1 |
| *Task: | Task 1 |
| Description: | |
| Settings: | ☐ Company Only  ☐ Not Applicable |
| Owner: | Select an Owner |
| *Status: | Not Started |

*Required

Due Date

| Original | Current |
|---|---|
| –/–/– | –/–/– |

Select from...  ASSOCIATE

Associations:

adf

REMOVE

Modify Subtask

| | |
|---|---|
| *Milestone: | Milestone 1 |
| *Task: | Task 1 |
| *Subtask: | External Subtask |
| Description: | Note: This text area does not support more than 255 characters.<br>External Subtask |
| Settings: | ☐ Company Only<br>☐ Not Applicable |
| Owner: | User47, User47 |
| *Status: | In Progress |

*Required

| Due Date | | Actual Completion Date |
|---|---|---|
| Original | Current | |
| 24-Dec-2001 | 24-Dec-2001 | -/-/- |

Add Associations: Select from... ASSOCIATE

Associations:
☐ mqmapgend

[REMOVE]

[DONE] [CANCEL]

TASK ASSIGNMENT

LOADSURE DEAL 2 - LOADSURE

| SUMMARY | DEAL TEAM | TASKS/TIMELINE | DISCUSSIONS | ALERTS | LIBRARY | PROFILE |

EXPAND ALL | COLLAPSE ALL

| | CUSTOMER REQUEST DATE | CURRENT DUE DATE | OWNER | HIDE FROM EXTERNAL PARTIES | OMIT FROM PROFILE |
|---|---|---|---|---|---|
| MILESTONE NAME 1 | ☐ | | | | |
| TASK NAME 1 | | ☐ | ▷ | ☐ | ☐ |
| TASK NAME 2 | | ☐ | ▷ | ☐ | ☐ |
| SUB-TASK NAME 1 | ☐ | ☐ | ▷ | ☐ | ☐ |
| SUB-TASK NAME 2 | | ☐ | ▷ | ☐ | ☐ |
| MILESTONE NAME 1 | ☐ | ☐ | | | |
| TASK NAME 1 | | ☐ | ▷ | ☐ | ☐ |
| SUB-TASK NAME 1 | | ☐ | ▷ | ☐ | ☐ |
| MILESTONE NAME 2 | | ☐ | | | |
| TASK NAME 1 | | ☐ | ▷ | ☐ | ☐ |
| SUB-TASK NAME 1 | | ☐ | ▷ | ☐ | ☐ |

DONE    CANCEL

TASK NOTIFICATION

SEND TASK NOTIFICATIONS THROUGH EMAIL
○ YES  ● NO
SETTINGS FOR TASKS THAT I ASSIGN TO OTHERS:
☑ NOTIFY ME WHEN TASK IS OVERDUE
☐ NOTIFY ME WHEN TASK IS REASSIGNED
☐ NOTIFY ME WHEN DUE DATE IS CHANGED
☐ NOTIFY ME WHEN A TASK IS COMPLETE
SETTINGS FOR TASKS THAT I AM ASSIGNED
○   ☐ SEND TASK REMINDERS ON TASKS THAT I AM ASSIGNED
    ☐ SEND FIRST NOTICE [1 ☑] DAY(S) BEFORE A TASK IS DUE
    ☐ SEND FOLLOW-UP REMINDERS [EVERY DAY ☑] UNTIL THE TASK IS COMPLETE
●   DO NOT SEND TASK REMINDERS ON TASKS THAT I AM ASSIGNED

SEND ALERT NOTIFICATION THROUGH EMAIL
○ YES  ● NO

[SAVE] [CLOSE]

FIG. 33

Task Timeline
Gas Deal 1

| Summary | Deal Team | Tasks/Timeline | Alerts | Discussions | Library | Profile | Doc Approval |

To insert a new Task or Subtask, select a radio button and click on the appropriate insert button. The new record will be inserted beneath the radio button selected.

| INSERT TASK | | EXPAND ALL | COLLAPSE ALL | | Filter: | View All Tasks | | |
|---|---|---|---|---|---|---|---|---|
| INSERT SUBTASK | | | | | | | | |
| ASSIGN TASKS | Owner | Customer Request Date | Current Due Date | Actual Completion Date | Status | Co Only | N/A | Remove |
| ○ Milestone 1 | | | -/-/- | 21-Aug-2001 | Complete | | | |
| ○ Task 1 | User21, User21 | | 20-Aug-2001 | -/-/- | Not Started | | | |
| ○ Milestone 2 | | | 23-Aug-2001 | -/-/- | In Progress | | | |
| ○ Task 1 | User62, User62 | | -/-/- | -/-/- | In Progress | | | □ |
| ○ Task 2 | User21, User21 | | 31-Aug-2001 | -/-/- | Not Started | | | □ |
| ○ Task 3 | User22, User22 | | 29-Aug-2001 | -/-/- | In Progress | | | |
| ○ subtask 1 | User21, User21 | | 28-Aug-2001 | -/-/- | In Progress | | | □ |
| ○ subtask 2 | User22, User22 | | 23-Aug-2001 | -/-/- | Deferred | | | □ |
| ○ subtask 3 | User22, User22 | | 30-Aug-2001 | -/-/- | In Progress | √ | | |
| ○ Task 4 | Charles, Prince | | 24-Aug-2001 | -/-/- | Complete | √ | | |
| ○ Milestone 3 | | | 31-Aug-2001 | 2-Aug-2001 | In Progress | √ | | |
| ○ Task 1 | SFG1Last, SFGAdminFirst | | 29-Aug-2001 | -/-/- | Not Started | | | □ |
| ○ subtask 1 | User21, User21 | | 31-Aug-2001 | -/-/- | | | | |

REMOVE

CREATE DISCUSSION

DISCUSSION INFORMATION

SUBJECT:
DETAILS:

DISCUSSION PARTICIPATION INFORMATION

SELECT USERS AND GROUPS

| USER/GROUP | DISCUSSION PARTICIPATION | REMOVE |
|---|---|---|
| | SELECT PARTICIPATION LEVEL ▽ | ☐ |
| | SELECT PARTICIPATION LEVEL ▽ | ☐ |
| | SELECT PARTICIPATION LEVEL ▽ | ☐ |
| | | REMOVE |

ASSOCIATION INFORMATION
ADD ASSOCIATIONS:
SELECT FROM ▽  GO

DONE   CANCEL

| SENT FROM | DATE | REGARDING | COMMENTS |
|---|---|---|---|
| JULIE | 01/20/01 | DEAL STATUS | ENTER TEXT IS DISPLAYED HERE IN THIS COLUMN THIS IS THE TEXT THAT IS GIVEN |
| FRED | 01/20/01 | DEAL STATUS | THIS IS THE TEXT FIELD THAT IS USED TO DISPLAY THE INFORMATION AS IT WAS ENTERED ON THE FORM |
| HILLARY | 01/20/01 | DEAL STATUS | ENTER TEXT IS DISPLAYED HERE |

FEEDBACK
VOC RECEIVED

[CLOSE]

FIG. 39

CREATE/MODIFY CATEGORY

SUMMARY INFORMATION

PARENT FOLDER: DUE DILLIGENCE [SELECT]
FOLDER NAME: 
DISCRIPTION:

☑ INHERITED FOLDER

PERMISSION INFORMATION

SELECT USERS AND GROUPS

| USER/GROUP | PERMISSIONS | REMOVE |
|---|---|---|
| GE GROUP | VIEW, EDIT PERMISSION ▽ | ☐ |
| CUSTOMER GROUP | VIEW, EDIT ▽ | ☐ |
| OTHER GROUP | VIEW ▽ | ☐ |
| USER 1 | SELECT PERMISSION ▽ | ☐ |
| USER 2 | SELECT PERMISSION ▽ | ☐ |
| USER 3 | SELECT PERMISSION ▽ | [REMOVE] |

[DONE] [CANCEL]

FIG. 41

INDEX CARD

STEP 1: ENTER FILE NAME AND DESCRIPTION

FILE NAME: _____  SUBSCRIBED: ☐

DESCRIPTION: _____

STEP 2: SELECT FILE FROM LOCAL SYSTEM OR ENTER A URL

○ FILE PATH: _____ BROWSE
○ URL FULL URL: _____

STEP 3: SELECT A TARGET FOLDER FOR THE FILE

TARGET FOLDER FOR FILE: SELECT
DUE DILIGENCE

STEP 4: ADD ASSOCIATIONS TO THE FILE

SELECT FROM ▽   SELECT

REMOVE

STEP 5: PERMISSION USERS AND GROUPS ON THE FILE

SELECT USERS AND GROUPS

| USER/GROUP | PERMISSIONS | NOTIFY | REMOVE |
|---|---|---|---|
| USER 1 | VIEW ▽ | ☑ | ☐ |
| USER 2 | VIEW ▽ | ☑ | ☐ |
| GROUP 3 | VIEW, EDIT ▽ | ☑ | ☐ |

INDEX CARD — 940

SUMMARY INFORMATION:
FILE NAME: LEGAL.DOC   SUBSCRIBED: ☐
DESCRIPTION: THESE ARE THE LEGAL RAMIFICATIONS OF THE DEAL

STATUS: CHECKED-IN
VERSION INFORMATION:
| LAST MODIFIED | MODIFIED BY | COMMENTS | REMOVE
☐
☐
☐

CHECK OUT    LOCKDOWN DOCUMENT

TARGET FOLDER INFORMATION:
TARGET FOLDER FOR FILE: SELECT
DUE DILIGENCE

ASSOCIATION INFORMATION:
SELECT FROM ▽   SELECT
☐ BUSINESSPLAN.DOC       REMOVE
REMOVE

PERMISSION INFORMATION:
SELECT USERS AND GROUPS

USER/GROUP    PERMISSIONS    NOTIFY    REMOVE

FIG. 44

| VIEW PROFILE | | | | | | |
|---|---|---|---|---|---|---|
| SUMMARY | WORK GROUP | TASKS/TIMELINE | DISCUSSIONS | LIBRARY | PROFILE | |

PROFILE:

| | | | |
|---|---|---|---|
| DEAL STATUS | SELECT DEAL STATUS ▽ | DESCRIPTION: | ☐ CONFIDENTIAL DEAL |
| DEAL TYPE | SELECT DEAL TYPE ▽ | VENTURE COMPLETE DEAL ID | |
| TOTAL DEAL SIZE/ROUND | 0.0 (IN US$MM) | DIVISION | SELECT DIVISION ▽ |
| COMPANY DESCRIPTION | ◁▷ | SUB-DIVISION | SELECT SUB-DIVISION ▽ |
| | | VOC SUMMARY | |
| SAVE | | CANCEL | |

FIG. 45

SEARCH PREFERENCES

| | | |
|---|---|---|
| DEAL ID: | | |
| DEAL NAME: | | SEARCH OPTIONS<br>○ BEGINS WITH ○ INCLUDES |
| COMPANY NAME: | | SEARCH OPTIONS<br>○ BEGINS WITH ○ INCLUDES |
| COMPANY ROLE: | SELECT COMPANY ROLE ▽ | |
| DEAL STATUS: | SELECT DEAL STATUS ▽ | FROM ☐ TO ☐ |
| SFG SOURCED: | 0.0 | TOTAL<br>0.0 ☐ |
| DEAL TEAM LEAD: | FIRST NAME | LAST NAME |
| DEAL TEAM MEMBER: | FIRST NAME | LAST NAME |
| COUNTRY/RISK | SELECT COUNTRY/RISK ▽ | |
| DIVISION | SELECT DIVISION ▽ | |
| SUB-DIVISION | SELECT SUB-DIVISION ▽ | |
| PRODUCT | COMMON STOCK<br>EQUITY-CURRENT EARNING<br>EQUITY NOT-CURRENT EARNING<br>LEVERAGED LEASE<br>LIMITED PARTNERSHIP △▽ | ☐ CHECK TO RECEIVE DEALS<br>THAT CONTAIN ALL SELECTED<br>PRODUCTS |

[SEARCH] [RESET]

FIG. 46

SEARCH RESULTS
RECORDS (1-15 OF 427)
SEARCH CRITERIA: DEAL STATUS = ACTIVE, COMPANY NAME = "LO"
MODIFY SEARCH CRITERIA

| DEAL ID | DEAL NAME | COMPANY NAME | COMPANY ROLE | DATE CREATED | STATUS | DIVISION | SUB-DIVISION | GE PRIMARY CONTACT |
|---|---|---|---|---|---|---|---|---|
| 1111 | LOADSURE | PRODUCTS | | | | | | |
| 1233 | LONG1 | PRODUCTS | | | | | | |
| 1236 | LOEWCO1 | PRODUCTS | | | | | | |
| 1334 | LORDCO1 | PRODUCTS | | | | | | |
| 2334 | LOSTSYSTEMS1 | PRODUCTS | | | | | | |
| 2458 | LOB1 | PRODUCTS | | | | | | |
| 2587 | LONDON1 | PRODUCTS | | | | | | |
| 3455 | LOVLAND1 | PRODUCTS | | | | | | |

| DEAL ID | DEAL NAME | COMPANY NAME | COMPANY ROLE | DATE CREATED | STATUS | DIVISION | SUB-DIVISION | GE PRIMARY CONTACT |

NEXT>>

MODIFY SEARCH CRITERIA

NEXT>>

| GE HOME | CEF HOME | HELP |

SYSTEM ADMINISTRATOR  INVITE/EDIT CUSTOMER
BRIEFING PAGE

▷ CATALOG
▷ ALERTS
▷ DISCUSSIONS
▷ /ASKS
▷ INDUSTRY TEMPLATE
▽ CUSTOMERS
  MY CUSTOMERS
  INVITE CUSTOMERS
▷ MY GE SERVICES
▷ NEWS
▷ ADMIN
  LOGOUT

CUSTOMER INFORMATION

COMPANY: [SELECT COMPANY ▽]  _____  [ADD]
PROSPECT:
LOCATION: (CITY)
           (STATE)
USERNAME: (FIRST NAME)
           (LAST NAME)
TELEPHONE: ###-###-####
EMAIL:

INDUSTRY TEMPLATES

[SELECT INDUSTRY NAME ▽] [PERSONALIZE]

UPLOAD CUSTOM ATTACHMENTS:
FROM CATALOG: [ADD]
FROM DRIVE: [ADD]

NEW PORTAL USER POP-UP MESSAGE

☑ USE DEFAULT MESSAGE
SUBJECT:

DETAILS:

FIG. 49

| GE HOME | CEF HOME |
|---|---|
| SYSTEM ADMINISTRATOR | |
| BRIEFING PAGE | |
| ▷ CATALOG | |
| ▷ ALERTS | |
| ▷ DISCUSSIONS | |
| ▷ TASKS | |
| ▷ INDUSTRY TEMPLATE | |
| ▽ CUSTOMERS | |
|   MY CUSTOMERS | |
|   INVITE CUSTOMERS | |
| ▷ MY GE SERVICES | |
| ▷ NEWS | |
| ▷ ADMIN | |
| LOGOUT | |

NEW PORTAL USER POP-UP MESSAGE
☑ USE DEFAULT MESSAGE
SUBJECT:
DETAILS:

STATUS INDICATOR
SELECT STATUS ▽

SALES REPRESENTATIVE SELECTOR
SYSTEM ADMINISTRATOR   ASSIGN

PORTAL INFORMATION
IRL:  WWW.MYGEOFFICE.COM
USERNAME:
PWD:

DONE   CANCEL

| | | | | | |
|---|---|---|---|---|---|
| Document Approval Summary | | | | | |
| LoadSure | | | | | |
| Summary | Deal Team | Tasks/Timeline | Alerts | Discussions | Library | Profile | Finance | Doc Approval | | | | | |

ATTACH DOC     EXPAND ALL     COLLAPSE ALL

∨ Final DAM LoadSure 📎

| Requested for Approval | Version # | Type | Document Type | Status | Last Modified Date | Request Date | Remove |
|---|---|---|---|---|---|---|---|
| >a | 4 | 📄 | Credit Request | No Consensus | 27-Sep-2001 12:28:00.0 | 31-Sep-2001 12:24:00.0 | |
| >a | 3 | 📄 | Investment Memo | Revision Required | 19-Sep-2001 12:24:00.0 | 21-Sep-2001 12:24:00.0 | |

∨ Financial Report 📎

| Requested for Approval | Version # | Type | Document Type | Status | Last Modified Date | Request Date | Remove |
|---|---|---|---|---|---|---|---|
| >a | 6 | 📄 | Closing Certificate | No Consensus | 13-Sep-2001 12:24:00.0 | 20-Sep-2001 12:24:00.0 | ☐ |

REMOVE

| Document Approval Detail | | PRINT SCREEN | ? | FEEDBACK |

LoadSure

| Document Name: | 📄 Final DAM LoadSure 🔘 |
| Version #: | 4 |
| Document Type: | Select an Document Type ▼ |
| Requested By: | Requestor, James |
| Requested Date: | 07-Feb-2001 12:24:00.0 |
| Status: | No Consensus |

Approval Decision for | Approver, Kevin ▼ |    Notify me when an approver takes action ☐

○ Approve
○ Revision Required
○ Reject

| COMMIT | RESET |    | CHECK SPELLING |

Approvers    | COLLAPSE ALL | EXPAND ALL |

∨ | Approver, Anne Marie ▼ | Delegate for Approver, Kevin    ☐
No Action Taken
∨ | Johnson, Kevin
Approve | 04-Mar-2001 12:24:00.0 | The comments for this date are displayed here, in Read Only format.
Revision Required | 09-Feb-2001 12:24:00.0 | The comments for this date are displayed here, in Read Only format.

| DONE | CANCEL |    | ADD APPROVERS |    | REMOVE |

Document Approval Detail

File  Edit  View  Favorites  Tools  Help     @Send

Document Approval Detail

LoadSure

| | |
|---|---|
| Document Name: | Final DAM LoadSure |
| Version #: | 4 |
| Document Type: | Credit Request |
| Requested By: | Requestor, James |
| Requested Date: | 07-Feb-2001 12:24:00.0 |
| Status: | No Consensus |

Approvers

| | | | |
|---|---|---|---|
| ✓ Approver, Anne Marie - Delegate for Approver, Kevin | | | |
| No Action Taken | | | |
| ✓ Johnson, Kevin | | | |
| Approve | 04-Mar-2001 12:24:00.0 | The comments for this date are displayed here, in Read Only format. |
| Revision Required | 09-Feb-2001 12:24:00.0 | The comments for this date are displayed here, in Read Only format. |

FIG. 61

Modify Index Card

Summary Information:

| | |
|---|---|
| *Title: | mqmapgend |
| *Description: | Note: This text area does not support more than 255 characters.<br>sfdcgv |
| Status: | Checked in by SFG1Last, SFGAdminFirst on 20-Dec-2001 |
| File: | 📄 mqmapgend.gif *(7 KB)* |

Parent Folder information:

| | |
|---|---|
| *Parent folder: | [SELECT]<br>☐ Primary Company Private Folder |

*Required

Version Information:

| Version # | File | Last Modified | Modified By | Comments |
|---|---|---|---|---|
| 1 | 📄 | 20-Dec-2001 15:33 EST | SFG1Last, SFGAdminFirst | |

What would you like to do? [Select from.... ▼] [GO]

Subscribe to changes to this item: Ⓝ

[VIEW HISTORY]

Association Information:

Click on the associated file's hyperlink to view it OR select a new association to add to the index card.

Add Associations: [Select from...  ▼] [ASSOCIATE]

Associations:

☐ 🗎 asdf
☐ ⚠ Alert with Association
☐ 🗎 External Subtask

[REMOVE]

Permission Information:

[SELECT USERS] [SELECT GROUPS]

Send a system-generated notification of changes to this Index Card to the users/groups below via the "Notify" check box.

| User/Group | Permissions | Notify | Remove |
|---|---|---|---|
| U-SFG1Last, SFGAdminFirst | Full Control ▼ | ☐ | ☐ |
| G-Creative Lawn Ornaments Users | Manage ▼ | ☐ | ☐ |

[REMOVE]

[DONE] [DELETE] [CANCEL]

Meeting Scheduler

Location and Detail:

| Date: | 18-Oct-2001 | | | | | | | | |
|---|---|---|---|---|---|---|---|---|---|
| Meeting Time: | 8:00am | | | < OCTOBER > | | | < 2001 > | | |
| Conference Room: | Board Room | | Sunday | Monday | Tuesday | Wednesday | Thursday | Friday | Saturday |
| Chairperson: | SFGAdmin | | | 1 | 2 | 3 | 4 | 5 | 6 |
| Call in Number/Comments: | 800.222.3333 # 12345 | | 7 | 8 | 9 | (m)16 | 11 | 12 | 13 |
| Final Schedule: | ☐ | | 14 | 15 | (m)16 | 17 | 18 | (m)19 | 20 |
| Available: | ☑ | | 21 | 22 | 23 | 24 | 25 | 26 | 27 |
| | | | 28 | 29 | 30 | 31 | | | |

[ADD MEETING] [DELETE SCHEDULE] [DEFAULT SCHEDULE] [CHANGE SEQUENCE]

Meeting Summary

[EXPAND ALL] [COLLAPSE ALL]

| Time | Deal Name | Meeting Type | Division | Presenter | Documents | Minutes | Remove |
|---|---|---|---|---|---|---|---|
| > 8:00-8:30 | Telco | PIC | Telecom | Dawson | 📄 Final PIC Telco.ppt ✉ | (m) | ☐ |
| | | DAM 24-Aug -2001 | Telecom | Approver, Anne Marie | 📄 Final DAM Telco.ppt ✉ | (m) | |
| > 8:30-9:00 | Exostar | PAM | Telecom | Dawson | 📄 Final PAM Exostar.ppt ✉ | (m) | ☐ |
| | | | | | | | [REMOVE] |

[DONE] [CANCEL] [PRINT SCREEN]

FIG. 70

Document Approval

| File | Edit | View | Favorites | Tools | Help | Send |
|------|------|------|-----------|-------|------|------|

Meeting Scheduler Print View

Location and Detail:

| | |
|---|---|
| Date: | 18-Oct-2001 |
| Meeting Start Time: | 8:00 AM |
| Conference Room: | Board Room |
| Chairperson: | SFGAdmin |
| Call in Number/Comments: | 800.216.1234 # 12345 |
| Final Schedule: | |
| Available: | ✓ |

— 1430

< OCTOBER >  < 2001 >

| Sunday | Monday | Tuesday | Wednesday | Thursday | Friday | Saturday |
|--------|--------|---------|-----------|----------|--------|----------|
|        | 1      | 2       | 3         | 4        | 5      | 6        |
| 7      | 8      | 9       | 10        | 11       | 12     | 13       |
| 14     | 15     | (m)16   | 17        | 18       | (m)19  | 20       |
| 21     | 22     | 23      | 24        | 25       | 26     | 27       |
| 28     | 29     | 30      | 31        |          |        |          |

Meeting Summary

| Time | Deal Name | Meeting Type | Division | Presenter | Documents | Minutes |
|------|-----------|--------------|----------|-----------|-----------|---------|
| ∨ 8:00-8:30 | Telco | PIC | Telecom | Dawson | Final PIC Telco.ppt | (EE) |
|  |  | DAM 24-Aug -2001 | Telecom | Approver,Anne Marie | Final DAM Telco.ppt | (EE) |
| ∨ 8:30-9:00 | Exostar | PAM | Telecom | Dawson | Final PAM Exostar.ppt | (m) |

FIG. 71

Meeting Scheduler Default View

| | |
|---|---|
| *Meeting Start Time: | 8:00 AM ▸ |
| *Time Zone: | EST ▸ |
| *Meeting Duration: | 30 Minutes ▸ |
| *Conference Room: | 3C-65 |
| *Chairperson: | R. Lewis |
| Comments / Call In Number: | ◂ ▸ |
| *Meeting Days: | ☐ Monday<br>☑ Tuesday<br>☐ Wednesday<br>☐ Thursday<br>☑ Friday |

*Required

[ DONE ] [ CANCEL ]

Add Meeting

*Type of Meeting: PAM
*Deal Name: Exostar
*Presenter: Dawson
*Required

*Start Time: 8:30 AM    *Meeting Duration: 30 Minutes

ASSOCIATE
Document Name                                    Remove

DONE   CANCEL

Modify Meeting

*Type of Meeting: PAM
*Deal Name: Exostar
*Presenter: Dawson
*Required

ASSOCIATE

Document Name

DONE    CANCEL

*Start Time: 8:30 AM    *Meeting Duration: 30 Minutes

Remove

1470 — Dealroom

| Meeting Minutes | | | | |
|---|---|---|---|---|
| Structured Finance Group | PIC/PAM/DAM Meeting Minutes Report for Deal for Company 1 | | | |

∨ Transaction

| Company: | Company 1 | Approval Required: | | 260 |
|---|---|---|---|---|
| Reporting Region: | India | Sourced Amount (US$): | | 20.00 |
| Division: | Division 1 | Retained Amount (US$): | | 9.00 |
| Subdivision: | Subdivision 1 | | | |

∨ Deal Team

| Administrator, SFG System | Capital Markets | 555-555-5555 | SFG@System.com |
|---|---|---|---|
| SFG, New User 1 | Finance | 111-111-1111 | NewUser@SFG.com |

∨ Meeting Discussions

| Meeting Type: | PAM | Last Modified: | 21-Sep-2001 |
|---|---|---|---|
| Prepared By: | Administrator, SFG System | Completed: | |
| Reviewed By: | | Reviewed: | |
| Attendees: | | | |
| Objectives: | | | |
| 1. Another Test for Delete. | | | |
| 2. This is a test for DB table name changes. | | | | figure 79B ↓

FIG. 79A figure 79A

| Issues Discussed: | | | Issue Type: |
|---|---|---|---|
| 1. This is an Issue. | | | Credit |
| Conclusions: | | | |
| 1. This is a test. | | | |
| 2. This is a test for db values. | | | |
| Tasks: | Owner | Target Date | Completed Date |
| 1. Task for Minutes. | User1, Company1 | 31-Oct-2001 | |
| Meeting Type: | PIC | Last Modified: | 14-Sep-2001 |
| Prepared By: | Administrator, SFG System | Completed: | 14-Sep-2001 |
| Reviewed By: | Reviewer, Randall | Reviewed: | 16-Sep-2001 |
| Attendees: | | | |
| Objectives: | | | |
| Issues Discussed: | | | Issue Type: |
| Conclusions: | | | |
| Tasks: | Owner | Target Date | Completed Date |
| 1. Test for Min Tasks. | User1, Company1 | 10-Oct-2001 | |

BACK

Document Approval

File | Edit | View | Favorites | Tools | Help | @Send

Meeting Minutes

Structured Finance Group     PIC/PAM/DAM Meeting Minutes Report for Deal for Company 1

← 1550

∨ Transaction

| | | | |
|---|---|---|---|
| Company: | Company 1 | Approval Required: | 260 |
| Reporting Region: | India | Sourced Amount (US$): | 20.00 |
| Division: | Division 1 | Retained Amount (US$): | 9.00 |
| Subdivision: | Subdivision 1 | | |

∨ Deal Team

| | | | |
|---|---|---|---|
| Administrator, SFG System | Capital Markets | 555-555-5555 | SFG@System.com |
| SFG, New User 1 | Finance | 111-111-1111 | NewUser@SFG.com |

∨ Meeting Discussions

| | | | |
|---|---|---|---|
| Meeting Type: | PAM | Last Modified: | 21-Sep-2001 |
| Prepared By: | Administrator, SFG System | Completed: | |
| Reviewed By: | | Reviewed: | |

Attendees:

Objectives:
1. Another Test for Delete.
2. This is a test for DB table name changes.

| Issues Discussed: | | | Issue Type: |
|---|---|---|---|
| 1. This is an Issue. | | | Credit |
| Conclusions: | | | |
| 1. This is a test. | | | |
| 2. This is a test for db values. | | | |
| Tasks: | Owner | Target Date | Completed Date |
| 1. Task for Minutes. | User1, Company1 | 31-Oct-2001 | |
| Meeting Type: | PIC | Last Modified: | 14-Sep-2001 |
| Prepared By: | Administrator, SFG System | Completed: | 14-Sep-2001 |
| Reviewed By: | Reviewer, Randall | Reviewed: | 16-Sep-2001 |
| Attendees: | | | |
| Objectives: | | | |
| Issues Discussed: | | | Issue Type: |
| Conclusions: | | | |
| Tasks: | Owner | Target Date | Completed Date |
| 1. Test for Min Tasks. | User1, Company1 | 10-Oct-2001 | |

FIG. 80B

Meeting Minutes — 1560

> Details

| | | | |
|---|---|---|---|
| Meeting Type: | PIC | Last Modified: | 11-Oct-2001 |
| Prepared By: | Karen | Division: | Select a Division |
| Status: | Select a Status | Reviewer Name: | Select a Reviewer |

Meeting Attendees

> Objectives  [ADD OBJECTIVE]  Remove
| 1 | The objective is listed here, and is a hyperlink to the add/edit page. | ☐ |
| 2 | The objective is listed here, and is a hyperlink to the add/edit page. | ☐ |

> Issues  [ADD ISSUE]  Issue Type  Remove
| 1 | The issue is listed here, and is a hyperlink to the add/edit page. | Market | ☐ |
| 2 | The issue is listed here, and is a hyperlink to the add/edit page. | Market | ☐ |

> Conclusions  [ADD CONCLUSION]  Remove
| 1 | The conclusion is listed here, and is a hyperlink to the add/edit page. | ☐ |
| 2 | The conclusion is listed here, and is a hyperlink to the add/edit page. | ☐ |

> Tasks  [ADD TASK]  Owner | Current Due Date | Actual Complete Date | Remove
| 1 | The task is listed here, and is a hyperlink to the add/edit page. | | | | ☐ |
| 2 | The task is listed here, and is a hyperlink to the add/edit page. | | | | ☐ |

[DONE] [CANCEL] [VIEW SUMMARY] [CHECK SPELLING]    [REMOVE]

FIG. 81

Meeting Minutes

▽ Details

| Meeting Type: | PIC | Last Modified: | 11-Oct-2001 |
| --- | --- | --- | --- |
| Prepared By: | Karen | Division: | CAF |
| Status: | In Progress | Reviewer Name: | Reviewer, Randall |

Meeting Attendees

Randall Review, Karen, Anne Marie Approver

▽ Objectives

| 1 | The objective is listed here, and is a hyperlink to the add/edit page. |
| --- | --- |
| 2 | The objective is listed here, and is a hyperlink to the add/edit page. |

▽ Issues

Issue Type

Create Objective

Description: The Conclusion is listed here and is a hyperlink to the add/edit page.

[DONE]  [CANCEL]  [SAVE AND NEXT]  [CHECK SPELLING]

— 1570

[EXPAND ALL]  [COLLAPSE ALL]  [FEEDBACK]

FIG. 82

Create Issue

Description:

Issue Type: Select Issue Type

*Required

DONE | CANCEL | SAVE AND NEXT | CHECK SPELLING

Task Timeline
A DewalASDF

| Summary | Deal Team | Tasks/Timeline | Alerts | Discussions | Library | Profile | Doc Approval |

? FEEDBACK  PRINT

EXPAND ALL  COLLAPSE ALL  HIDE COMPLETED  Filter: View All Tasks ▶

To insert a new Task or Subtask, select a radio button and click on the appropriate insert button.
The new record will be inserted beneath the radio button selected.

| INSERT TASK / INSERT SUBTASK / UPDATE TASKS | Owner | Customer Request Date | Current Due Date | Actual Completion Date | Status | Co. Only | N/A | Remove |
|---|---|---|---|---|---|---|---|---|
| ✓ ○ Qualified Lead | | | | | | | | |
| ○ Executive Confidentiality Agreement | | | –/–/– | 12/4/2001 | Completed | | | |
| ○ ad hoc | | | –/–/– | 11/27/2001 | Completed | | | |
| ○ Restricted Stock List Designation | | | –/–/– | 12/4/2001 | Completed | | | ☐ |
| ○ Create Financial Model | | | –/–/– | 11/25/2001 | Completed | | | |
| ✓ ○ Structure/Purpose | | | –/–/– | 11/30/2001 | Completed | | | |
| ○ Enter Customer Date Request for Milestones | | | –/–/– | –/–/– | Not Started | | | |
| | | | | | | | | REMOVE |

FIG. 88

Task Timeline
A DewalASDF
| Summary | Deal Team | Tasks/Timeline | Alerts | Discussions | Library | Profile | Doc Approval |

To add an Association to a Task or Subtask, select a radio button and click on the Add Association button.
The new Association will be added to the Task/Subtask selected.

1632

| ADD ASSOCIATION | Owner | Customer Request Date | Current Due Date | Actual Completion Date | Status | Co. Only | N/A |
|---|---|---|---|---|---|---|---|
| ✓ ○ Qualified Lead | Select an Owner ▼ | | --/--/-- 🗓 | --/--/-- 🗓 | In Progress ▼ | ☐ | ☐ |
| ○ Executive Confidentiality Agreement | Select an Owner ▼ | | --/--/-- 🗓 | 11/27/01 🗓 | Completed ▼ | ☐ | ☐ |
| ○ ad hoc | Select an Owner ▼ | | --/--/-- 🗓 | --/--/-- 🗓 | In Progress ▼ | ☐ | ☐ |
| ○ Restricted Stock List Designation | Select an Owner ▼ | | --/--/-- 🗓 | 11/25/01 🗓 | Not Started / In Progress / Completed | ☐ | ☐ |
| ○ Create Financial Model | Select an Owner ▼ | | --/--/-- 🗓 | 11/30/01 🗓 | Completed ▼ | ☐ | ☐ |
| ✓ ○ Structure Purpose | | | --/--/-- 🗓 | --/--/-- 🗓 | Not Started ▼ | ☐ | ☐ |
| ○ Enter Customer Date Request for Milestones | Select an Owner ▼ | | --/--/-- 🗓 | --/--/-- 🗓 | Not Started ▼ | ☐ | ☐ |

? FEEDBACK PRINT

DONE

FIG. 89

Deal Finance | Dealroom [?] [FEEDBACK]

Deal 1
| Summary | Deal Team | Tasks/Timeline | Alerts | Discussions | Library | Profile | Doc Approval |

Profile

FAS 133: Yes ○ No ○

Product Note 1

| *Product Type | Target Amount | Approved Amount | *Funded Volume | Closing ROI | Match Funded | Transaction Type | Transaction Type |
|---|---|---|---|---|---|---|---|
| Loan Participation | 50.00 | 50.00 | | 2.50 | ☑ Yes | Initial Financing | 3-Oct-2001 |

Volume Note 1

Select Fiscal Year: 2001 ▾

| | Q1 | Q2 | Q3 | Q4 | Annual Total | Total of Years |
|---|---|---|---|---|---|---|
| Estimate | 21.00 | 12.00 | 5.00 | 0.00 | 38.00 | 38.00 |
| Actuals | | | | | --- | --- |

*Required  Note 1: Amounts are in US Millions of Dollars: $1,000,000 = 1.00

[SAVE]  [CANCEL]

Deal Search Results
Records (1-5 of 5)
Search Criteria: None Selected

1670 →

| Deal ID | Deal Name | Name History | Primary Company ▲ | Date Created | Current Status | Division | Subdivision | Co. Primary Contact | Delete/ Reassign |
|---|---|---|---|---|---|---|---|---|---|
| 15002 | Aifos | | Aifos | 13-Dec-2001 | Active | None Selected | None Selected | User58, User58 | ☐ |
| 15003 | Iki | | Aifos | 13-Dec-2001 | Active | None Selected | None Selected | SFG1Last, SFGAdminFirst | ☐ |
| 15001 | aMin Div - Co 1 | | aQA Mine Ext Co | 13-Dec-2001 | Active | None Selected | None Selected | User79, User79 | ☐ |
| 15000 | Deal 1 | | External Company 1 | 13-Dec-2001 | Active | None Selected | None Selected | SFG1Last, SFGAdminFirst | ☐ |
| 15005 | Division - USA Co | | Softtek | 13-Dec-2001 | Active | None Selected | None Selected | User75, User75 | ☐ |

Result Page: 1

| MODIFY SEARCH CRITERIA | To search for documents within these deals click here | DELETE | REASSIGN |

FIG. 93

Deal List

Records (1-5 of 5)    Division/Subdivision to Filter on: [All Divisions/Subdivisions ▼]    [FEEDBACK]

| Deal Name | Primary Company | Date Created | Deal Size Note 1 | Division/ Subdivision | Co. Primary Contact | Last Milestone | Deal Status | Delete/Reassign |
|---|---|---|---|---|---|---|---|---|
| Aifos | Aifos | 13-Dec-2001 | — | None Selected | User58, User58 | — | Active | ☐ |
| Iki | Aifos | 13-Dec-2001 | — | None Selected | SFG1Last, SFGAdminFirst | — | Active | ☐ |
| aMin Div - Co 1 | aQA Mine Ext Co 1 | 13-Dec-2001 | — | None Selected | User79, User79 | — | Active | ☐ |
| Deal 1 | External Company 1 | 13-Dec-2001 | — | None Selected | SFG1Last, SFGAdminFirst | — | Active | ☐ |
| Division - USA Co | Softtek | 13-Dec-2001 | — | None Selected | User75, User75 | — | Active | ☐ |

Note 1 Amounts are in millions of US Dollars ($1,000,000 = 1.00)
Result Page: 1

To search for documents within these deals click here

[ DELETE ]    [ REASSIGN ]

| Profile | |
|---|---|
| *Deal Name: | Big Deal / VIEW HISTORY |
| Deal ID: | 15065 |
| *Deal Status: | Dead ▼ — Active / Closed / Dead / Inactive / Matured / Paid Off / Sold |
| *Dead Deal Description: | |
| Dead Date: | |
| *Approval Level: | |
| *Deal Source: | Customer called SFG ▼ |
| Policy 6.0: | Yes ○  No ⦿ |

| Profile | |
|---|---|
| *Deal Name: | Downey Training / VIEW HISTORY |
| *Deal Status: | In Process ▼ — Divested / Funded / In Process / Rejected |
| *Deal Type: | |
| Deal Size: Note 1 | |
| Company Description: | |

FIG. 96

| | | |
|---|---|---|
| Profile | | |
| Deal Name: | $896,720-041401-Trailers | VIEW HISTORY |
| DBA Name: | | |
| *Deal Status: | In Credit - Active ▼ | |
| Description: | Approved<br>Awaiting information<br>Awarded<br>Conditional Approval<br>Dead<br>Declined<br>Divested<br>Documentation<br>In Credit - Active<br>In Credit Idle<br>One Pager | |
| Approval Level: | | |
| Deal Source: | | |
| FAS 133: | | |
| Fiscal Year: | | |
| Collateral: | | |
| Comments: | | |

Modify Index Card

Summary Information:

| | |
|---|---|
| *Title: | Resume |
| *Description: | Note: This text area does not support more than 255 characters.<br>The description of this document. |
| Status: | Checked in by Jones, John on 4-Oct-2001 |
| File: | 📄 MyDocument.doc (23 KB) |

Parent Folder Information:

| | |
|---|---|
| *Parent folder: | SELECT |

☐ Big Company

*Required

Version Information:

| Version # | File | Last Modified | Modified By | Comments |
|---|---|---|---|---|
| 5 | 📄 | 4-Oct-2001 16:55 EST | Jones, John | |

What would you like to do? | Select from... ▼ | GO

Select from...
Check Out
Create Review Copy
Download File
Edit In Place
Lock File
View File
Print File
Blackline

Subscribe to changes to this item: ☐

Association Information:

Click on the associated file's hyperlink to view it OR select a new association to add to the index card.

Add Associations: | Select from... ▼ | ASSOCIATE

REMOVE

Permission Information:

SELECT USERS | SELECT GROUPS

Send a system-generated notification of changes to this Index Card to the users/groups below via the "Notify" check box.

| User/Group | Permissions | Notify | Remove |
|---|---|---|---|
| U - 1, User | View ▼ | ☐ | ☐ |
| U - 2, User | View ▼ | ☐ | ☐ |
| U - 3, User | No Permission ▼ | ☐ | ☐ |
| U - 4, User | Full Control ▼ | | |

REMOVE

DONE | DELETE | CANCEL

Blackline Documents

Please select the two document versions to blackline.

Version Information:

| Select | Version # | File | Last Modified | Modified By | Comments |
|---|---|---|---|---|---|
| ☑ | Current 5 | 📄 | 2001-11-04 15:55:00.0 | Jones, John | Added activities |
| ☐ | 4 | 📄 | 2001-11-04 12:59:00.0 | Jones, John | Removed address |
| ☐ | 3 | 📄 | 2001-11-03 09:47:00.0 | Jones, John | Modified formatting |
| ☑ | 2 | 📄 | 2001-11-01 00:22:00.0 | Jones, John | Updated |
| ☐ | 1 | 📄 | 2001-10-25 16:55:30.0 | Jones, John | |

[ BLACKLINE ] [ CANCEL ]

Navigation to feature:
1. Super-user selects the Data Source option under the Data Management section of the Start Menu.
2. Business Administrator selects the Data Source option under the Data Management section of the Business Profile.

Business Rules (Requirement)

| ID | Business Rule |
|----|---------------|
| | Layout |
| | Fields will be placed into logical groups, based upon the page in which they are used, for ease of management. |
| | Business Administrators may access the groups "Profile: Dealroom Required", "Deal Team", "Deal Profile", and "Custom". |
| | Super-users may access the "Custom" group only. |
| | Deal Team |
| | The "Deal Team" group will contain data sources for the Company Role and User Role fields defined in the Appendix for on the Deal Team page. |
| | Data Sources defined for the Deal Team group will apply within the Administrator's business and all levels below it. |
| | Deal Profile: Dealroom Required |
| | The "Deal Profile: Dealroom Required" group will contain data sources for the Deal Phase, Deal Status, and Region fields defined in In the Appendix for Dealroom Required section of the Profile tab. These fields belong to the "Dealroom Required" section of the configurable profile. |
| | Data Sources defined for the Deal Profile: Dealroom Required group will apply within the |

FIG. 100

Modify Index Card

Summary Information:

| | |
|---|---|
| *Title: | Resume_Blackline_5_2 |
| *Description: | Note: This text area does not support more than 255 characters.<br>Blackline comparison of versions 5 and 2 of Resume. |
| Status: | Checked in by Jones, John on 4-Oct-2001 |
| File: | 📄 My Blackline File.doc *(23 KB)* |

Parent Folder Information:

| | |
|---|---|
| *Parent folder: | SELECT |
| ☐ Big Company | |

*Required

Version Information:

| Version # | File | Last Modified | Modified By | Comments |
|---|---|---|---|---|
| 5 | 📄 | 4-Oct-2001 16:55 EST | Jones, John | |

What would you like to do? Select from... ▼ GO

Subscribe to changes to this item: ☐

Association Information:

Click on the associated file's hyperlink to view it OR select a new association to add to the index card.

Add Associations: | Select from... ▼ | ASSOCIATE

☐ 📄 Resume

REMOVE

Permission Information:

SELECT USERS | SELECT GROUPS

Send a system-generated notification of changes to this Index Card to the users/groups below via the "Notify" check box.

| User/Group | Permissions | Notify | Remove |
|---|---|---|---|
| U - 1, User | View ▼ | ☐ | ☐ |
| U - 2, User | View ▼ | ☐ | ☐ |
| U - 3, User | No Permission ▼ | ☐ | ☐ |
| U - 4, User | Full Control ▼ | ☐ | ☐ |

REMOVE

DONE | DELETE | CANCEL

Profile Master Field List

Group Filter: [All ▼]　　　　　　　　　　　　　[ADD FIELD] [ADD GROUP]

← 1760

| Group | Field Name | Description | Remove |
|---|---|---|---|
| Business Overview | Business Line | A company's line of business | ☐ |
| Business Overview | Code Name | Specific code name for company | ☐ |
| Business Overview | Country | Country in which a company is headquartered | ☐ |
| Business Overview | Headquarters | Address of a company's headquarters | ☐ |
| Business Overview | Hourly Employees | Number of hourly employees within a company | ☐ |
| Business Overview | Initiated Date | Date that the deal was initiated | ☐ |
| Business Overview | Region | Region in which a business operates | ☐ |
| Business Overview | Salaried Employees | The number of salaried employees within a company | ☐ |
| Financial Volume | Fiscal Year Volume | Year in which Fiscal Year date applies | ☐ |
| Financial Volume | Q1 Volume | First Quarter volume | ☐ |
| Financial Volume | Q2 Volume | Second Quarter volume | ☐ |
| Financial Volume | Q3 Volume | Third Quarter Volume | ☐ |
| Financial Volume | Q4 Volume | Fourth Quarter Volume | ☐ |

[DONE] [CANCEL]　　　　　　　　　　　　　　　　[REMOVE]

FIG. 102

Field Configuration

Field Name:

Group: Select a Group ▸  ▸ ADD GROUP

Data Type: Select a Group ▸

Default Caption:

Description:

Length: Note 1

Decimal Places:

Note 1 Example: The length of this note is 50 characters.

DONE    CANCEL    DELETE

| Profile Configuration | | | Dealroom |
|---|---|---|---|
| Business Profile Information: | | | |
| Business: | Corporate Business Development | | |
| Data Type: | Acquisition ▼ | | |

- 1 ∨ Deal Overview
  - ⊕ 2 <> Target Type >
  - ⊕ 3 <> Significant Growth/Cost Synergy Assumption
  - ⊕ < Strategic Rationale >
- 4 ∧ Business Overview
  - ⊕ 5 <> Code Name >    < Headquarters >    < Country >    < Region >
  - ⊕ 6 <> Business Line >    <Initiated Date>    < Web Address >    < First Contact Date >

[ DONE ]  [ CANCEL ]

FIG. 105

| Field Configuration | | |
|---|---|---|
| Row #: | 2 ▶ | |
| Master Field: | Select a Master Field ▶ | MASTER FIELD |
| Caption: | | |
| Display Type: | Select a Display Type ▶ | |
| Data Source: | Select a Data Source ▶ | DATA SOURCE |
| Required: | ☐ | |
| Select Multiple: | ☐ | |
| Default Value: | | |
| Width: | Select a Width ▶ | |
| Height: | | |
| DONE | CANCEL | |

| Data Source Selector | |
|---|---|
| Custom Data Sources | |
| Select Name | Description |
| ○ Business Line | Recognized business lines |
| ○ Country | Countries in which a business can operate |
| ○ Region | Regions in which a business can operate |

| DONE | CANCEL | NEW |

Master Field Selector

Group Filter: All ▼

| Select Note 1 | Group | Field Name | Description |
|---|---|---|---|
| ○ | Business Overview | Business Line | A company's line of business |
| ○ | Business Overview | Code Name | Specific code name for company |
| | Business Overview | Country | Country in which a company is headquartered |
| ○ | Business Overview | Headquarters | Address of a company's headquarters |
| | Business Overview | Hourly Employees | Number of hourly employees within a company |
| | Business Overview | Initiated Date | Date that the deal was initiated |
| ○ | Business Overview | Region | Region in which a business operates |
| ○ | Business Overview | Salaried Employees | The number of salaried employees within a company |
| ○ | Financial Volume | Fiscal Year Volume | Year in which Fiscal Year date applies |
| | Financial Volume | Q1 Volume | First Quarter volume |
| ○ | Financial Volume | Q2 Volume | Second Quarter volume |
| | Financial Volume | Q3 Volume | Third Quarter Volume |
| ○ | Financial Volume | Q4 Volume | Fourth Quarter Volume |

Note 1 Assigned master fields are no longer available for selection.

[DONE]  [CANCEL]

Business Profile

| Business Profile Information: | | |
|---|---|---|
| *Business Name: | SFG | |
| *Go To Market Name: | SFG | |
| *Left Header Graphic: | menuLogo.gif | ATTACH |
| *Right Header Graphic: | formatHeader.jpg | ATTACH |
| *Address 1: | 742 Evergreen | |
| Address 2: | | |
| *City/Town: | Stamford | |
| *State/Province: | Ct | |
| *Country: | USA | |
| *Zip/Postal Code: | 06927 | |
| *Phone Number: | 203-961 | Note 1 |
| Fax Number: | 203-961 | Note 1 |
| *Voice of Customer Inbox: | peter.t@.com | |

Note 1: Phone number example: 1-(555)554-4575 or 01-44(0)535 545 7506
*Required

System Functionality:

☑ Deal Groups
  This checkbox enables permissioned Users to assign companies to one of three predefined groups, Group, Customer Group, or Other Group. These groups, in turn, can be permissioned on Deal Room content.

☐ Personalized Portal
  This checkbox enables Personal Portal functionality within the Deal Room.
  Note: Once you check this checkbox and save the change, it cannot be undone.

☑ Meeting Scheduler/Meeting Minutes
  This checkbox enables permissioned Users to utilize the Meeting Scheduler/Meeting Minutes functionality within the Deal Room.

☑ Document Approval
  This checkbox enables permissioned Users to utilize the Document Approval functionality within the Deal Room.

| ☑ Due Diligence Module |
|---|
| This checkbox enables permissioned Users to utilize the Due Diligence Module functionality within the Deal Room.<br>☑ If Due Diligence Module is enabled, this checkbox enables Users active on the Deal Team to utilize the Import Due Diligence Entries feature. |

| ☑ Reports |
|---|
| This checkbox enables permissioned Users to utilize the Reports functionality within the Deal Room.<br>☑ If Reports is enabled, this checkbox enables Users active on the Deal Team to utilize the Deal Pipeline feature.<br>☑ If Reports is enabled, this checkbox enables Users active on the Deal Team to utilize the Milestone Summary feature.<br>☑ If Reports is enabled, this checkbox enables Users active on the Deal Team to utilize the Custom Deal List feature.<br>☑ If Reports is enabled, this checkbox enables Users active on the Deal Team to utilize the Profile Export feature. |

| Data Management: |
|---|
| Profile Fields |
| Define the database fields used to create the Deal Profile page. |
| Profile Layout |
| Design Deal Profile layouts by Deal Type. |
| Data Sources |
| Configure the available options for form elements in the Dealroom. |
| Ownership/Sharing Level: |

Deals and Companies in the Dealroom are owned/shared at the Business level. Note 2
Note 2 Changes to Deal Visibility settings will affect all deals created from this point forward. Permissions are not changed retroactively on existing deals.

| Deal Visibility: Note 3 | | |
|---|---|---|
| Authority Level | Deals | |
|  | View | Modify |
| All users within the business | ☑ | ☐ |
| Managers only | ☑ | ☑ |
| Admin only | ☑ | ☑ |

Note 3: Permissions selected will apply to Deals within SFG and any division below SFG.

| DONE | CANCEL | APPLICATION PERMISSIONS | BUSINESS HIERARCHY |

FIG. 114B

| Generate Report | |
|---|---|
| Report Type: | Deal Pipeline ▸ |
| Division: | All Divisions ▸ |
| Subdivision: | All Subdivisions ▸ |
| Region: | All Regions ▸ |
| Deal Type: | All Types ▸ |
| Deal Status: | All Statuses ▸ |
| Deal Phase: | Prospect / In Discussions / LOI/Due Diligence / Signed / Closed |
| Exported to Corporate: | All ▸ |
| User Role: | All User Roles ▸ |
| User: | None Selected  SELECT |
| Deal Revenue Note 1: | From: ⊞  To: |
| Deal Created Date: | From:  To: ⊞ |
| Group Results By: | Business Unit ▸ |

Note 1: Amounts are in millions of dollars

GENERATE    LOAD DEFAULT

FIG. 115

Deal Pipeline    　　　　　　　　　　　　　　　　　　　　　　　　　　Date Created: 20-Dec-2001

Pipeline Criteria: Division = GEMS, Subdivision = All Subdivisions, Region = Central, Deal Types = All Types, User Role = All Roles, User = None Selected, Deal Size = 0-500, Date Created = 11/01/00-10/31/01

[MODIFY CRITERIA] [SET AS DEFAULT]

| Division/Subdivision | Phases (19 Deals) Total Revenue ($1120) Note 1 / Avg. Days in Phase (68) | | | | |
|---|---|---|---|---|---|
| | Prospect (11) $0/100 | Contact - Discussions (2) $600/50 | LOI/ Due Diligence (2) $300/30 | Signed (3) $160/20 | Closed (1) $60/30 |
| GEMS / GEMS IT | Deal A ($0/50) | Deal C ($480/60) | Deal M ($150/32) | Deal Q ($40/16) | Deal Z ($60/30) |
| | Deal X ($0/100) | Deal W ($120/40) | | | |
| | Deal Y ($0/150) | | | | |
| | Deal B ($0/125) | | | | |
| GEMS / Modalities | Deal O ($0/75) | | Deal U ($150/28) | | |
| | Deal T ($0/80) | | | | |
| GEMS / Services | Deal N ($0/90) | | | Deal P ($100/18) | |
| | Deal R ($0/120) | | | | |
| GEMS / Ultrasound | Deal S ($0/110) | | | Deal V ($20/26) | |
| | Deal H ($0/50) | | | | |
| | Deal E ($0/150) | | | | |

Note 1 Amounts are in millions of US Dollars ($1,000,000 = 1.00)

[MODIFY CRITERIA]

FIG. 116

Milestone Progress Summary          Date Created: 20-Dec-2001

Summary Criteria: Milestone Template = Med Systems, Division = Division 1, Subdivision = Subdivision A, Region = Europe, Deal Type = Acquisition, User Role = BD Leader, User = None Selected, Deal Created Date = 11/01/00-10/31/01, Deal Size = 100-400

[MODIFY CRITERIA] [SET AS DEFAULT]

| Color Legend: | Completed | Past Due | Due This Week | Date Moved Out | Date Moved In | No Change |
|---|---|---|---|---|---|---|
| BD Leader | Deal / Size | Prospect | CA | LOI | Due Diligence | Contract | Close |
| Sperling. | Deal A / $200 | 4-Nov-2001 | 5-Nov-2001 | 20-Nov-2001 | 28-Nov-2001 | 2-Dec-2001 | 2-Dec-2001 |
| Sperling. | Deal B / $128 | 20-Nov-2001 | TBD | 7-Nov-2001 | 12-Dec-2001 | TBD | TBD |
| Little. | Deal C / $330 | 2-Nov-2001 | 6-Nov-2001 | 20-Nov-2001 | TBD | 12-Dec-2001 | 18-Dec-2001 |

[MODIFY CRITERIA]

Custom Deal List

Date Created: 18-Apr-2002

> Deal Dashboard
> Deals
> Resource Center
> Search
> Templates
> Reports
  Generate Report
  Deal Pipeline
  Milestone Summary
  Custom Deal list
> Admin
  Help

Summary Criteria: Division = Corporate Training Division, Subdivision = All Subdivisions, Region = All Regions, Deal Type = All Deal Types, Deal Phase = All Deal Phases, Deal Status = All Deal Statuses, User Role = All User Roles, Selected Users = All Users

[MODIFY CRITERIA] [SET AS DEFAULT]                    [EXPORT TO EXCEL] [CONFIGURE DEAL LIST]

| Deal Name ▲ | Division | Subdivision | Region | Deal Type | Deal Phase | Deal Status | Deal Size |
|---|---|---|---|---|---|---|---|
| Paradise | Corporate Training Division | | Europe | Acquisition | Preliminary | Active | 0.0 |
| Sweet | Corporate Training Division | | Americas | Acquisition | Preliminary | Active | 100.0 |
| Tiger | Corporate Training Division | | Asia | Acquisition | Preliminary | Active | 23.0 |

[MODIFY CRITERIA]

METHODS AND SYSTEMS FOR IDENTIFYING PROSPECTIVE CUSTOMERS AND MANAGING DEALS

CROSS REFERENCE TO RELATED APPLICATIONS

This application is a continuation-in-part of U.S. patent application Ser. No. 10/123,095, filed Apr. 12, 2002, now abandoned which is a continuation-in-part of U.S. patent application Ser. No. 09/771,358, filed Jan. 27, 2001, entitled "Methods and Systems for Identifying Prospective Customers and Managing Deals," all of which is incorporated by reference herein in its entirety.

BACKGROUND OF THE INVENTION

This invention relates generally to managing deals and deal information, and more specifically to methods and systems for managing deal workflow including approving deal documents, scheduling meetings, and managing minutes from meetings.

Identifying prospective customers, negotiating business deals with those customers, and finalizing those deals can be a time consuming and difficult task, especially for a large organization. A deal is defined as any transaction that involves at least two parties. A deal therefore may involve at least one of loans, leases, equity stakes and common equity. Examples within the loan category include construction loans, development loans, letters of credit, loan participation, revolver, senior loans, subordinated loans and U.S. tax exempt debt. Leases include single investor leases, leveraged leases, and off balance sheet loans. Equity and common equity further include equity, limited partnerships, limited partnership-tax credit deals, marketable securities, preferred limited partnerships, preferred stock, common stock, construction equity, development equity, and fund equity.

If many different products and services are offered by one organization, simply identifying the needs of prospective customers and whether such needs can be met by any of the offered products and services can require significant resources. Also, and in a large organization, communicating the efforts that have been made with respect to each prospective customer throughout the organization can be difficult in that many people can be involved in the deal origination efforts. Therefore, significant time and resources can be required to coordinate the internal efforts being directed toward each prospective customer to ensure that timely and meaningful information is provided and also to ensure that such efforts are not being duplicated elsewhere within the organization. Moreover, in a large organization, scheduling meetings to discuss prospective customers and their product needs, and documenting those meetings can be difficult. Additionally, in a large organization, obtaining approval of a document that sets forth the terms and conditions of a deal with a customer can be time consuming.

If a prospective customer indicates an interest in purchasing a product or service offered by the organization, it then becomes necessary for the organization to deliver based on the expectations that have been created during the selling process. Of course, failing to meet the expectations of a prospective customer can result in not only the loss of a sale, but also a loss of goodwill. Successfully completing a transaction with an opportunity for repeat business is facilitated by ensuring that tasks associated with completing the deal are completed on time. In order to ensure tasks are completed on time, each individual involved in the closing should clearly understand his or her role in completing each task and the date such task is to be completed. Such communication and effective management of deal closing can be challenging, especially if many deals are being handled at a given time and numerous individuals are involved.

BRIEF DESCRIPTION OF THE INVENTION

In one aspect, a system including at least one computer configured as a server that contains a database of deal information, business rules, libraries and templates for deals for at least one business entity is provided. The system further includes at least one client system connected to the server through a network. The server is configured to prompt a user to create a deal, including identifying deal team members, notify members of the deal team of tasks to perform and milestones accomplished, receive documents relating to a deal from a client system that are submitted for approval by a user, and provide access to the deal documents through a client system for review and approval.

In another aspect, a system including at least one computer configured as a server that contains a database of deal information, business rules, libraries and templates for deals for at least one business entity is provided. The system further includes at least one client system connected to the server through a network. The server is configured to prompt a user to create a deal, including identifying deal team members, prompt a user to schedule at least one meeting relating to a specific deal, and notify at least one user of the at least one scheduled meeting.

In another aspect, a system including at least one computer configured as a server that contains a database of deal information, business rules, libraries and templates for deals for at least one business entity is provided. The system further includes at least one client system connected to the server through a network. The server is configured to prompt a user to create a deal, including identifying deal team members, prompt a user to create minutes from a meeting relating to a specific deal, store minutes from each meeting in the database; and enable a user to search for a specific deal by the meeting minutes stored in the database.

In another aspect, a system including at least one computer configured as a server that contains a database of deal information, business rules, libraries and templates for deals for at least one business entity is provided. The system further includes at least one client system connected to the server through a network. The server is configured to prompt a user to create a deal, including identifying deal team members, notify members of the deal team of tasks to perform and milestones accomplished, receive documents relating to a deal from a client system that are submitted for approval by a user, provide access to documents relating to a specific deal through a client system for approval by a designated user wherein the documents include a plurality of versions of at least one document, and enable the user designated to approve documents for a specific deal to select at least two versions of a document to be compared through a comparison function that visually displays differences between the selected document versions for document approval purposes.

In another aspect, a system including at least one computer configured as a server that contains a database of deal information, business rules, libraries and templates for deals for at least one business entity is provided. The system further includes at least one client system connected to the server through a network. The server is configured to prompt a user to create a deal, including identifying deal team members, and create a deal profile relating to the deal wherein the deal profile is reconfigurable such that a permissioned user is enabled to select data fields displayed on the deal profile for at least one of a specific deal, a group of deals, a subdivision, a division, a business, and a group of businesses.

In another aspect, a system including at least one computer configured as a server that contains a database of deal information, business rules, libraries and templates for deals for at least one business entity is provided. The system further includes at least one client system connected to the server through a network. The server is configured to prompt a user to create a deal, including identifying deal team members, notify members of the deal team of tasks to perform and milestones accomplished, and generate at least one report relating to the deal.

In another aspect, a system including at least one computer configured as a server that contains a database of deal information, business rules, libraries and templates for deals for at least one business entity is provided. The system further includes at least one client system connected to the server through a network. The server is configured to prompt a user to create a deal, including identifying deal team members, notify members of the deal team of tasks to perform and milestones accomplished, receive documents relating to a deal from a client system, store said deal documents on the database, and provide access to the deal documents through a client system for review in response to a request by a user.

In another aspect, a system including at least one computer configured as a server that contains a database of deal information, business rules, libraries and templates for deals for at least one business entity is provided. The system further includes at least one client system connected to the server through a network. The server is configured to prompt a user to create a deal, including identifying deal team members, receive Extensible Markup Language (XML) messages relating to a deal, execute proper inserts and updates in response to XML messages, and provide status back to a calling source application.

In another aspect, a method for managing a deal process is provided. The method includes prompting a user to create a business profile, prompting a user to create a deal, including identifying deal team members, prompting a user to schedule at least one meeting relating to a specific deal, recording minutes from each meeting, notifying members of the deal team of tasks to be performed and milestones, and submitting for approval documents relating to the deal.

In another aspect, a system including at least one computer configured as a server that contains a database of deal information, business rules, libraries and templates for deals for at least one business entity is provided. The system further includes at least one client system connected to the server through a network. The server is configured to prompt a user to create a deal, including identifying deal team members, prompt a user to schedule at least one meeting relating to a specific deal, store minutes from each meeting on the database, notify members of the deal team of tasks to perform and milestones accomplished, receive documents relating to a deal from a client system that are submitted for approval by a user, and provide access to the deal documents through a client system for approval.

In another aspect, an apparatus including a means for a user to create business profiles is provided. The apparatus further includes a means for scheduling at least one meeting relating to a specific business deal, a means for storing minutes from each meeting, and a means for notifying members of a deal team of tasks to perform and milestones accomplished.

In another aspect, a database including at least one business profile is provided. The database further includes a plurality of templates for creating library folder structures for association with a deal, a schedule of at least one meeting relating to a deal, and minutes from each meeting.

In another aspect, a computer program embodied on a computer readable medium for identifying prospective customers and managing deal information is provided. The program includes a code segment that receives deal information and then prompts a user to create a deal, including identifying deal team members, prompts a user to schedule at least one meeting relating to a specific deal, stores minutes from each meeting on a database, and notifies members of the deal team of tasks to perform and milestones accomplished.

BRIEF DESCRIPTION OF THE DRAWINGS

FIGS. 5A and 5B show an example business profile screen.
FIG. 6 is an example business hierarchy screen.
FIG. 7 is an example create division profile screen.
FIG. 8 is an example create sub-division profile screen.
FIG. 9 is an example library template screen.
FIG. 10 is an example create/modify library template screen.
FIG. 11 is an example create/modify library template folder screen.
FIG. 12 is an example master template list screen.
FIG. 13 is an example create and modify business master template screen.
FIG. 15 is an example deal summary screen.
FIG. 16 is an example deal list screen.
FIG. 17 is an example deal team or work group screen.
FIG. 18 is an example select company screen.
FIG. 19 is an example company relationships screen.
FIG. 21 is an example of a my profile screen.
FIG. 22 is an example of a user profile screen.
FIG. 23 is an example user profile pop-up window.
FIG. 24 is an example company profile screen.
FIG. 25 is an example company profile pop-up window.
FIG. 26 is an example of a deal dashboard screen.
FIG. 27 is an example create/modify milestone screen.
FIG. 28 is an example create/modify milestone screen.
FIG. 29 is an example create/modify task screen.
FIG. 31 is an example create/modify sub-task screen.
FIG. 32 is an example task assignment screen.
FIG. 33 is an example task notifications screen.
FIG. 34 is an example of a tasks timeline screen.
FIG. 35 is an example create discussion screen.
FIG. 39 is an example voice of customer summary screen.
FIG. 41 is an example create/modify category screen.
FIG. 42 is an example create index card screen.
FIG. 43 is an example modify index card screen.
FIG. 44 is an example of a deal profile screen.
FIG. 45 is an example view deal profiles screen.
FIG. 46 is an example deal search preferences screen.
FIG. 47 is an example deal search results screen.
FIG. 48 is an example customer invitation screen.

FIG. 49 is a continuation of a customer invitation screen.
FIG. 50 is an example originator home page.
FIG. 52 is an example prospect home page.
FIG. 53 is an example customer home page.
FIG. 57 is an example of a document approval summary screen.
FIG. 59 is an example of an attach document for approval screen.
FIG. 60 is an example document approval detail screen.
FIG. 61 is an example document approval detail print view screen.
FIGS. 66A and 66B show an example create/modify index card screen.
FIG. 70 is an example meeting scheduler screen.
FIG. 71 is an example meeting scheduler print view screen.
FIG. 72 is an example meeting scheduler default view screen.
FIG. 74 is an example add meeting screen.
FIG. 75 is an example modify meeting screen.
FIG. 77 is an example search deals with minutes screen.
FIG. 78 is an example search deals with minutes results screen.
FIGS. 79A and 79B show an example meeting minutes screen.
FIGS. 80A and 80B show an example meeting minutes print view screen.
FIG. 81 is an example meeting minutes data capture screen.
FIG. 82 is an example meeting minutes create objective screen.
FIG. 84 is an example meeting minutes create issue screen.
FIG. 88 is an example task timeline screen.
FIG. 89 is an example update tasks mode screen.
FIG. 90 is an example deal finance screen.
FIG. 93 is an example deal search results screen.
FIG. 94 is an example deal list screen.

FIG. 95 is an example of a portion of a deal profile screen where a deal status has been designated as "dead.
"
FIG. 96 is an example of a portion of a deal profile screen where a deal status has been designated as "divested.
"
FIG. 97 is another example of a portion of a deal profile screen where a deal status has been designated as "dead.
"
FIGS. 98A and 98B show an example embodiment of a modify index card screen showing a blackline command.
FIG. 99 is an example embodiment of a blackline selector screen.
FIG. 100 is an example embodiment of blackline comparison screen.
FIGS. 101A and 101B show an example embodiment of a modify index card screen for a blackline document.
FIG. 102 is an example embodiment of a profile master field list screen.
FIG. 104 is an example, embodiment of a field configuration screen.
FIG. 105 is an example embodiment of a profile configuration screen.
FIG. 107 is an example embodiment of a field configuration screen.
FIG. 108 is an example embodiment of a data source selector screen.
FIG. 109 is an example embodiment of an option list screen.
FIG. 110 is an example embodiment of a master field selector screen.
FIG. 111 is an example embodiment of a configured deal profile screen.
FIGS. 114A and 114B show another embodiment of a business profile screen.
FIG. 115 is an example embodiment of a generate report screen for a deal pipeline report.
FIG. 116 is an example embodiment of a deal pipeline report screen.
FIG. 117 is an example embodiment of a milestone progress summary report screen.
FIG. 118 is an example embodiment of a custom deal list screen.
FIG. 119 is an example embodiment of an input custom deal list screen.

DETAILED DESCRIPTION OF THE INVENTION

Figure 1:
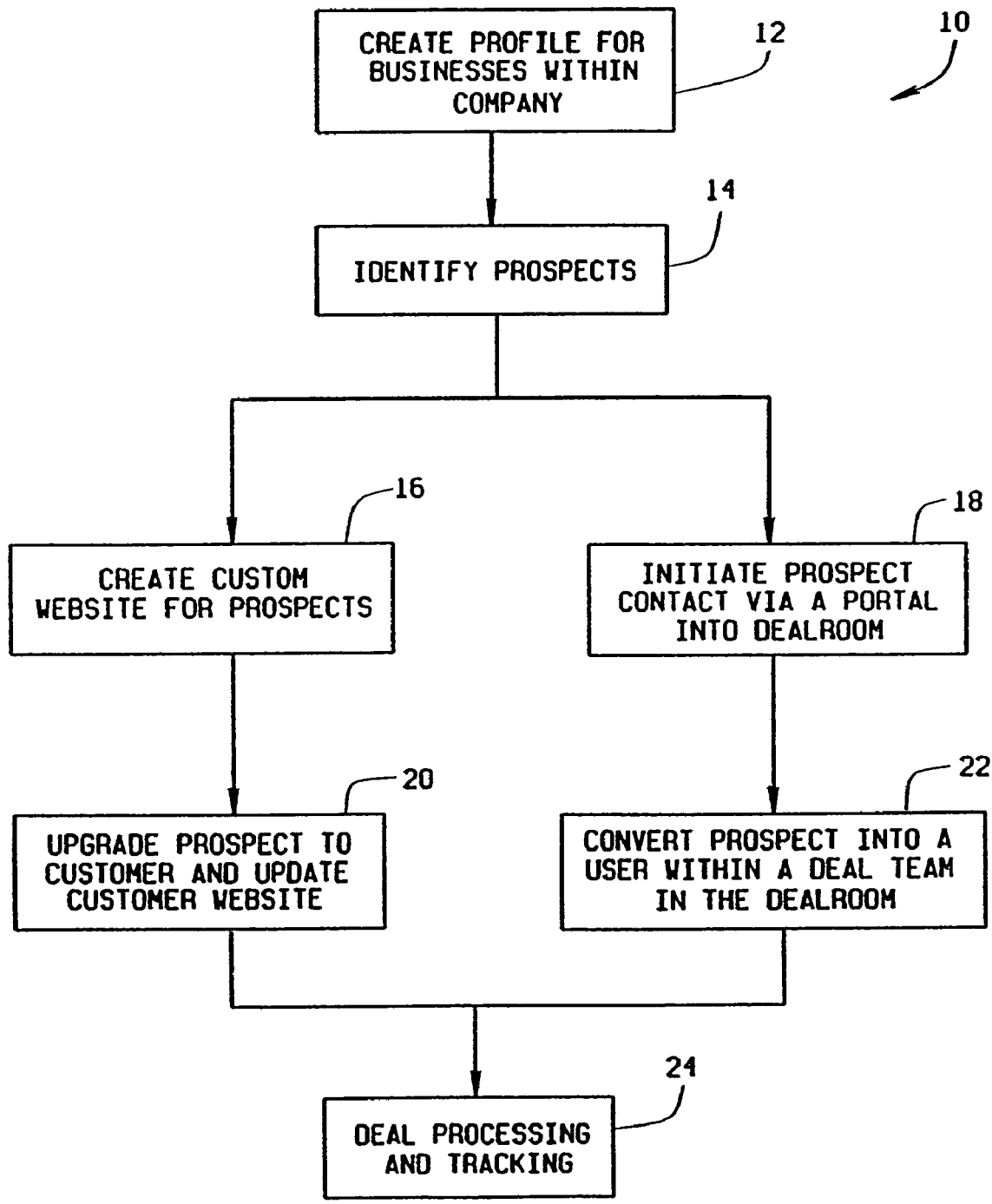
FIG. 1 is a flowchart identifying alternative interfaces used to attract prospects for deals.

Set forth below is a description of example methods and systems for facilitating origination of new business and tracking transactions. More specifically, and in an example embodiment, the system includes multiple interfaces to facilitate customer prospecting, including webpages which attract prospects and personalized customer portals. The webpages can be customized as prospects become customers. The personalized customer portals also are customized and directed towards inviting a customer to become part of a deal team.

Once a customer is part of a deal team, the system allows an administrator to fashion business rules, permission levels, security, tasks/milestones, document management, meeting scheduling, recording of meeting minutes, and deal management for the customer deal team members and internal deal team members.

Supervisors, deal managers and deal participants, with appropriate permission attributes, can utilize the system, for example, to obtain all pertinent information associated with a deal. A technical effect produced by the system includes managing and creating deal related documents once a prospective customer identifies a deal. For example, using the system a deal team can be identified, tasks can be scheduled and assigned, meetings can be scheduled, meeting minutes can be recorded and searched, and documents can be submitted for approval and associated with the deal. For example, a deal manager determines which aspects of a deal are shared with internal team members or external partners or clients. The deal manager or deal participants therefore can create a threaded discussion that is only viewable by internal team members.

The example system also provides flexibility and functionality so that different business entities within a company can support, streamline and standardize their deal processes. For example, task and library templates stored within the system allow the businesses to predefine the content management structures required for their unique business transactions and enable workflow unique to each business. In another example, a business unit configuration module enables each business to configure the system with customer interfaces to suit its business needs. The business modules allow a business to "turn on/off" different components of functionality, as well as predefine global deal visibility rules within the customer interface.

Another technical effect produced by the system is the digitization of transaction-based processes, which facilitates eliminating inefficiencies in handling and moving paper. Removing inefficiencies facilitates a potential revenue enhancement and an achievement of a competitive advantage by providing personalized transaction dealings with customers, and an ability to leverage a corporate knowledge base through digitized processes and resources. The system also facilitates productivity improvement for a company and its customers by enabling users to submit documents for approval, schedule meetings for specific deals, record minutes from those meetings, and search for recorded meeting minutes. Further gains are realized by providing a common technology platform throughout a company.

FIG. 1 is a flow chart 10 illustrating process steps for one example method for achieving a technical effect of tracking business and business prospects, and turning prospects into customers. Referring specifically to FIG. 1, a business profile for a business is created 12, after which a user identifies 14 prospects for the business. A business profile is a summary of information relating to a business including, but not limited to, a business name, a market name, a business address, a business telephone number, and a business type. Based on prospect information, a customized web page is created 16 for prospects. Prospective customers can access the web-page or create 18 a personalized portal where a prospect, which has been contacted earlier and has shown some interest, can become an authorized user of the system, and part of a deal team.

In the embodiment where a web page is created 16, the prospect views the web page, which contains customized information from an originator, and if the prospect shows an interest in any of the products in the prospect page, by selecting any of various links shown on the page, the system upgrades 20 the prospect to a customer. Based upon the initiated contact from the prospect, a customized customer web page, which includes content of interest to the prospect, is created and directed toward deal initiation. Alternatively, where the prospect is contacted through the personalized portal, and there is interest in deal making on the part of the prospect, the prospect is registered 22 as a user within the system.

Whether a prospect becomes a user via web page access or through contact and the development of a personalized portal, once the deal process has been initiated, deal tracking and processing is accomplished 24 using the system. Examples of products which are managed and processed using the system include, but are not limited to loans, leases, equity stakes and common equity. Examples within the loan category include construction loans, development loans, letters of credit, loan participation, revolver, senior loans, subordinated loans and U.S. tax exempt debt. Leases include single investor leases, leveraged leases, and off balance sheet loans. Equity and common equity further include equity, limited partnerships, limited partnership—tax credit deals, marketable securities, preferred limited partnerships, preferred stock, common stock, construction equity, development equity, and fund equity.

Set forth below are details regarding exemplary hardware architectures (FIGS. 2 and 3), an example process diagram illustrating various system capabilities (FIG. 4), example screen shots displayed by the example system to a user desiring to set up a profile for one of a number of businesses using the system (FIGS. 5-8), example screen shots displayed for facilitating preparation of templates for libraries and tasks (FIGS. 9-13), example screen shots displayed for deal creation and summarization (FIGS. 14-16), example screen shots displayed for set up of workgroups, companies, team members and their profiles (FIGS. 17-25), example screen shots displayed for creating, modifying, assigning and notification of tasks and milestones (FIGS. 26-34), example screen shots displayed for facilitating discussions and customer feedback (FIGS. 35-39), example screen shots displayed for preparation and maintenance of libraries (FIGS. 40-43), and example screen shots containing deal profiles and search capabilities (FIGS. 44-47).

Also set forth below are example screen shots for prospect and customer contact including personal portal interface web pages (FIGS. 48-49), prospect web pages (FIGS. 50-55) for facilitating prospect contact, a flowchart illustrating a document approval process (FIG. 56), example screen shots relating to the document approval process (FIGS. 57-68), a flowchart illustrating a meeting scheduler process (FIG. 69), example screen shots relating to the meeting scheduler process (FIGS. 70-75), a flowchart illustrating a meeting minutes search process (FIG. 76), example screen shots relating to the meeting minutes creation and search process (FIGS. 77-91), example screen shots relating to business and deal organization (FIGS. 92-97), example screen shots relating to the blackline integration function (FIGS. 98-101), example screen shots relating to the profile configuration function (FIGS. 102-113), and example screen shots relating to the reports function (FIGS. 114-119).

Although specific example embodiments of methods and systems for facilitating prospect contact and tracking of deals are described herein, the methods and systems are not limited to such specific example embodiments.

Hardware Architecture

Figure 2:
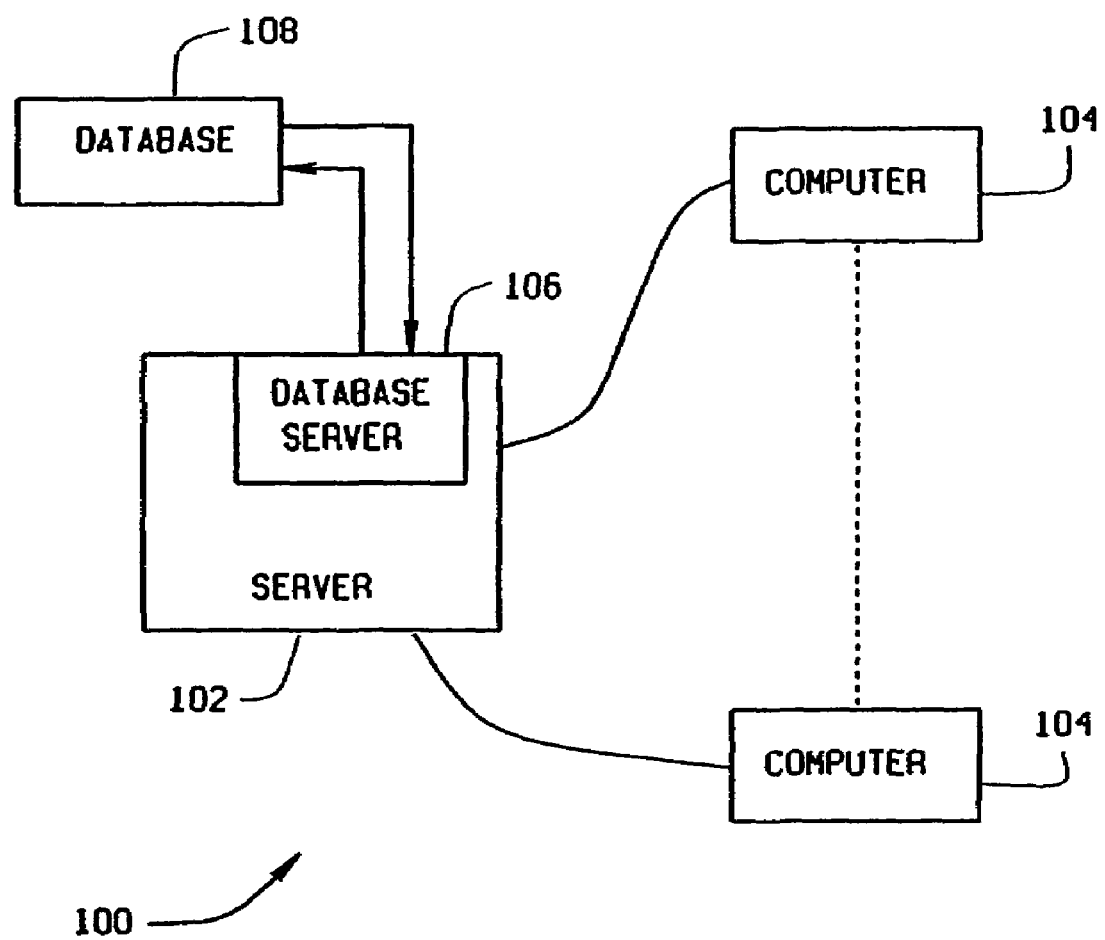
FIG. 2 is a simplified system diagram.

FIG. 2 is a block diagram of a system 100 that includes a server sub-system 102, sometimes referred to herein as server 102, and a plurality of customer devices 104 connected to server 102. In one embodiment, devices 104 are computers including a web browser, and server 102 is accessible to devices 104 via a network such as an intranet or a wide area network such as the Internet. In an alternative embodiment, devices 104 are servers for a network of customer devices.

Devices 104 are interconnected to the network, such as a local area network (LAN) or a wide area network (WAN), through many interfaces including dial-in-connections, cable modems and high-speed lines. Alternatively, devices 104 are any device capable of interconnecting to a network including a web-based phone or other web-based connectable equipment. Server 102 includes a database server 106 connected to a centralized database 108. In one embodiment, centralized database 108 is stored on database server 106 and is accessed by potential customers at one of customer devices 104 by logging onto server sub-system 102 through one of customer devices 104. In an alternative embodiment centralized database 108 is stored remotely from server 102.

Figure 3:
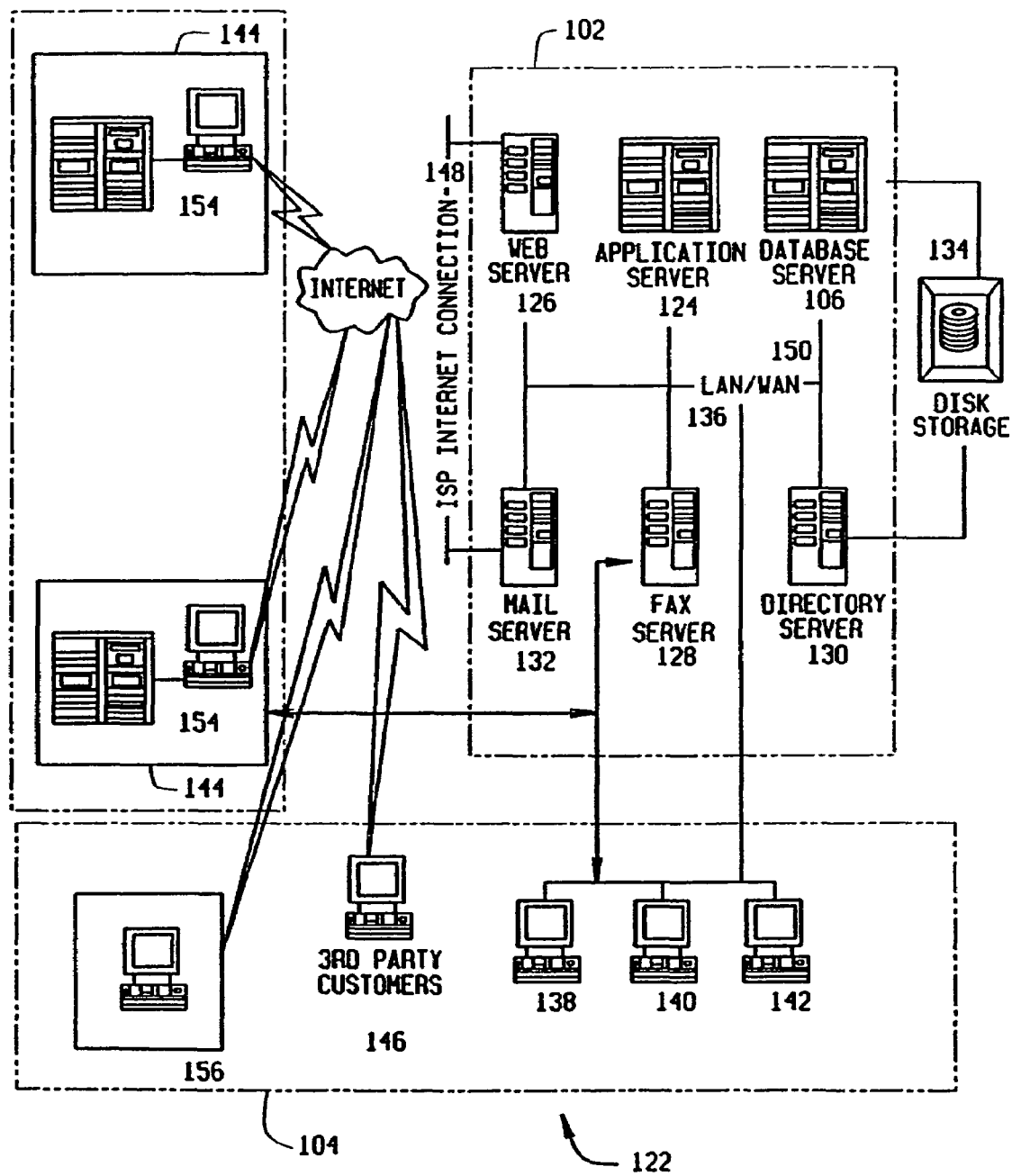
FIG. 3 is a diagram of a networked system.

FIG. 3 is a block diagram of a network based system 122. System 122 includes server sub-system 102 and customer devices 104. Server subsystem 102 includes database server 106, an application server 124, a web server 126, a fax server 128, a directory server 130, and a mail server 132. A disk storage unit 134 is coupled to database server 106 and directory server 130. Servers 106, 124, 126, 128, 130, and 132 are coupled in a local area network (LAN) 136. In addition, a system administrator work station 138, a work station 140, and a supervisor work station 142 are coupled to LAN 136. Alternatively, work stations 138, 140, and 142 are coupled to LAN 136 via an Internet link or are connected through an intranet.

Each work station 138, 140, and 142 is a personal computer including a web browser. Although the functions performed at the work stations typically are illustrated as being performed at respective work stations 138, 140, and 142, such functions can be performed at one of many personal computers coupled to LAN 136. Work stations 138, 140, and 142 are illustrated as being associated with separate functions only to facilitate an understanding of the different types of functions that can be performed by individuals having access to LAN 136.

Server sub-system 102 is configured to be communicatively coupled to various individuals or employees 144 and to third parties, e.g., customer, 146 via an ISP Internet connection 148. The communication in the example embodiment is illustrated as being performed via the Internet, however, any other wide area network (WAN) type communication can be utilized in other embodiments, i.e., the systems and processes are not limited to being practiced via the Internet. In addition, and rather than a WAN 150, local area network 136 could be used in place of WAN 150.

In the example embodiment, any employee 144 or customer 146 having a work station 152 can access server sub-system 102. One of customer devices 104 includes a work station 154 located at a remote location. Work stations 152 and 154 are personal computers including a web browser. Also, work stations 152 and 154 are configured to communicate with server sub-system 102. Furthermore, fax server 128 communicates with employees 144 and customers 146 located outside the business entity and any of the remotely located customer systems, including a customer system 156 via a telephone link. Fax server 128 is configured to communicate with other work stations 138, 140, and 142 as well.

In the example embodiment, system 122 utilizes known and commercially available computer applications, namely Venetica VeniceBridge™ 4.0 and FileNet® Panagon® Content Services, to provide access to disk storage unit 134 (VeniceBridge is a trademark of Venetica Corporation, Charlotte, N.C.; and FileNet and Panagon are registered trademarks of FileNet Corporation, Costa Mesa, Calif.). System 122 utilizes a baseline 4.0 release of VeniceBridge™ with a set of "hot fixes" to address scalability and performance.

System 122 also includes Enterprise Java® Beans (EJB) implemented on a Weblogic® 5.1 application server cluster consisting of eight containers on two Solaris® servers (Java and Solaris are registered trademarks of Sun Microsystems, Inc., Palo Alto, Calif.; and Weblogic is a registered trademark of Weblogic, Inc., San Francisco, Calif.). In addition to the EJB components, the VeniceBridge™ Services runs as a Java® RMI Server on each Solaris® platform and provides product configuration, licensing, and logging for the installation. Access to the Panagon® Content Services takes place on two Windows® NT servers running Panagon® Web Services (Windows is a registered trademark of Microsoft Corporation, Redmond, Wash.). The VeniceBridge™ Panagon® Bridge components are installed on these servers and run as four Windows® NT Services on each machine.

Figure 4:
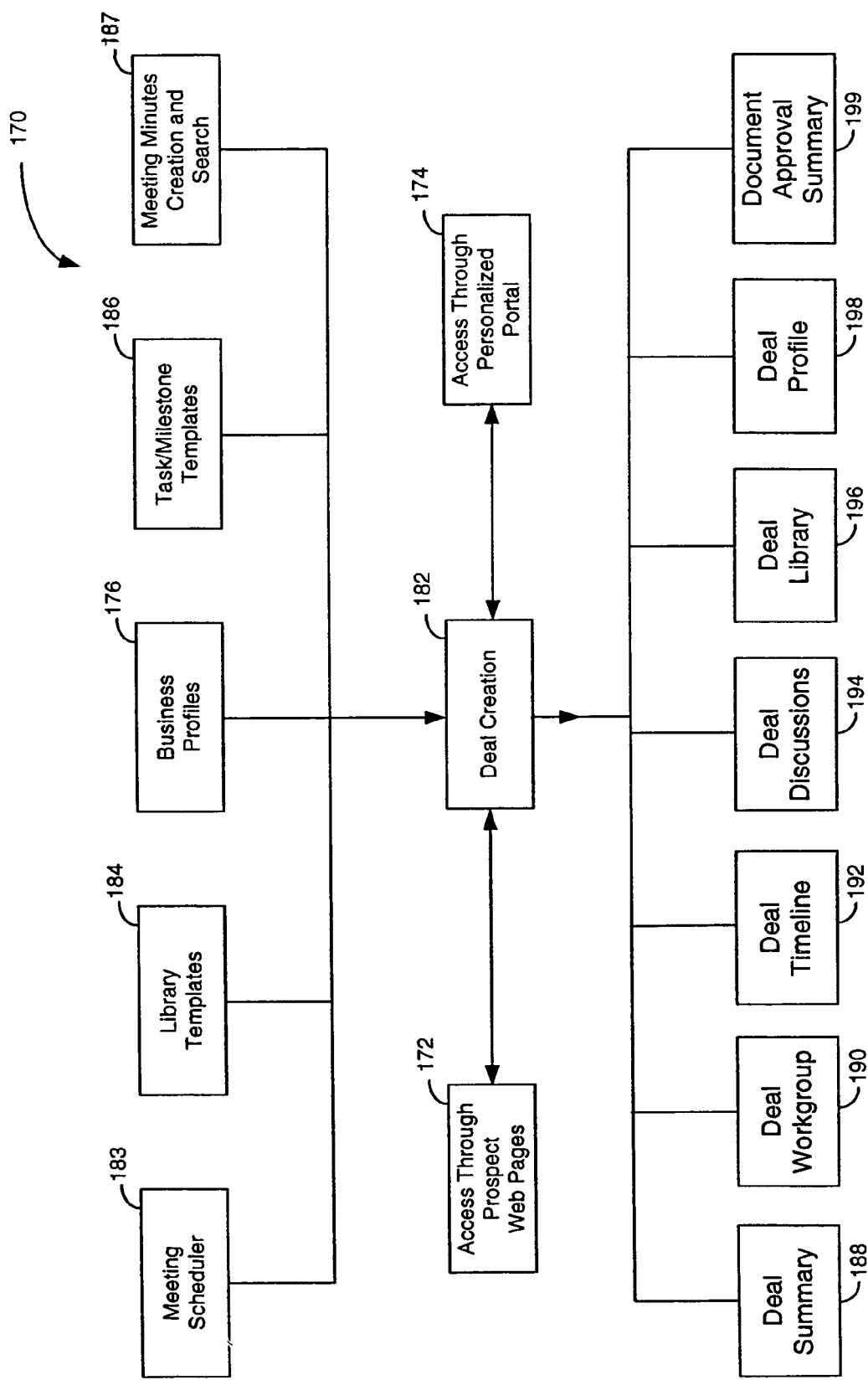
FIG. 4 is a diagram depicting a deal process.

FIG. 4 is a high level diagram 170 depicting a deal process through functionality of system 100. In one example embodiment, deal prospects access 172 system 100 through web pages configured to communicate potential deal solutions to those prospects. In another example embodiment, identified prospects are able to access 174 system 100 via a customized portal, specifically configured to attract that particular prospect to deal solutions. Once a prospect is interested in deal making, regardless of the initial interface used, deal creation, processing and managing follow a common process, which the prospect turned customer is included in as part of a deal team.

Business profiles 176 are a grouping of screens which are populated by an administrator, and provide internal and external users a path to a particular business or division for possible deal making. Tools used in creating a deal 182 include meeting scheduler 183, library templates 184, task and milestone templates 186, and meeting minutes creation and search 187. Library templates 184 provide suggested groupings of folders and sub-folders for storage of documents relating to a deal. Templates 186 provide suggested groupings of milestones, and the tasks and sub-tasks needed to complete each milestone. The milestones and tasks identified, populated using templates 186, provide a deal timeline. Templates 184 and 186 are described in greater detail below. User input into system 100 causes system 100 to create and save a deal. Creation of a deal within system 100 starts other system activity, including creation of a number of deal specific forms and screens (described below in detail), some of which are populated from further user input, others are automatically populated by system 100 using deal information, common to all deals, provided by the stored templates for the business and further providing a search functionality and a report generation capability.

In the example embodiment, meeting scheduler 183 (described below in detail) enables a user to view a calendar and activate schedule times for discussing deal 182. Meeting scheduler 183 also enables the user to view and print a meeting schedule, a meeting summary, and documents requested for approval by at least one of a selected date and a selected deal. Meeting scheduler 183 also enables the user to add a meeting relating to a deal to a schedule. In at least one embodiment, meeting scheduler 183 also enables the user to generate and store minutes from a meeting.

Meeting minutes creation and search 187 (described below in detail) enables a user to create minutes for a meeting and search existing meeting minutes from database 108 (shown in FIG. 2). The user is enabled to search for minutes from a meeting by searching on at least one of a deal name, a company name, a last modified by user, a last modified by date, a division, and a reviewer criteria.

In one embodiment, a deal summary 188 is a screen (described below) which includes all pertinent, deal specific information in a snapshot overview. The overview contains at least one of a deal name, a customer company name, a deal summary timeline, a summary of deal activity and contact information for key deal team members.

Deals are created using a create deal function which is, in one embodiment, accessible from any screen. Selecting the create deal function presents to the user a screen which is configured to allow a user to create a workspace for a new deal. A series of screens, through which a deal is created, captures information about the deal that will be displayed in the workspace for the deal.

One example screen, a briefing page, described below, provides a listing of all deals (with key summary information) that a user has permission to view and is the first screen presented to a user, who is a member of at least one active deal team, after a successful login. A user is able, in one embodiment, to access the briefing page from any screen.

A deal workgroup 190, also known as a deal team, is a grouping of screens (described below) which show information about companies and employees involved in a deal. Any user added to the workgroup can be involved with notifications, discussions and content items added to the deal. In one embodiment, companies are listed in the workgroup with deal team members listed below each company the team member is associated with. Companies and users that are involved in the deal are added through a deal team page, described below. Information captured about a company that is part of the deal team includes the company's role in the deal, the primary contact for the company and may include the team designation for the company (internal or external). Information captured about a user that is part of the deal team includes the role of the user in the deal.

A deal timeline 192 is a grouping of screens (described below) which contain milestones and tasks for current deals. The milestones, tasks and sub-tasks that belong to each milestone are added to the deal timeline based on the default task template assigned to the current deal. Additionally, system 100 allows a deal team member to input customer request dates and add ad-hoc tasks to the deal when necessary. Information displayed includes the milestones for the current deal, current due dates and actual completion of each milestone, and tasks and sub-tasks required to complete each milestone through assignment and management of the tasks.

Deal discussions 194 are a grouping of screens (described below) whose functionality provides for the exchange of ideas and concerns among deal team members and in one embodiment includes a voice of the customer feedback screen grouping.

A deal library 196 is a grouping of screens through which a content repository for the current deal is obtained. A folder structure for the current deal is based on the default library template assigned to the current deal providing the ability for deal members to categorize and store content (i.e., documents) related to the deal. Content added to library 196 can have attributes assigned to give only specified users or groups permission to access the item. Users with proper attributes can browse deals within the library and all relevant content. Documents within the library can be viewed along with metadata about the document stored in an "index card." The "index card" is a further grouping of screens (described below) which provide functionality to access and search libraries. Two levels of security exist in one particular embodiment, Folder permissions and Document permissions.

A deal profile 198 is a grouping of screens through which information about a deal is captured, including, but not limited to, profile, product, volume, and dollar amounts giving deal team members further insight into the particulars of a deal. Deal profiles are customizable for individual companies.

A document approval summary 199 is a single screen that is accessed by a user to understand an approval status of documents requested for approval within a deal. In the example embodiment, a screen (described below) includes all documents requested for approval by a user in a snapshot overview. The overview screen displays at least one of a deal name, a document name, a document version history, a document approvers history, a document version number, a type of document, an approval status, a last modified date, and an approval requested date.

Example Viewable Screen Shots

To implement the above described system, many variations of particular viewable screens can be utilized. The following screen descriptions refers to one set of screens that can be used for prompting necessary inputs for deal creation and maintenance and review of deal data stored within system 100. Variations of such screens are possible.

Create/Modify Business Profile

FIGS. 5A and 5B show an example screen shot of an electronic business profile form 200, located within database 108 (shown in FIG. 2) of system 100 (shown in FIG. 2). Business profile form 200 is one screen, displayed to an administrator user, allowing definition of feature lists, deal visibility rules, and header graphics for the administrator's business unit. In one embodiment, only one business profile form 200 is allowed for each business, however the business administrator has the ability to set up and maintain their own business's structure. The business's name of the login administrator will be displayed below a form title. In one embodiment, only one header graphic is allowed for each division, and the default division header is the header for the business that the division is in. The administrator has the option to select any of the check boxes to turn features "on and off" for each business and can define the divisions and sub-division within each business. System 100 does not limit the number of divisions and sub-divisions that can be created. Each authority level is set at both the business and division level and permission at a division level over-rides permission given at the business level. In one embodiment, each business, division and sub-division level has three authority levels: User, Manager and Administrator. The administrator is required to define the deal permissions for each authority level. (i.e., who can Create a Deal).

Included in business profile form 200 are a name of the business, which defaults to the business's name for the login administrator, a go to Market Name which is a name that the business will display on customer facing screens, and header graphics for the business, which in one embodiment is an image file. A Meeting Scheduler/Meeting Minutes check box is configured to be selected by the administrator if the users in the business are to be permissioned to utilize the Meeting Scheduler/Meeting Minutes functionality.

A Document Approval check box is configured to be selected by the administrator if the users in the business are to be permissioned to utilize the Document Approval functionality. A Personalized Portal check box is configured to be selected by the administrator if the users in the business are to be permissioned to utilize the Personalized Portal functionality.

A Deal Groups check box is configured to be selected by the administrator if the users in the business are to be permissioned to assign companies to one of three defined groups: Company Group, Customer Group, and Other Group. These groups can then be permissioned on content.

Deal Visibility (Division/Sub-Division) in one embodiment, are selection options where an administrator is able to configure system 100 to control what information users in the business can see. Selecting across business allows a user to see information across the business, as opposed to only the division or subdivision the user belongs to. Deal Visibility permissions are assigned and associated to the three default authority levels (User, Manager, Admin) and if they can View/Modify active deals and/or view Closed/Lost deals.

In one embodiment, system administrators have the option to grant permissions associated to some features for each user authority level. Permission which may be granted include, but are not limited to, permission to create new deals. Timeline Task Template Create/Modify which, if selected is an ability to create new or modify existing timeline task templates, Task Template View which is permission to view all timeline task templates across all divisions within the business and Task Template Delete which is permission to delete timeline task templates across all divisions within the business.

System administrators also have the option to define permissions for library templates. Create/Modify, if selected, is a permission to create new or modify existing library templates. Library Template View, if selected, is a permission to view all library templates across all divisions within the business and Library Template Delete, if selected, is a permission to delete existing library templates.

System administrators further have the option to define permissions for searches of deals and documents. If selected by an administrator, a user may to search all deals within the business and all documents within the business that the user has permission to view.

System 100 includes an additional authority level referred to as a Business Superadmin. Particularly, system 100 includes four authority levels, the three discussed above: User, Manager, and Administrator, and in addition the Superadmin. The functionalities of User, Manager and Administrator remain the same. A Superadmin user has all permissions of a normal Administrator user, and also has the ability to delete Divisions, Deals, Companies, and Users from system 100. A Superadmin user also reorganizes business structure, maintains drop-down lists, configures a Deal Profile page (shown in FIG. 44), and creates Milestone Templates. Business Superadmins are also able to access Confidential Deals. Business Superadmins users are managed in the same fashion as other system users are managed. Initial Superadmins for each business are created on installation of system 100; Superadmin passwords are initialized in the same fashion. Superadmins have the ability to create any type of user in system 100, including other Superadmins.

FIG. 6 is a hierarchy list on a Business Hierarchy screen 220, displayed to an administrator user, which defines corporate structure for the business. In one embodiment, the list is structured upon an administrator's first and subsequent configurations. An administrator can create new divisions and subdivisions and modify existing divisions and sub-divisions in the list. The business's name of the login administrator is displayed above the hierarchy list. In one embodiment, rules followed include that a sub-division can be created within only one division, there is no limit with the number of divisions and sub-divisions that can be created for each business and Division and Sub-Divisions cannot be removed once they are created.

FIG. 7 is a Create Division Profile screen 230 which is displayed when a user selects to create a business division (shown in FIG. 6). Division Profile screen 230 is used to capture detailed information of the selected division within the business as input by a user, including a name which is unique within the business. Header graphics are inherited from the business, but can be changed and in one embodiment, only one header graphic is allowed for each division. Permissions set on this page can be set at the division level and sub-division level.

Included in screen 230 is a Division Name, which is unique within the business, a Go to Market Name for the division, which defaults to the business name unless otherwise indicated, a Header Graphic inherited from the business and deal visibility levels which define deal visibility permissions associated to three authority levels (i.e., Admin, User, Manager) created for the new division. The administrator defines the deal visibility permissions associated to the three business levels created for the new division. Each business group within the division uses the division name once the administrator enters the name.

A Modify Division Profile screen (not shown) is used by the Administrator to modify the detail information of the selected division within the business.

FIG. 8 is a Create Sub-Division Profile screen 240 which is displayed when a user selects to create a business sub-division. Create Sub-Division Profile screen 240 allows a capture of detailed information of the selected sub-division within the business. A division name is displayed which is based on the division selected on Business Hierarchy form 220. A sub-division name is unique within a division and header graphics are inherited from the division upon creation, but can be changed. Only one header graphic is allowed for each sub-division. A Go to Market Name for the sub-division defaults to the division name otherwise changed.

A Modify Sub-Division Profile screen (not shown) is used by the Administrator to modify the detail information of the selected sub-division within the business.

Library Templates

FIG. 9 shows an example embodiment of a Library Templates screen 260. Library templates are configured to enable businesses to create customized library folder structures to be associated with a deal at the time of creation. Library templates promote consistency across deals and save a considerable amount of effort to setup a folder structure. In one embodiment, users have at least View Library Template permission to access screen 260. Again referring to screen 260, Library Templates screen 260 is configured to allow the user to view all library templates for the business. The user can also see other summary information such as who created or modified a template and when. Finally, users with permission can opt to remove a template, create a new one, or select the default template for each division. In one embodiment, library templates default to the division level, therefore a default template for each division is created, which are not seen across businesses. Users can have one of view or modify template permission.

FIG. 10 is an example embodiment of a Create/Modify Library Template screen 280. Screen 280 is configured to capture information for a library template. Users provide summary template information to define the template attributes before defining the actual folder structure for the template. Library template names are unique within each division and in one embodiment, only users with Modify Library Template permission may modify screen 280, which is done by selecting a parent folder on screen 280 for the new folder the user is creating. Removal of a folder will cause removal of all of its subfolders.

FIG. 11 is a Create/Modify Library Template Folder screen 300. Screen 300 is configured to allow a user with proper permissions to define or modify a template folder's attributes and permission groups on the template folder. For example, in one embodiment, a folder can only have one parent folder and if a folder is marked as an Inherited Folder, all files placed in this folder will inherit the permissions of the folder. In another embodiment, if a folder is marked as a Company Folder, the sponsoring company business users automatically have permission to access the folder. A Parent Folder name is automatically defined from the previous create /modify library template. Default Permission Information is visible if "Deal Groups" is selected in the Business Profile (described above in FIGS. 5A and 5B).

Task Templates

A Task Templates application allows businesses to define templates comprised of milestones, tasks and sub-tasks to be used throughout the deal process thereby allowing a consistent approach to deals and helping team members monitor the progress of the deal. Default templates are defined for each business, division or sub-division allowing appropriate templates for each deal, typically the first template created. FIG. 12 is an example view Master Template List screen 320 which displays a list of the templates that are available to the current user. Master Template List screen 320 is configured to display a list of the templates that are available to the current user. If a user has modify permission, they may create a template from scratch or base it on a single existing template. A user with delete permissions will also be able to remove templates from the listing. A user with View permission will only be able to view details about the given templates. Users outside of the company are not, in one embodiment, able to access screen 320.

Templates are displayed either across the business (i.e., for every division) or for a single division or sub-division depending upon the configuration of the Business Profile (shown in FIGS. 5A and 5B). In one embodiment, once a template is modified or removed there is no undo feature although the user is sent a message to verify that the user is changing the default template. Sorting of the template defaults, in one embodiment, is alphabetical by division and then by template name. Also included is the name of the user who last modified the template and the date the template was modified. Documents that are associated at the task template level are downloaded, modified, and uploaded to a Deal Library. Screen 320 displays a "Divisions to View" drop-down list that enables a user to display templates by divisions.

Screen 320 also includes a Create Business Template button and a Create Division Template button. System 100 is configured to create structured reports for Milestones within system 100. The module within system 100 named Master Templates allows a Superadmin user to define various Milestones to be reported against. For example, first, a user creates a Business Master Template. The Business Master Template is then used as the basis for a Division-specific Division Master Templates. These Division Master Templates are then selected during a Task Template creation process to provide the structure in Task Templates. After creating the Task Template by including a required, non-editable Division Master Template, the Task Template has a structured standard as well as allows ad hoc Milestones, Tasks, and Subtasks to be created. A reporting tool then accesses a particular deal's Task Template, which includes a Division Master Template, and extracts the reporting information that is required.

Figure 13:
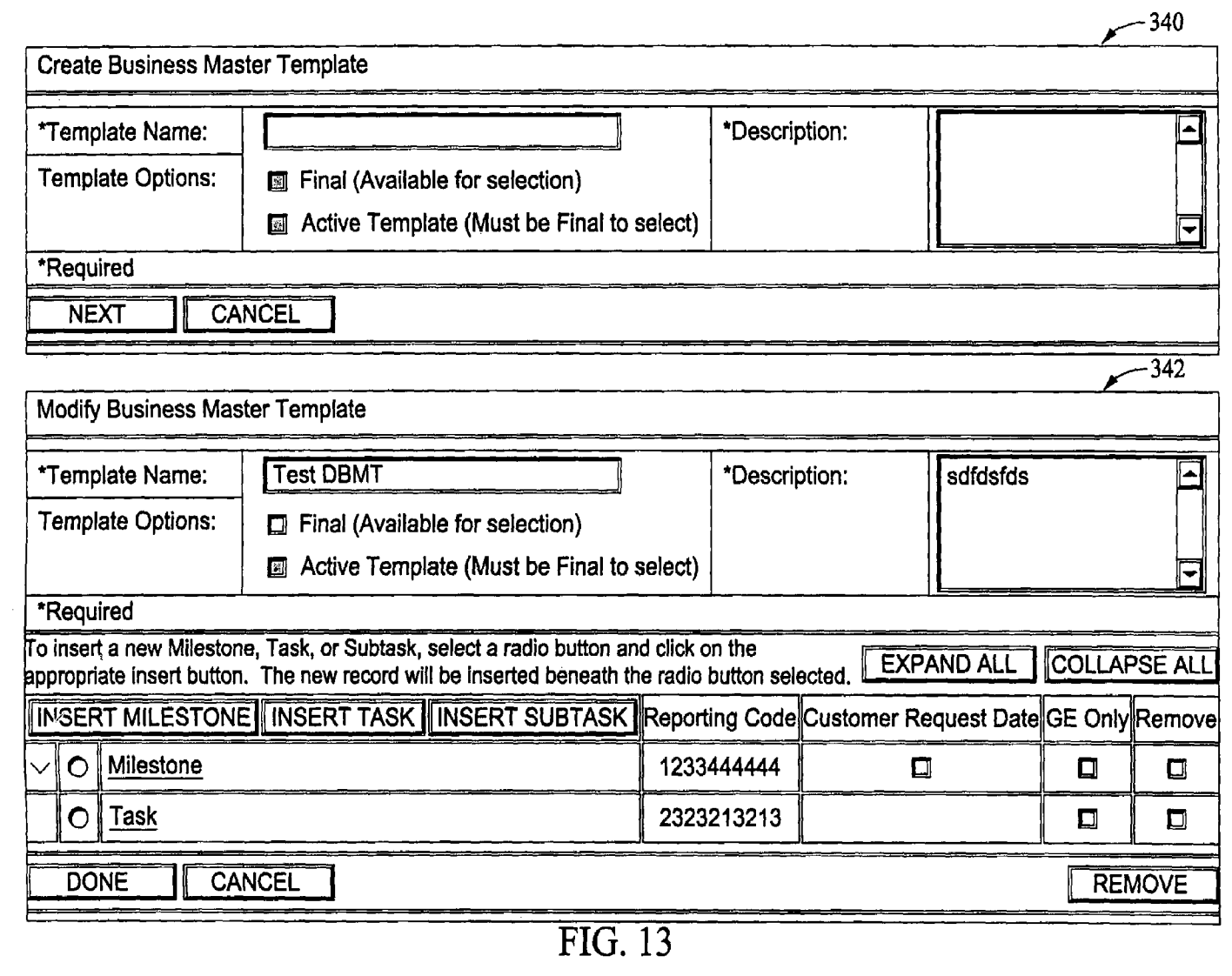

FIG. 13 is a Create Business Master Template screen 340 and a Modify Business Master Template screen 342. Screen 340 displays a Template Name field, a Template Options section, a Description data box, a Next button, and a Cancel button. Screen 340 enables a user to create a Business Master Template listed on screen 320 (shown in FIG. 12). Modify Business Master Template screen 342 is a template which allows users to add milestones, tasks, and sub-tasks to a template and to set the appropriate properties, including whether or not a task/sub-task is hidden or omitted, and type of task. All milestones/tasks/subtasks are visible to all company users and those users have the ability to hide milestones/tasks/sub-tasks from the customer. In one embodiment, only users with modify permissions can create/modify milestones/tasks/subtasks which may be ordered. Tasks are associated with milestones and sub-tasks are associated with a task. Documents associated to tasks in the template reside in a Resource Center (not shown). Screen 342 includes an Insert Milestone button used to add a milestone to the template, an Insert Task button used to add or modify a task to the template, and an Insert Subtask button used to add a subtask to the template.

In another embodiment, system 100 includes a plurality of Modify Business Master Template screens that display various information for a user or prompt a user to enter various information into system 100. System 100 also includes Create Division Master Template screens and Modify Division Master Template screens that enable a user to create and modify Division Master Templates.

Deal Creation

Figure 14:
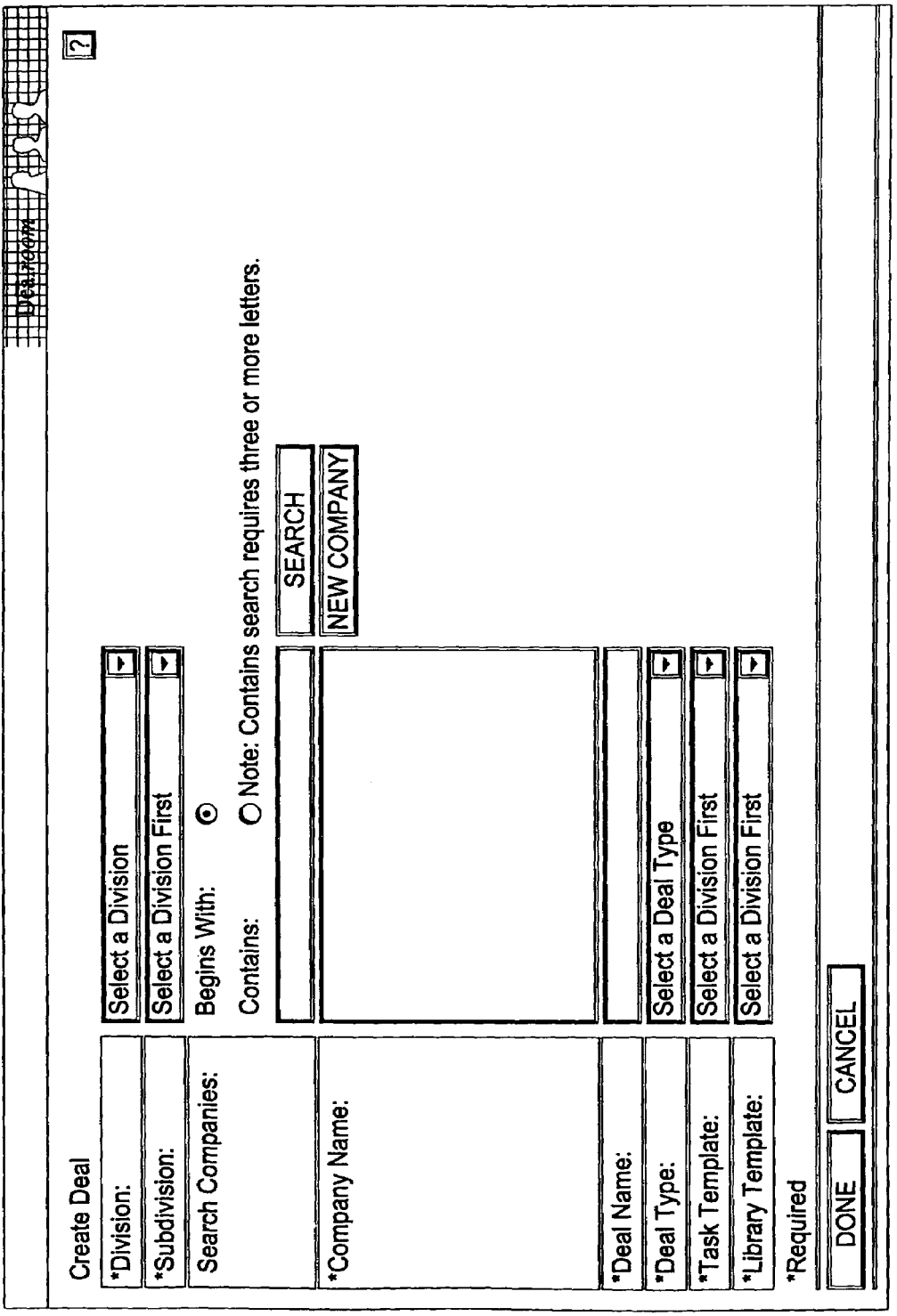
FIG. 14 is an example create deal screen.

A deal management section includes functionality that is available only to those team members who have the ability to create and modify a deal. FIG. 14 is an example embodiment of a Create Deal screen 360 used by users, with proper permission attributes, to create new deals. To create a deal, users are able to select a Library Template when creating a deal but, in one embodiment, cannot change or combine Library Templates within a deal. In another embodiment, users are able to select a Task Template when creating a deal but are not able to change or combine Task Templates within a deal.

Screen 360 includes a Begins With radio button, a Contains radio button, and a textbox for the string that will be used either in a sub-string search or a prefix search. Screen 360 also includes a list box populated with companies, an input box for deal name, a Task Template drop-down list, and a Library Template drop-down list. Selection of a create button causes system 100 to create a new deal using the selected timeline and library templates, causing creation of deal screens as further described below.

Deal Summaries

FIG. 15 is an example embodiment of a Deal Summary screen 380. Deal summary screen 380 displays deal specific information for a deal. Screen 380 displays four different sections of deal information to allow the user to quickly determine status of a deal. The first section provides general information on the deal including creation date and contact information. The second section provides a timeline summary listing milestones, current status, customer request date, current due date, and actual completion date. The third section provides a meeting summary that includes meeting dates and directs the user to a meeting minutes data page (discussed below) which enables a permissioned user to display minutes from a selected meeting. The fourth section provides a deal activity summary of all notifications tied to the time horizon including a task notification which occurs when a task is initially assigned to a user, reassigned to a user, due date is changed, notices of upcoming due date, and past due notices. Also included in the deal activity section are document notifications which occur when a new document that a user has permission to access is added, a document that the user has been subscribed to changes, and a document that a modifier specifically selects to notify the user of the change. Further, a discussion notification occurs when a new discussion is created or a discussion that the user has subscribed to is changed and also system generated notices which includes new team members, new group permission, and changes to permission notices. Also included in the deal activity section is an alerts section. Also, screen 380 may display a document approvals section. Deal Summary screen 380 also includes a Return to Search Results button that enables a user to return to a previous search results page.

FIG. 16 is a Deal List screen 400 configured to allow a user to access a complete listing of the deals that they have permission to view. In the embodiment shown, a listing includes company names, deal names, divisions, deal status, a team leader and a deal creation date. From screen 400 the user is able to select a deal and view a deal summary (described in FIG. 15) and drill-down for additional details. Alternatively, the user can select a company and further select from deals for the selected company for the additional details. Screen 400 displays a "Division/Subdivision to Filter on" drop-down box which enables a user to filter deals based on a Division/Subdivision. System 100 is configured to save as a preference a user's filter selections until the selections are changed. This function applies to all screens except for the Search screens.

Deal Workgroup

Figure 17:
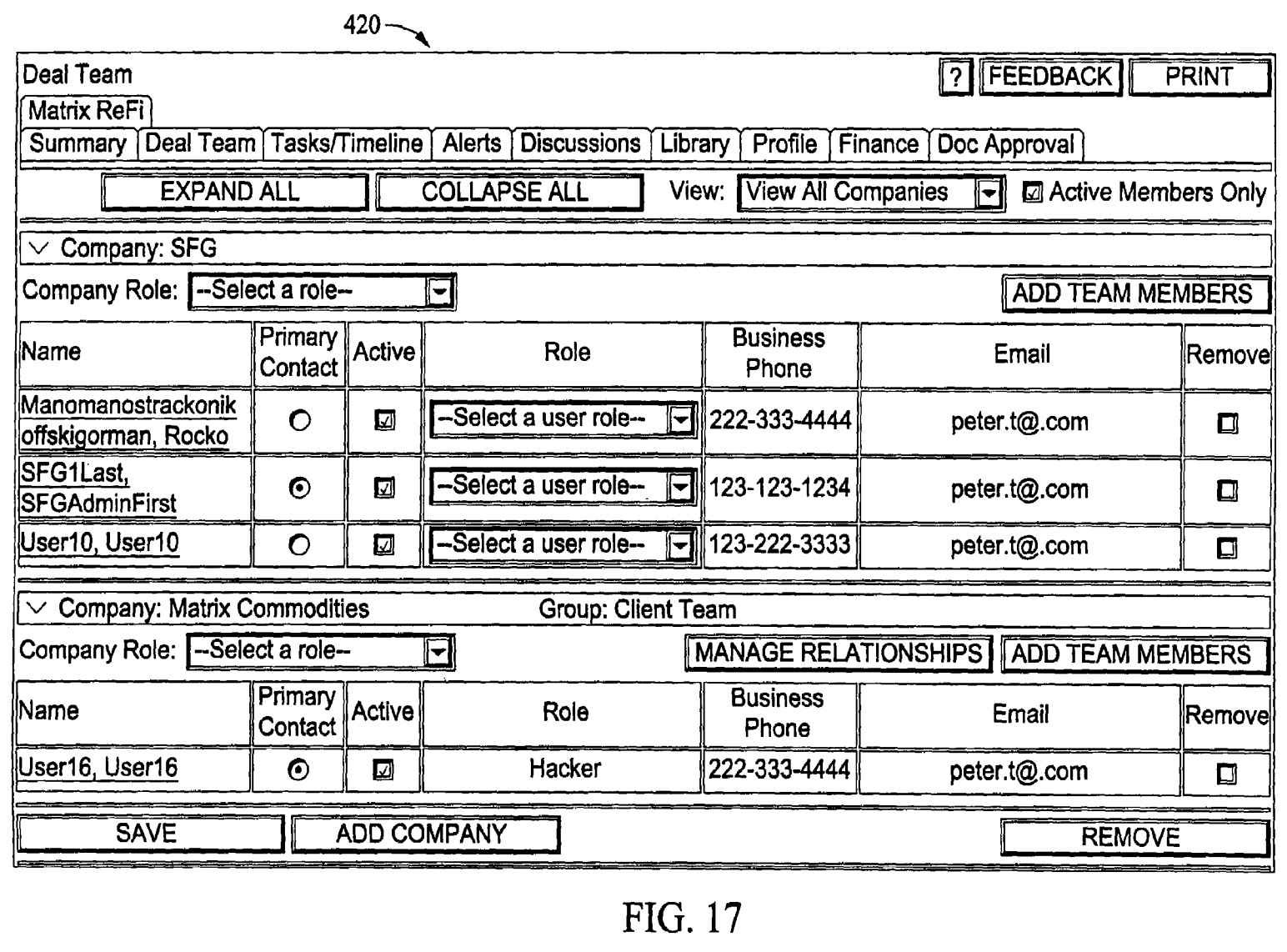

FIG. 17 is an example Deal Team or Work Group screen 420. Screen 420 is configured to allow the user to select, view and manage the companies and users involved with a specific deal. Companies and their users, and roles for each user can be added to the deal through screen 420, along with identifying a primary contact for the company. User can also be removed from the workgroup by selecting a remove checkbox for the user. Electronic mail can be sent to one or more users, in one embodiment, by selecting a displayed e-mail address on screen 420. Any user added to the work group can be involved with notifications, discussions and other deal items. In one embodiment, companies are listed on screen 420 with their deal team members listed below. Screen 420 provides a business with an ability to maintain information on customers and third party members within the deal and track immediate roles of people throughout the deal process. In one example embodiment, company roles for the deal may include, but are not limited to, advisor, agent bank, appraiser, arranger, broker, charterer, consultant, contractor, developer, equity investor, fuel supplier, general partner, guarantor, intermediary, issuer, legal counsel, limited partner, off-taker, operator/manager, other businesses, senior lender, sponsor, steam host, syndication agent, utility, vendor, capital markets, equity external counsel, intermediaries/agent, co-investors, co-investor's legal counsel, company, company's legal counsel, and other consultants.

User roles within one example embodiment include, but are not limited to, capital markets, environmental, finance, insurance, leasing support, legal, origination, lead originator, portfolio, support, technical, underwriting, lead underwriter, MD, deal manager, team member, research, legal, risk, finance and accounting, tax, quality-strategic partnership, quality-operations consultant and investment committee. In one embodiment, screen 420 includes a View drop-down list and an Active Members Only checkbox which enable a user to view active, non-active, or disabled deal members. Additionally, screen 420 includes an Active check box after each listed Deal Team member. If a Task has not been completed and an Owner of the Task has been deactivated, system 100 is configured to remove as the Owner those persons that have been deactivated. If the Task has been complete, then the Owner remains as is. If, however, the Task is modified by another user, then the user must select a new Owner.

Deal Team screen 420 also includes a Summary tab, a Deal Team tab, a Tasks/Timeline tab, an Alerts tab, a Discussions tab, a Library tab, a Profile tab, a Finance tab, and a Document Approval tab. These navigational tabs are common to system 100 and appear on multiple other pages throughout system 100. In an alternative embodiment, these common navigational tabs appear at the top of the pages and at the bottom of the data on the pages facilitating the navigation of system 100 by a user. In another embodiment, a scroll function is provided on these pages which facilitates access to the navigational tabs, and thus, facilitates the navigation of the pages within system 100.

FIG. 18 is an example of a Select Company screen 440. Select Company screen 440 lists the companies a user can add to a deal, as described in FIG. 17 above. Only one company may be added at a time. If a company is not listed in the list box, a user may create a new company profile by navigating to the Create Company page. Upon selection of a company, and in one embodiment, the user is automatically directed to a company relationships page (described in FIG. 19). Only users with Modify Deal permissions are able to access screen 440 and only users with Create Company permissions have the New Company button appear. In one embodiment, screen 440 displays all the letters of the alphabet that will be used to quickly populate the Company Name selector box.

A Company Relationships screen 460 is shown in FIG. 19. Company Relationships screen 460 allows an authorized user to give permissions to new companies in relation to other companies on a deal. In one embodiment, the user can select whether or not the new company will be able to see the other companies within the deal workgroup. A selected box on screen 460 indicates both companies will be able to see each other in the deal. The user can also select a workgroup to place the company into thereby setting a permission level on all deal items equivalent to that of the selected group. In one embodiment, only company team members are able to access screen 460.

Figure 20:
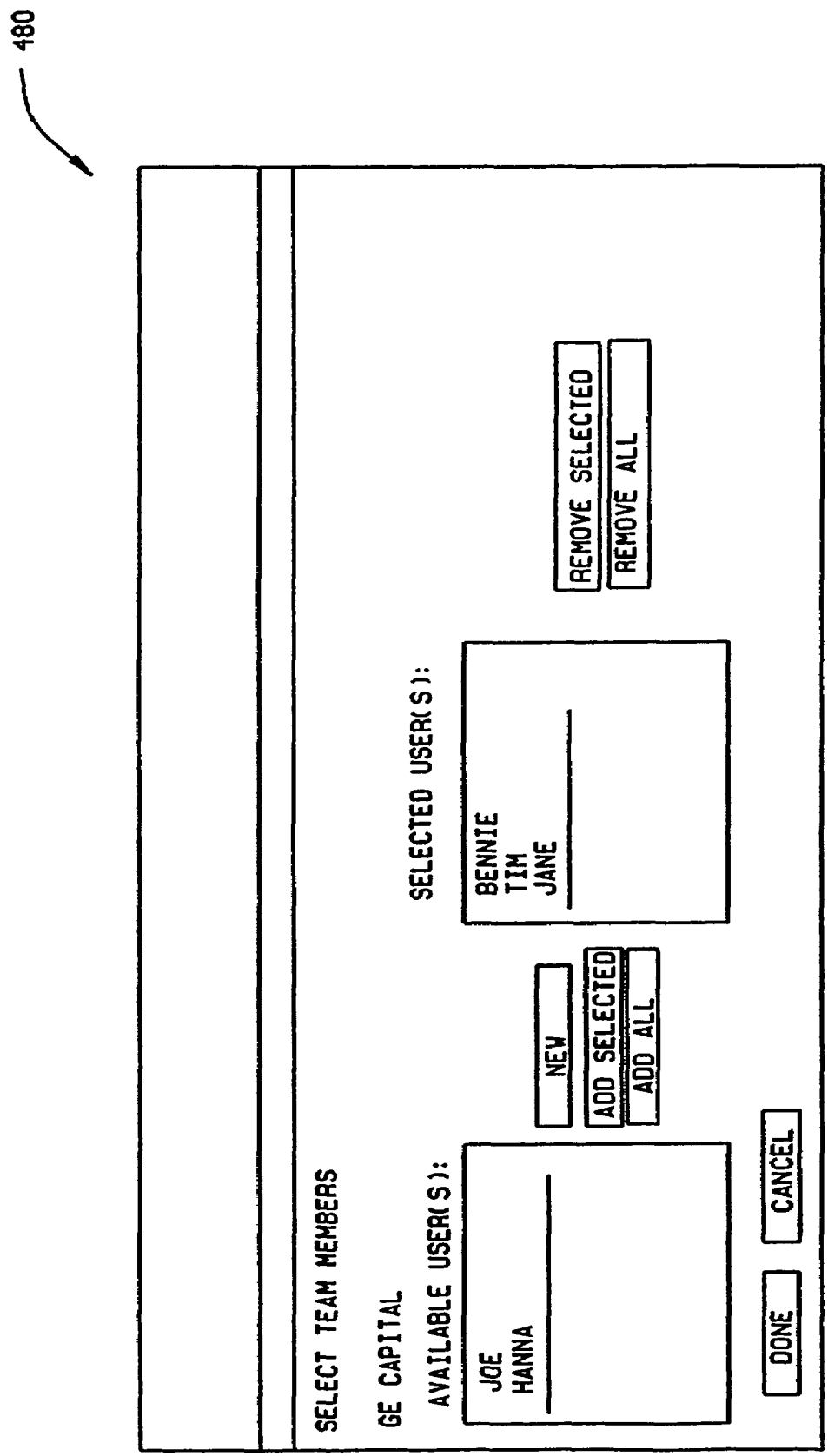
FIG. 20 is an example select team members screen.

FIG. 20 is a Select Team Members screen 480 which facilitates adding new users to a deal team. A New button is displayed, in one embodiment, for users who have permission levels to create new users for a specified company. Names appearing in the Selected box when the Done button is selected will be added to the deal. Screen 480 is also configured to facilitate deletion of team members.

Selection of team members for a deal necessitates knowledge of the possible team members. FIG. 21 is one embodiment of a My Profile screen 500 which is available to all users, and provides information on the individual profiled. Screen 500 allows all users to update existing profile information and other administration details. Managers and administrators at different levels (division, sub-division) are contemplated.

Fields included within the example embodiment of My Profile screen 500 shown in FIG. 21 include the user's first name, last name, job title, user role, employing company, user type, business phone number and extension if applicable, a cell phone number, a fax number, and an e-mail address. Further included are multiple address fields, a personal access code, and a time zone entry. In one embodiment, screen 500 enables a user to select their own User Role from a dropdown list. The User Role selection entered on screen 500 will populate the corresponding User Role on Deal Team screen 420 (shown in FIG. 17). In another embodiment, screen 500 enables a user to select a delegate to act on their behalf with respect to approving documents.

FIG. 22 is an embodiment of a User Profile screen 520, which is available to users that have Modify User Profile permission. Screen 520 allows a user to add new users to a company including each of the company businesses and edit all existing users for companies that the user has permission to see. A check box is included to disable user logins, and a users password may be reset from screen 520. The other fields are the same as in My Profile screen 500 (shown in FIG. 21), including being able to select a User Role from the User Role drop-down list. Users in external companies are only able to add users to their company space. In one embodiment, User Profile screen 520 also enables a user to select a delegate to act as a delegate with respect to approving documents. The list of delegates is then stored in the user profile.

Screen 520 also includes a Disable Login section. In the example embodiment, if the disable checkbox on screen 520 is checked, a disabled user will be unable to log into system 100. If unchecked, an enabled user has full access to system 100. A disabled user can be further designated as a Temporarily or Permanently Disabled user. If Temporarily Disabled, a user can later be granted permission to access the system.

FIG. 23 is a User Profile Pop-Up window 540 which shows a deal member's user information. The user information displayed is that described above when adding users to a deal within system 100. When a deal member's name is selected, window 540 is displayed in front of the existing deal workspace, so that user information can be accessed exclusive of the deal pages. Window 540 cannot be edited, in the embodiment shown.

A Company Profiles screen 560, shown in FIG. 24, is only available to users that have Create/Modify Company Profile permission. Screen 560 allows a user to edit profile information for current companies and add new companies and is accessible from both Create Deal screen 360 (shown in FIG. 14), via the Create New Company button or from a Company Selector screen (not shown). Only company users are able to navigate to screen 560 to create and modify company profiles. Any company records are grouped with the Business and Division for which they are created.

FIG. 25 is a Company Profile Pop-Up window 580 which shows company contact information, for example, address, telephone and e-mail for a company in a deal workgroup. When a company's name is selected, window 580 is displayed in front of the existing deal workspace, so that company information can be accessed exclusive of the deal pages.

Deal Timeline

Figure 26:
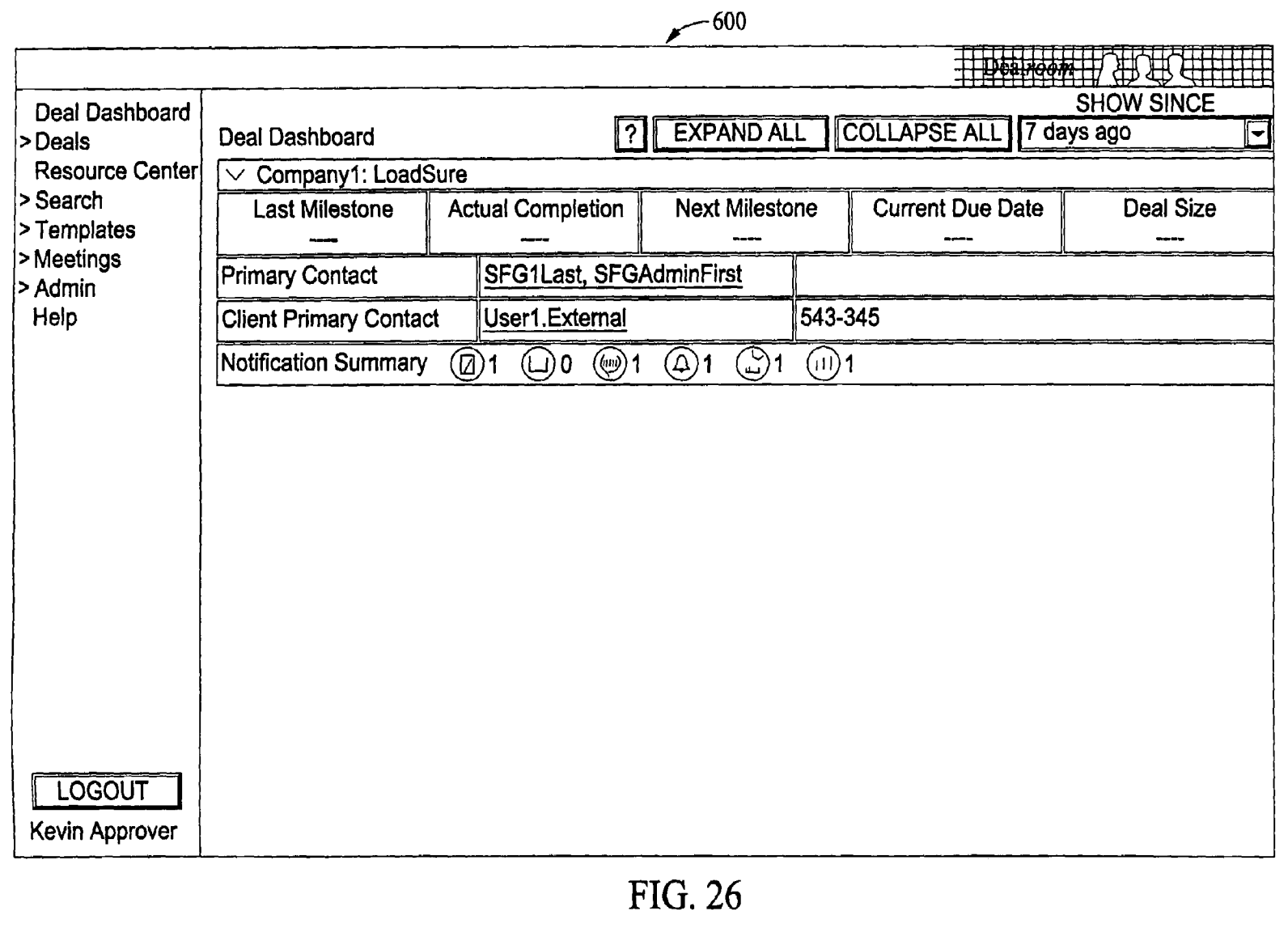

FIG. 26 is an example of a Deal Dashboard screen 600. The Deal Dashboard screen 600 displays an aggregate view of deal information for all active deals that the user is an active deal participant on. The information displayed as part of the dashboard is intended to provide a deal participant with a quick overview of deal status and activity. The channel includes high-level summary information for each deal. In the embodiment shown, the defaults are last milestone with actual completion date, next milestone with current due date, primary contact, client primary contact with phone number, deal size, and notification summary (including icons). Milestones displayed on Deal Dashboard screen 600 are noted on a task template. Milestones that are hidden on the task template will not appear for users outside of the company.

Included on Deal Dashboard screen 600 is a Time Horizon which allows a user to decide which time horizon to use to display task notifications. In one embodiment, time horizon is defaulted to the time horizon of the last user login. In another embodiment, values for the time horizon are one, seven, fourteen, thirty days, and All. An expand all button expands all deals in the channel. A collapse all button collapses all deals in the channel. An expand/collapse arrow expands or collapses detail information for a particular deal.

Further included on screen 600 is Company/Deal Name which indicates the names of the company and the deal. A user must be an active member on the deal team to have a deal appear on their briefing page. Selecting the primary contact link allows a user on the deal team to view the company primary contact, whose name is a hyperlink to the lead's profile and their telephone number. Further included is a customer primary contact whose name is a hyperlink to the lead's profile list and their telephone number. Regarding the deal included on screen 600 is a deal size including a currency value that represents how much the deal is worth, and outstanding tasks of the user, which is a total of all outstanding tasks as of that day, not marked as completed that has been assigned to the user.

A Task Icon on screen 600 is a link to a Deal Summary screen (described in FIG. 15). Numbers in parenthesis are a total of all new tasks assigned or changed that the user is associated with and is tied to the time horizon. A Document Icon is also a link to the Deal Summary screen. The number in parenthesis is a total of all new documents assigned or changed that the user is subscribed to and is tied to the time horizon. A Discussion Icon is also a link to the Deal Summary screen. The number in parenthesis is a total of all new discussions assigned or changed that the user is subscribed to and is tied to the time horizon. An Alert Notification Icon is also linked to the Deal Summary screen. The number in parenthesis is a total of all new system-generated notifications that the user is associated with and is tied to the time horizon and includes all new user-to-user alerts that the user is associated with and is tied to the time horizon. A Document Approval Notification Icon provides a link to the Deal Summary screen. The number in parenthesis is a total of all new document approval requests assigned or changed for the user and is tied to the time horizon.

FIG. 27 shows a Create/Modify Milestone screen 620. Create Milestone screen 620 is only available to users with modify permissions. In the embodiment shown, tasks are not selected from an existing template, rather, they are created ad hoc, if the user has modify permissions.

FIG. 28 is a Create/Modify Milestone screen 640 configured for detailed viewing and modifying of milestones in a timeline. Using the interface provided by screen 640, a user with modify permissions is able to modify all detailed information for a single milestone, including customer request dates, due dates, and actual completion dates. Users who without modify permissions use screen 640 as a Milestone Profile page.

Figure 30:
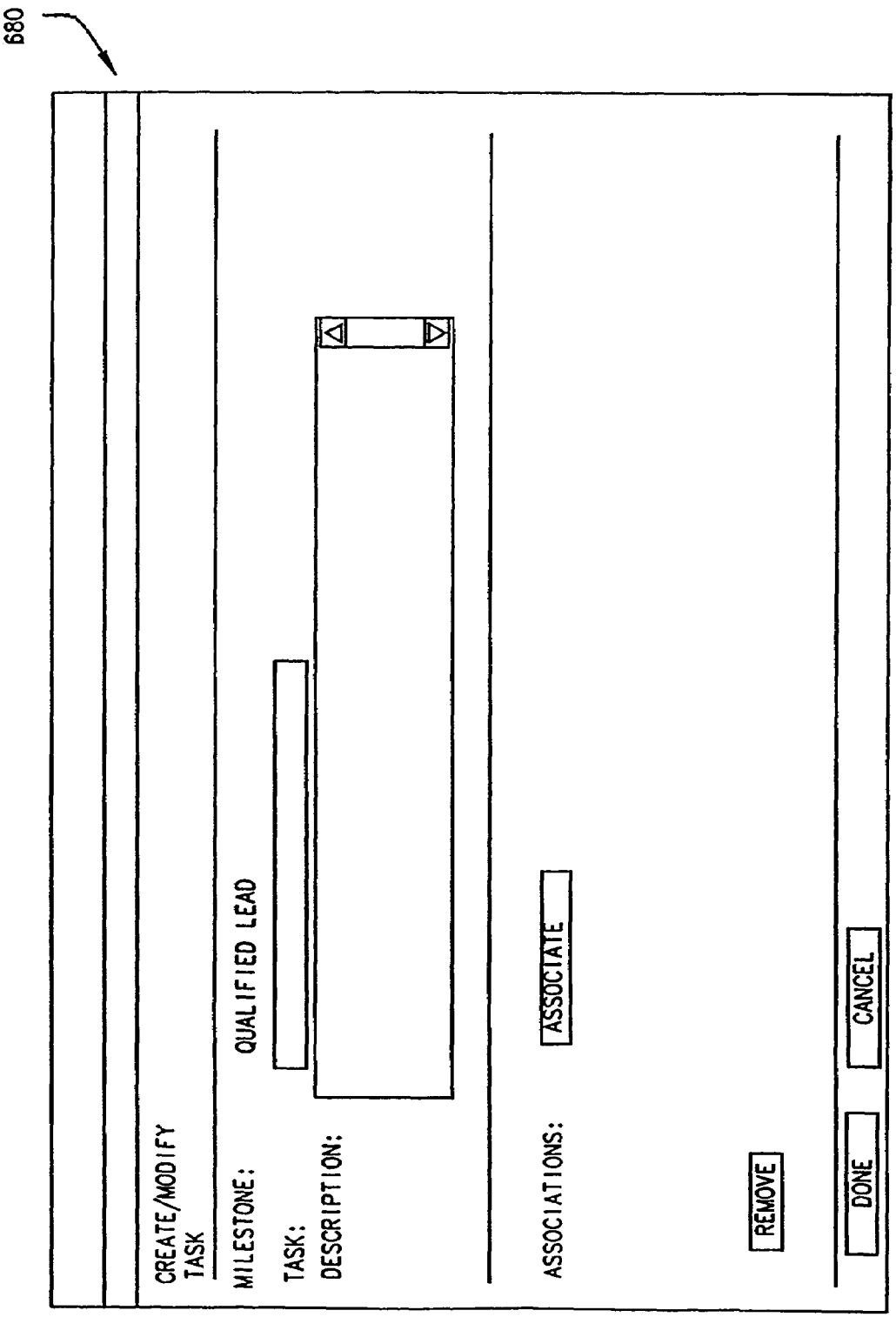
FIG. 30 is an example create/modify task screen.

FIG. 29 is a Create/Modify Task screen 660 serves as both a modification and profile screen for tasks. In one embodiment, all active deal users are able to either create new ad hoc tasks. In another embodiment, only users with modify permissions may modify detailed information belonging to an existing task. Users without modify permissions use screen 660 as a detailed profile view of a task. Create/Modify Task screen 660 displays a Milestone label, a Task data field, a Description edit box, an Owner pull-down list, and a Status pull-down list. Screen 660 also displays a Settings section that includes a Hide From External Parties check box and a Not Applicable check box. Screen 660 also displays a Due Date section, an Actual Completion Date section, an Add Associations pull-down list, and an Add Associations Index Card Icon. A Create/Modify Sub-Task screen (not shown) provides the same functionality for sub-tasks. FIG. 30 shows another embodiment of a Create/Modify Task screen 680 and FIG. 31 shows a Create/Modify Sub-Task screen 700 where a user is not able to modify detailed information belonging to the tasks and sub-tasks. However the user, with appropriate permissions is able to associate a created task with a milestone and a sub-task with a task. Additionally, external users are allowed to modify and update tasks and sub-tasks that are assigned to them.

FIG. 32 is an example embodiment of a Task Assignment screen 720. Task Assignment screen 720 allows a user to set-up milestones, tasks, and sub-tasks in a time efficient manner. For each milestone a user with modify permissions is able to modify the hide property, current due date, and customer request date. A company user can only enter a customer request date once, then that date value is locked. From that point forward only administrator users can change the customer request date. Also for tasks/sub-tasks, a user is able to assign an owner, modify due dates, and set hide and omit values. In one example embodiment, screen 720 is not accessible by users without modify permissions. A Hide From External Parties check box identifies whether or not a milestone/task/sub-task is hidden from the non company party and an omit check box indicates whether or not a task/sub-task is part of the active list of tasks and sub-tasks.

Task Notifications allow users to specify what type of notifications they wish to receive for both tasks that they assign to others and tasks that they are assigned. An example task notifications screen 740 is shown in FIG. 33. Screen 740 provides an ability for each user to specify to receive task notifications through e-mail or only through system generated notifications, based on user preferences. In addition, each user is able to specify what events will trigger notifications on tasks, which are assigned to others. For example, notices can be sent when a task is overdue, reassigned, due date is changed, and upon completion. Each user is also able to specify certain conditions that trigger notifications for alerts, which are assigned to them. Notices are sent in advance when a task is due, and then at periodic intervals after the first notice is sent. In one embodiment, users are automatically notified via a system-generated alert when they are assigned a task. All task notifications will appear under the task icon on the summary page (described in FIG. 15). When alerts are sent, the sent by field is the person who assigned the task, allowing reply functionality.

Tasks functionality allows a deal to have a specific structure or process flow managed by key milestones and tasks. Tasks are grouped logically into milestones to allow the team members to gauge the stage the deal is in, along with providing structure to the process and ability to manage tasks. Tasks also give the team members guidance as to what their responsibilities are on the team. FIG. 34 is a Tasks Timeline screen 760 which allows the user to view all the Milestones, Tasks, and Sub-Tasks that are part of the Tasks section of the deal. If given modify permissions, the user is able to modify existing milestones/tasks/sub-tasks, and assign tasks/sub-tasks to team members. If not given modify permissions, the user is able to only view the milestone, task, and sub-task information. Therefore, no modifications may be made directly on screen 760 other than adding new tasks/sub-tasks and modifying date information. However, if a user has modify permissions, the milestone, task and sub-task links will open Modify Milestone/Task/Sub-task pages.

Included in screen 760 are a Customer Request Date, a Current Due Date, and an Actual Completion Date. The Customer Request Date value is used as the Current Due Date and can only be changed by a system administrator. In one embodiment, milestones are ordered by the order in which they appear on the template, and this order cannot be changed.

Deal Discussions

FIG. 35 is an example Create Discussion screen 780 used by a deal room participant to create a threaded conversation with other deal team members within system 100. In one embodiment, discussions are deal centered and therefore cannot be accessed by users outside of the deal team. In another embodiment, a user creating a discussion can elect which deal team members are invited to join in the discussion. Purging a discussion requires administrator or manager privileges and purges the discussion from all members who had access to the discussion.

Figure 36:
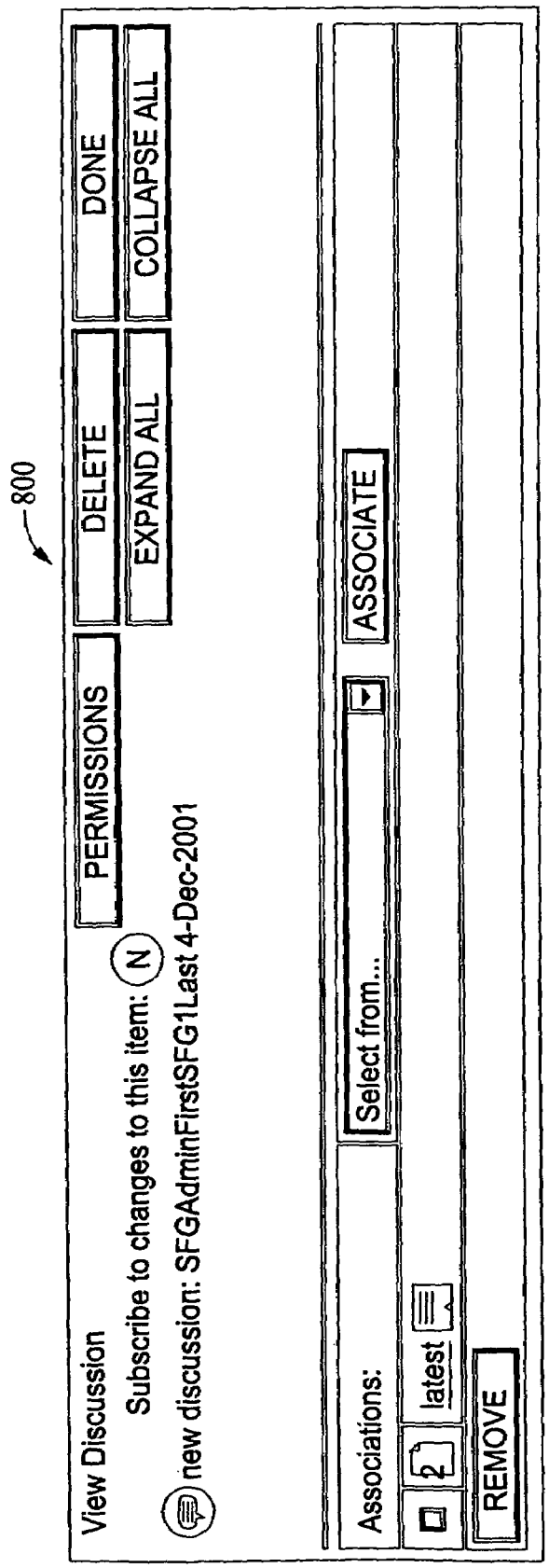
FIG. 36 is an example view discussion screen.

FIG. 36 is an example View Discussion screen 800 where a user can review the discussion of other members of the deal team by selecting one of displayed previous comments within the discussion. The user can choose to reply to any of the previous statements within the discussion.

Figure 37:
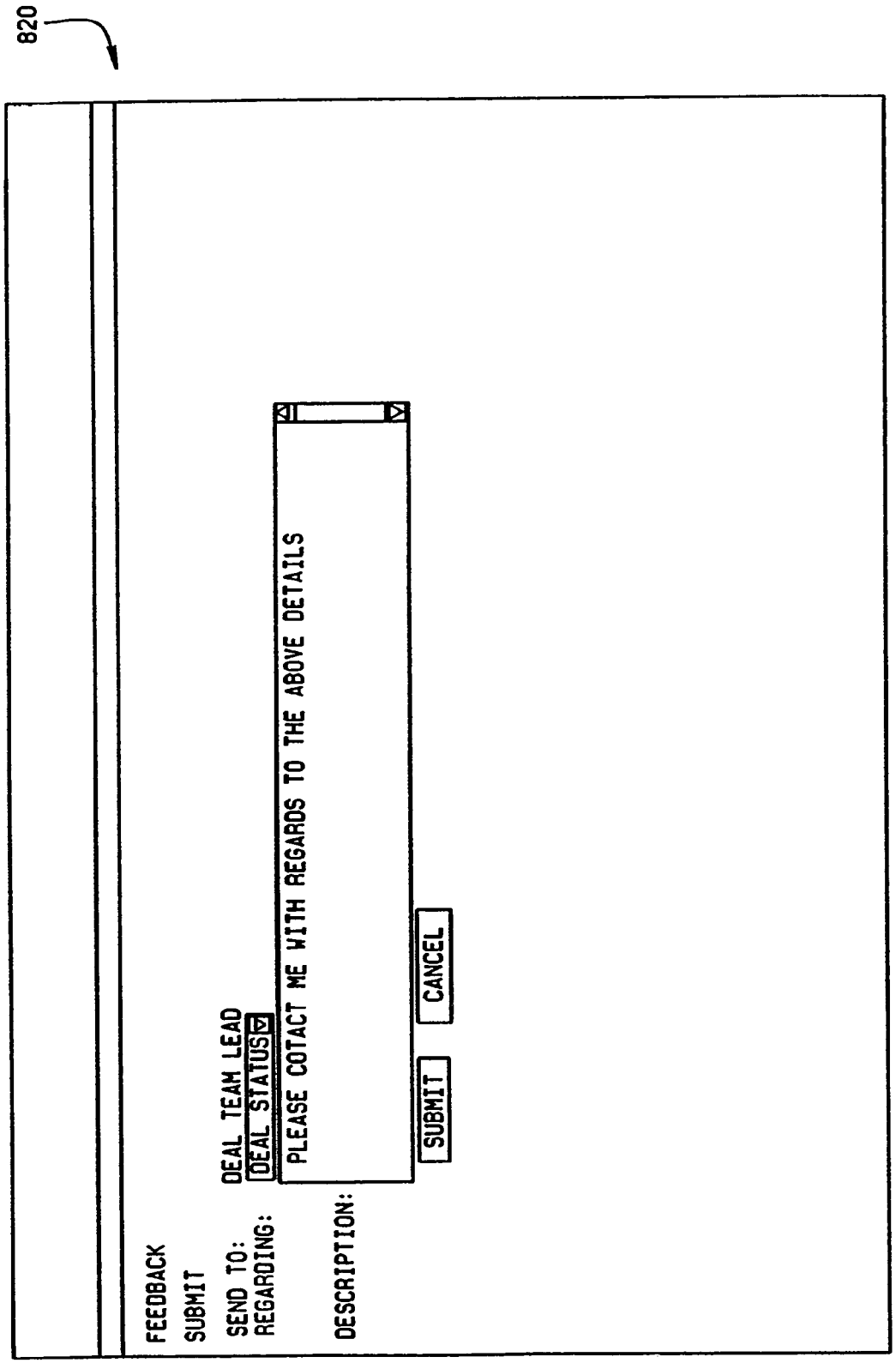
FIG. 37 is an example voice of customer submit screen.

A Voice of Customer (VOC) section provides deal participants a mechanism for providing feedback. Customers are both internal and external. FIG. 37 is a voice of customer submit screen 820 where a customer is able to provide feedback directly from the deal workspace. Any deal team member can access VOC submit screen 820 at all times. In one embodiment, all feedback is submitted in the form of an alert and is recorded as an alert from the person inputting the feedback to the deal team lead. In this embodiment, the feedback is recorded in a table that cannot be edited by anyone else within the deal. In another embodiment, system 100 (shown in FIG. 2) is configured to send an email to a pre-defined, common Quality mailbox for each business, when VOC is submitted.

As shown in screen 820, a send to field defaults to a primary contact on the deal team. A regarding field allows a user to choose from pre-defined feedback areas that, in one embodiment, are selected from a pull down list box. A description field is a free text entry form for feedback comments.

Figure 38:
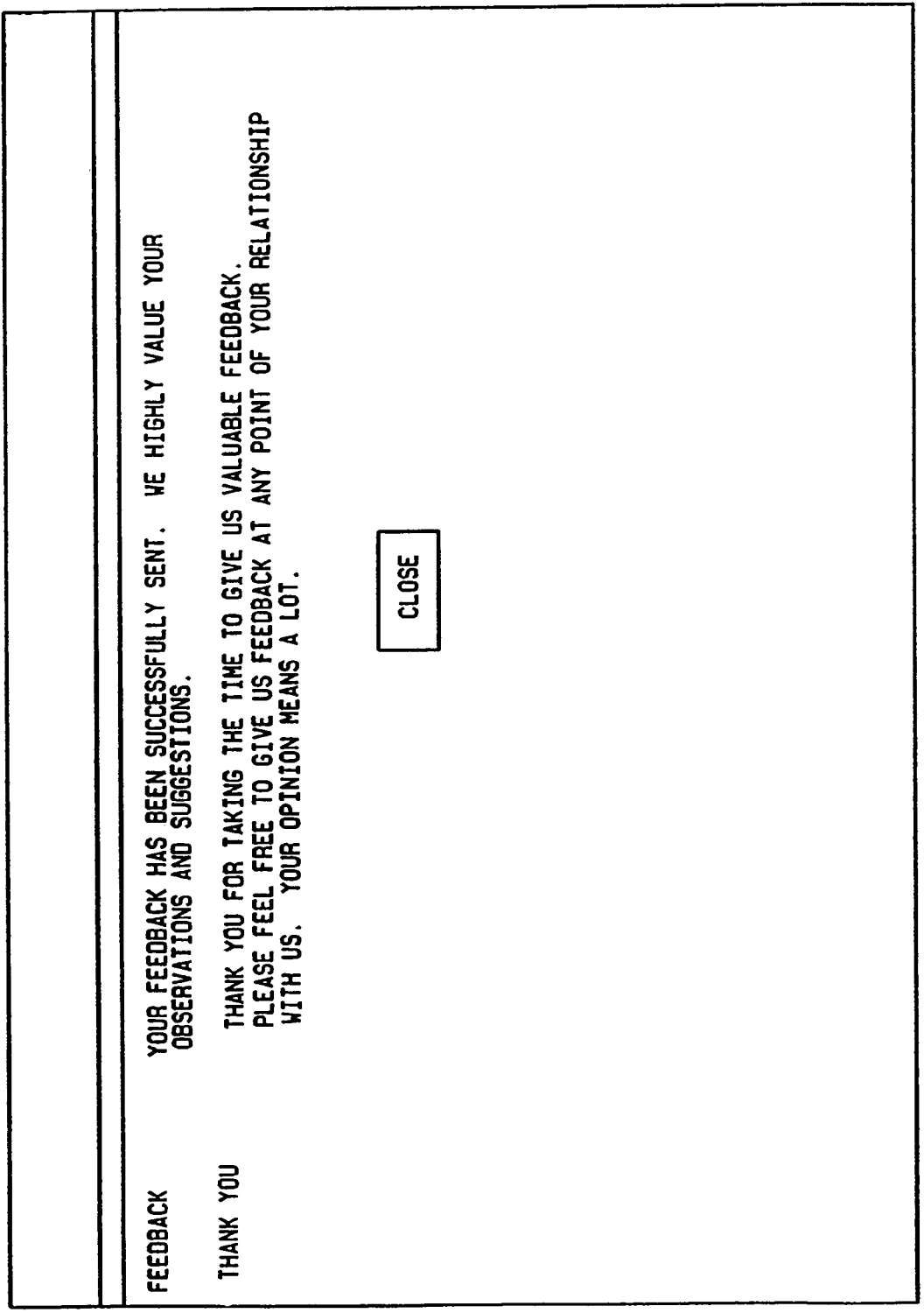
FIG. 38 is an example voice of customer submitted screen.

FIG. 38 is an example VOC submitted screen 840, presented to a user to verify that the user's feedback was properly submitted. A VOC summary screen 860, as shown in FIG. 39, is a displayed collection of all feedback that has been submitted for a particular deal. Once a participant submits feedback, screen 860 shows the feedback chronologically. In one embodiment, the summary is accessible from the Deal Summary screen (described in FIG. 15) for the deal, and will open up in another screen when the button in the profile screen is selected.

Deal Library

A Library provides the ability for deal members to categorize deal related files. Content added to the library can be permissioned to give only specified users access to the item. Permissioned users can browse the deal library and all relevant content. Documents within the library can be viewed along with associated meta-data describing the details of the document via an Index Card feature.

Figure 40:
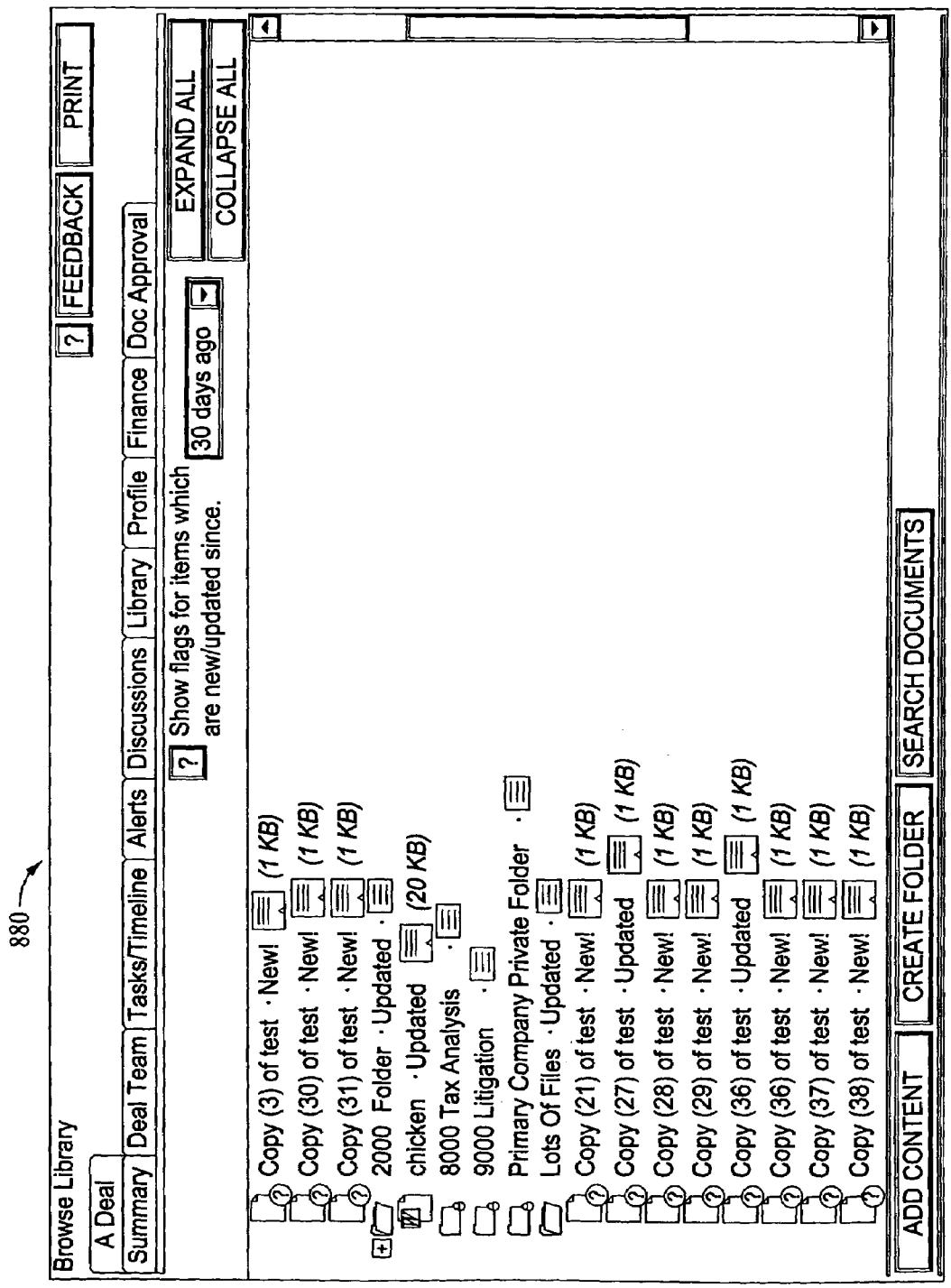
FIG. 40 is an example browse library screen.

FIG. 40 is an example embodiment of a Browse Library screen 880. Screen 880 enables users to browse the content specific to a deal based on their permissions for that deal. All deal team members have access to the deal library as well as an ability for all (internal and external) deal team members to post files of any form to the deal library. Each deal library folder structure includes a customer company folder (a master document folder for the customer) and the folder structure determined by the library template application and spans across deals for the specific company. Default permissions on the template folders in the deal library will be driven by the permissions selected when creating the folder in the Library Templates Application (described above in FIG. 11). Upon expansion of a folder, the focus of the screen will not revert back to the top of the library, but stay on the expanded folder.

In one embodiment, screen 880 includes an Add Content button, a Create Folder button, and a Search Documents button located on the bottom of the screen. The parent folder location of new documents is saved as a default preference across an individual library input session, and thus, a user may add multiple documents into the same folder. System 100 is further configured to allow a user to view a document through a pop-up function such that the user can more easily return to the previous page after viewing the document.

Upon adding documents to a Library, system 100 is configured to grant Full Control permissions to a user that uploads the document and Manage permissions to all internal deal team users. An external user that uploads a document is only granted Manage permissions. System 100 also scans each document that is uploaded into the system to prevent infected documents from being placed in the Library. System 100 utilizes a known and commercially available computer software to scan each document for computer viruses. The computer software is McAfee® Netshield for Windows NT and Windows 2000 4.5, which is manufactured by Networks Associates Technology, Inc., Santa Clara, Calif. (McAfee is a registered trademark of Networks Associates Technology, Inc., Santa Clara, Calif.)

System 100 is further configured to support full compound document functionality. A compound document is a document that has links to other documents. These links allow a document's application to, for example, display a Microsoft Excel™ spreadsheet inside a Microsoft Word™ document even though the Excel spreadsheet is persisted in a separate file. (Excel and Word are trademarks of Microsoft Corporation, Redmond, Wash.). In one embodiment, child documents are treated as separate Index Cards to facilitate check-in and check-out functionality that is available to the Index Cards. When a user chooses to Add Content to the Deal Library, clicking on the Browse button launches an interface that allows the user to upload a document from their local machine to the system. The system recognizes a compound document, identifies its component documents, and ensures that each of those components are uploaded to the system. The system maintains the integrity of the compound document, and ensures that other users may view the document as intended.

When a user selects Edit in Place from the "What would you like to do?" drop-down list on an Index Card, the system automatically detects if the document is a compound document. If it is, the parent document and all child documents are checked out and downloaded to a temporary location on the user's local machine. The parent document is automatically opened in its default viewer, with the linked documents embedded correctly. The user edits the parent document and the child documents, saves the file, and closes the application. The system then returns the user to the Version Comments page to enter the version comments, and clicks Check-In. The system determines if any child documents have been added or removed from the parent document. The parent document and all new and current child documents are uploaded to the system and checked in. The user is returned to the Index Card of the parent compound document.

When a user chooses to Check-In an Index Card that has been checked out, clicking on the File Browse button launches an interface that allows the user to upload a document from their local machine to the system. The system determines if the document being checked in is a compound document, and if so, it identifies its component documents and ensures that each of those components is uploaded into the system. This is necessary to maintain the integrity of the compound document, and ensure that other users view the document as intended.

When a user selects Check Out from the "What would you like to do?" drop-down list on an Index Card, the system automatically detects if the document is a compound document. If it is, the parent document is checked out.

When a user selects View File from the "What would you like to do?" drop-down list on an Index Card, the system automatically detects if the document is a compound document. If so, the parent document and all child documents are displayed in the content view popup window, with all links to child documents intact.

When a user selects Download File from the "What would you like to do?" drop-down list on an Index Card, the system automatically detects if the document is a compound document. The user is prompted to select a location on their local machine to download the parent document and child documents to. The parent document and all child documents are downloaded to this location for later use. If the parent document is later viewed, all child documents are correctly displayed within the parent.

In an alternative embodiment, system 100 is further configured to support full compound document functionality by consolidating all children documents into one document with one Index Card. Normal non-compound document functionality will be available from then on with this document within the system.

FIG. 41 is a Create/Modify Category screen 900 that allows a user to define a template folder's attributes, select a parent folder, and define the permissions for the folder. In one embodiment, only users with view or edit permissions may access screen 900. In another embodiment, a folder can only have one parent folder and the inherited folder checkbox defaults to selected if the parent folder is an inherited folder. If the parent folder is inherited, the inherited folder checkbox is selected, and the permissions table defaults to the permissions of the inherited folder. If not selected, the permissions table will be empty. Users with appropriate permission levels can add users and groups to the permission table via a select users and groups button. Users with appropriate permission levels are able to add the company group, customer group, and other group to the permissions table from the user/group picker list if the folder is not inherited.

FIG. 42 is an example Create Index Card screen 920 which enables a user to upload and set permissions on a file in the deal library. The upload and permission process is accomplished by the following steps of entering the file name and description, selecting the file, selecting the target folder for the file, adding optional associations and adding permissions. All deal team members may add a document in the deal library and users have the ability to selectively notify users with appropriate permission levels via a system generated notification that the document has been created by selecting Notify checkbox(es) in a table containing permission levels. The Notify checkbox will default to Selected. The System Generated notification is a direct hyperlink to the file that includes the name of the document, the name of the creator, and the date created. When setting permissions on a file, creators are able to select from Deal Team members whom they are have permission to view. Users have the ability to assign one of three file permissions to a user or group. "View"—enables a user to only View/Download a file, "View, Edit"—enables a user to view and/or edit a file, and "View, Edit, Permission"—enables a user to view, edit and permission a document. In one example embodiment, each business's employees can view all documents across all deals, but external users can only view documents they have appropriate permissions to view and add documents; they cannot delete the document once it is in the Library.

A View version of the index card screen (not shown) allows the user to view the summary, version, association, and permission information related to a file. The user does not have the ability to modify any of the information on this screen.

An alternative embodiment of Create Index Card screen 920 is shown in a Create/Modify Index Card screen 1340 (shown in FIGS. 66A and 66B). In the alternative embodiment, the major functionality that surrounds a piece of content, i.e., downloading, viewing, checking in/out, editing in place, creating review copies, locking/unlocking, and changing permissions, is controlled through Create/Modify Index Card screen 1340. Create/Modify Index Card screen 1340 displays at least the following information: summary information relating to the document submitted for approval, parent folder information, version information, association information, permission information, and document approval information.

Summary information includes a Title data field, a Description edit box, a Status label, and a File link. Parent folder information provides the folder that contains the specific document information. Version information includes the version number of the document, the type of file, the date the document was last modified, the user that last modified the document, and any comments relating to the document. Association information includes an Add Association pull-down list. Permission information includes a User Group and a Permissions pull-down list. Document approval information includes the approval status of the document, the date of the last action, and any comments relating to the document.

FIG. 43 is an example Modify Index Card screen 940 which allows the user to edit summary, version, target folder, association, and permission information for the file. Administrator users can also remove specific versions of the file, purge old versions of the file, lock down the file, or delete the entire index card. An alternative embodiment of Modify Index Card screen 940 is shown in a Create/Modify Index Card screen 1340 (shown in FIGS. 66A and 66B). In the alternative embodiment, the major functionality that surrounds a piece of content, i.e., downloading, viewing, checking in/out, editing in place, creating review copies, locking/unlocking, and changing permissions, is controlled through Create/Modify Index Card screen 1340. Create/Modify Index Card screen 1340 displays at least the following information: summary information relating to the document submitted for approval, parent folder information, version information, association information, permission information, and document approval information.

Summary information includes a Title data field, a Description edit box, a Status label, and a File link. Parent folder information provides the folder that contains the specific document information. Version information includes the version number of the document, the type of file, the date the document was last modified, the user that last modified the document, and any comments relating to the document. Association information includes an Add Association pull-down list. Permission information includes a User Group and a Permissions pull-down list. Document approval information includes the approval status of the document, the date of the last action, and any comments relating to the document.

Deal Profile

A profile contains summary information concerning a deal and are customized for, and vary by, company components. Deal team members have the ability to quickly update or access the particulars of a deal through the profile in the deal space. Users with permissions can also mark a deal as "Confidential" from a profile screen, thereby restricting deal access to only active deal team members. Users can also access any Voice of Customer information for the deal from a profile screen.

Figure 44:
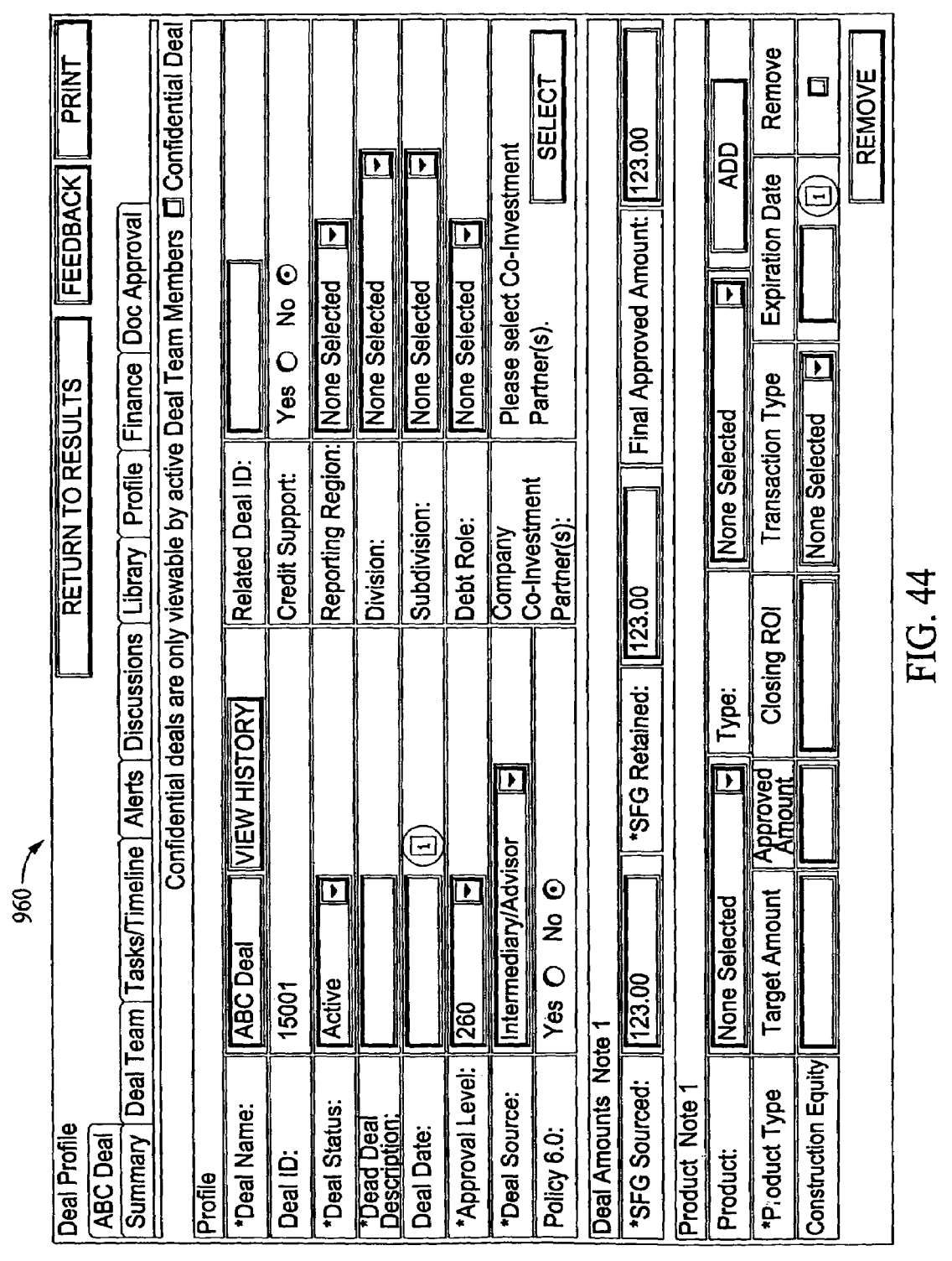

In one particular embodiment, a Deal Profile screen 960, shown in FIG. 44, within the deal space shows summary information on a deal such as profile, product, and volume information, deal dollar amounts, and access to Voice of Customer information. Users with appropriate permission levels have access to view or modify existing deal information. In one embodiment, non-company users cannot access screen 960.

In another embodiment, once a deal is marked "Confidential" via screen 960, only active deal team members can see the deal. Therefore, if managers and administrator users are not on the deal team, they will not be able to see the deal. Anyone on the deal team can mark a deal as "Confidential." If deal status is "Dead," users have the ability to add a description next to the status. A date closed field is populated when the last task or milestone is set to "Closed."

A selected Division will determine and refresh the values available for the Sub Division. By selecting a product, system 100 will determine and refresh the product types. Multiple products can be added to the product table, but products can only be added one at a time. Upon selection of a Product Type from Product Type drop-down list, screen 960 will refresh after an Add button is selected such that the selected Product Type is added to the list of Products. For example, in one embodiment, after selecting Equity in the Product drop-down list, a user is given the following Types to select from in Type drop-down list: None Selected, Equity—Current Earning, Limited Partnership—Tax Credit Deal, Limited Partnership, Marketable Security—Current Earning, Preferred Limited Partnership, Preferred Stock—Current Earning, and Reserve Base Equity. Screen 960 also enables a user to add duplicate products. System 100 is also configured to enable a user to create a new product type through screen 960.

In one embodiment, the Select Fiscal Year drop down box defaults to the current fiscal year and a user can only view estimates, actuals, and annual totals one fiscal year at a time. All Years estimate is a calculation of the totals for all fiscal years with estimate and actual entries. Additional fiscal years can be added through the Select Fiscal Year drop down box.

Screen 960 also displays a Delete button and a Reassign button, which enable a permissioned user to delete or reassign a specific deal within system 100. Screen 960 also includes a View History button which enables a user to view the previous names of a specific deal as the names have changed over the history of the deal. As a business practice, deal names may change throughout the lifecycle of a deal. Thus, system 100 is configured to allow permissioned users to change the name of a deal. However, a user may also want to know the different name changes for a deal. Thus, system 100 is further configured to allow a user to view the prior deal names of a deal by clicking on the View History button on screen 960.

In still another embodiment, a View Profile screen 980, as shown in FIG. 45 within the deal space, shows summary information on a deal such as deal status, description, and deal size. Users with appropriate permission levels have access to view or modify existing deal profile information. Also included is an ability to override default view permissions by making the deal confidential. In one embodiment, only active deal team members are able to see a confidential deal. In another embodiment, screen 980 is not available to non-company users. A time stamp is captured when deal status is set to "Funded", "Divested", or "Rejected" in order to utilize the time range criteria on the search preferences screen (described below in FIG. 46). Other deal statuses, in one embodiment include, Active, Inactive, Closed, Dead, Paid Off, Sold and Matured.

A Search application allows users to search meta-data within the deal and view results based on search criteria. Each business has unique search criteria, and therefore, each have individual Search Preference pages. An appropriate Content Management System (i.e., FileNet) addresses document search capabilities. FIG. 46 is an example embodiment of a Deal Search Preferences screen 1000. Deal Search Preferences screen 1000, in one embodiment, is used to capture criteria on which users search deals. Users have the option of entering no or multiple criteria to capture a list of deals. Results appear on the deal search results page (described below in FIG. 47) along with the criteria used for the search. All defined search criteria are shown on the search results page regardless of the results of the search. Certain deal information is designated as "closed from public access" (search included) upon designation by a user which such authority. Confidential deals are searchable only by active team members.

Screen 1000 includes a Deal ID number assigned to deal, a Deal Name, a name of client company, a company role, and a deal status showing current status of a deal. If deal status is dead or closed, From/To date range fields are enabled. Screen 1000 further includes a first and last name of the deal team lead. First and last name are separated to have the ability to search by first and/or last name. A country field includes country risk for deals. Screen 1000 includes a product field where the user can select products to search for in deals.

In one example embodiment, deal search preferences for a company include focused sub-string searches on the deal name and company name. Search options include "Begins with" or "Includes" on the search preference page. For Deal Status, when searching for "Active" or "Inactive" deals, date range fields are not enabled. Finally, for Deal Status, when searching for "Closed" or "Dead" deals, date range fields are enabled. Functionality on search page 1000, in one embodiment, assumes "and" functionality with data on the search preferences page.

In another example embodiment, deal search preferences include focused sub-string searches on the deal name and company name. Search options include "Begins with" or "Includes" on deal search preference screen 1000. When searching for "In Process" deals, date range fields are not enabled. Finally for Deal Status, when searching for "Funded", "Divested", or "Rejected" deals, the date range fields are enabled.

FIG. 47 is an example Deal Search Results screen 1020. Deal search results provide a report view of deals based on the criteria entered on the Deal Search Preferences page (described above in FIG. 46). Deals are listed with the search criteria and the number of deals returned at the top of the page. In one embodiment, the user can navigate to additional pages of results if more than fifteen are returned. In another embodiment, the default presentation of search results is sorted alphabetical by deal name and there is an ability for the user to sort by criteria columns in search results and the users have ability to drill down on specific deals displayed on search results screen 1020.

In one particular embodiment, if a user searches by company name, search results screen will display company name and company role columns. However, if a user does not search on company name, the search results page will display the primary company column (instead of the company name and company role columns). In another embodiment (not shown), a size of the deal is displayed on screen 1020.

A Document Search feature (not shown) is included in one embodiment and is structured similarly to deal search results screen 1020 (shown in FIG. 47), with an embedded hyperlink on deal results screen 1020. The document search functionality is handled via native search capabilities of an appropriate Content Management System, for example, FileNet and capabilities of the portal, and is configured to perform missing document meta-data searches, search on version and index card comments, as well as the content of the documents and search documents within the deal space without making distinctions for deal status.

In one embodiment, to prevent a user from having to re-enter search criteria in a document search after viewing an index card displaying the search results, the search results will be cached. This enables users to more easily navigate back and forth between the search results and the index cards of the documents returned in the search results.

Personalized Portals and Web Pages

As described above in FIG. 1 and FIG. 4 prospect contact is accomplished through one or both of personalized portals configured for prospective customers after an initial contact or through prospect web pages configured with data, which, when accessed by a potential customer causes an interest and further investigation into possible deals on their part. In one embodiment, personal portal functionality is enabled by selection of a personal portal option on Deal Dashboard screen 600, shown in FIG. 26. By having a personal portal, a prospect user or a customer user has access to news feeds, templates contacts and tasks. In addition, the user is able to personalize some of the content presented.

FIG. 48 in an example Customer Invitation screen 1040 which invites the prospect to register as a system user, providing them with a personal portal. Screen 1040 includes an area for the prospect to select their company name, industry templates and provide other user data. Upon registration, the new user is able to select from deal room functions described above, based upon set permissions. Selection of those function is via a customer pull down menu as shown in the figure. FIG. 49 is a continuation of screen 1040 and shows capability for selection of a username and password for future portal access.

Figure 50:
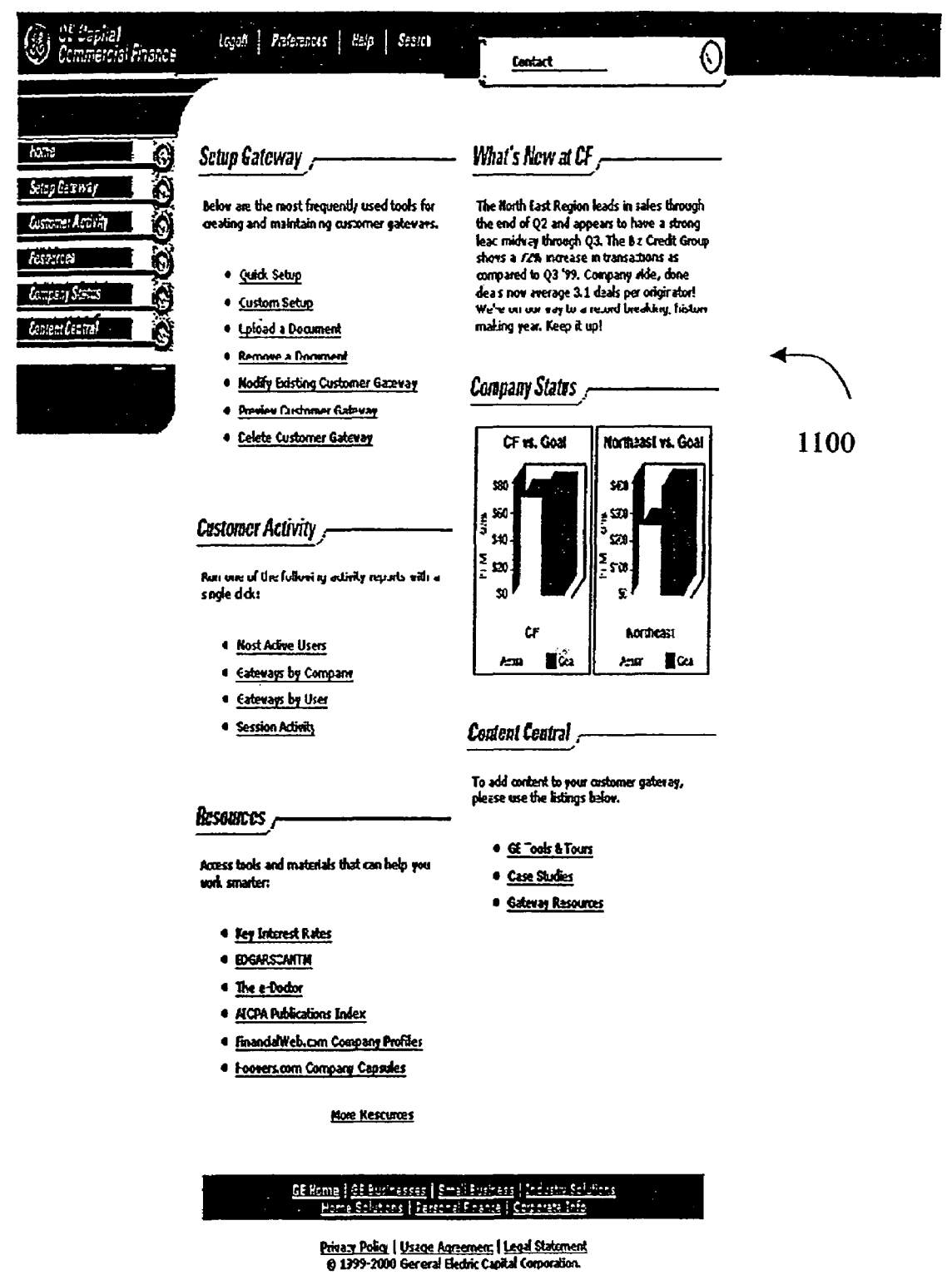

FIG. 50 is an example embodiment of an Originator Home Page 1100 displayed when an originator logs into system 100. Home page 1100 includes in one embodiment, links to a setup gateway, a customer activity area, resources, a news section, a company status area and a content central area. The setup gateway allows access to common tool for creating and maintaining customer gateways. The customer activity area includes links for generating reports on customer activity. Resources include productivity tools the originator can access and use to improve sales effectiveness. Content central includes links to company tools and tours, case studies and other resources. Company tools, in one example embodiment includes a link to a video demo on a separate page within the website. A further tool is a search tool use to search database attributes and external files including but not limited to html, documents and pdf files.

Figure 51:
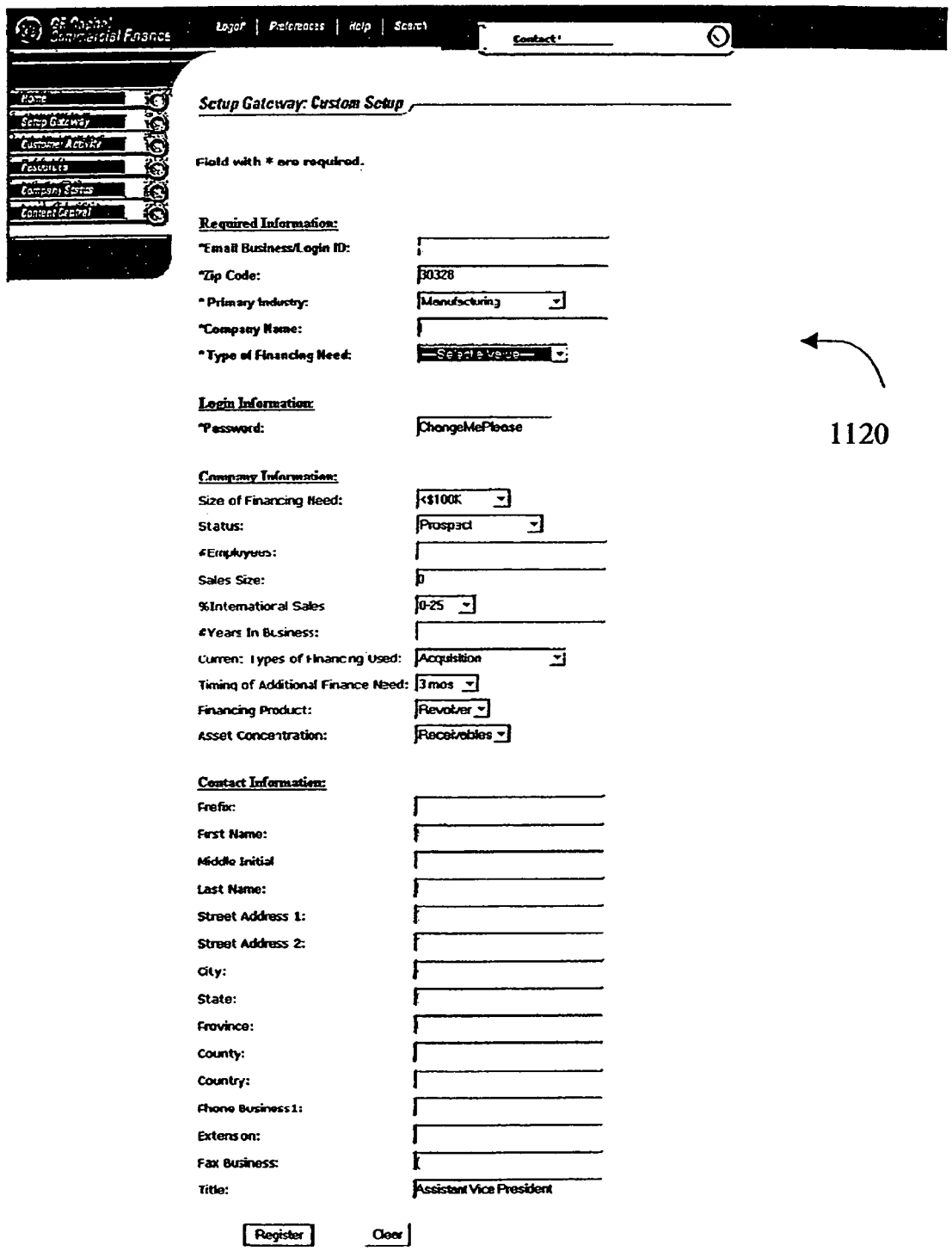
FIG. 51 is an example originator setup page.

FIG. 51 is an example embodiment of a Custom Setup page 1120 which is displayed upon selection of a custom setup link on page 11100. Setup page 1120 allows an originator to register prospects and record their profile information for personalizing page content to these prospects. Included are company and contact information including financing needs.

Figure 52:
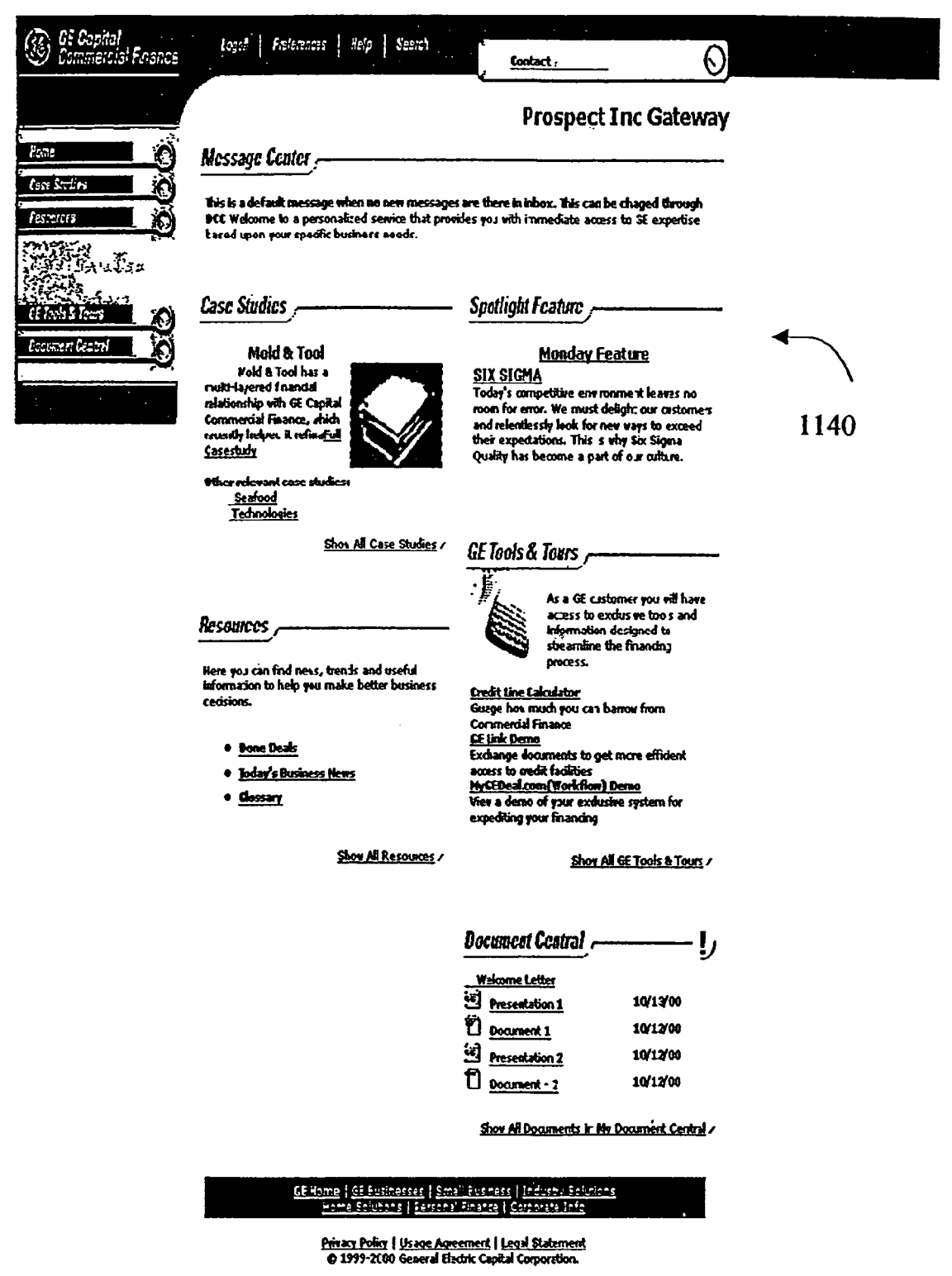

FIG. 52 is an example embodiment of a Prospect Home page 1140 presented to a prospective customer who chooses to log in to the system. After log in, the prospective customer is allowed to browse the personalized information setup by the Originator, for example, a Message Center to receive alert messages from the Originator or from any background process, Case Studies personalized for the Prospect, Resources where the customer can look at an array of information, for example, interest rates, glossary, business news, frequently asked questions. Company Tools & Tours, for example, presents demos like a credit line calculator and deal video. Spotlight Feature and Document Central where all types of documents may be posted for prospect's review. When Document Central contains no other documents, a default is to contain a Welcome Letter. A preferences image link routes the user to a preferences page (not shown) where the prospect can change their company profile information, for example, address, phone number. Search image link causes a search page (not shown) to be displayed. A help image link shows a help page (not shown). Contact originator link, in one embodiment, opens a small popup window with details of the primary originator along with an e-mail address link which enables the prospect to send an e-mail to the primary originator.

The message center is a section where if there are any new alert messages, for example, messages sent by the originator in cases like adding new presentations sent by system 100 when switching from prospect to qualified prospect. If there are no new messages, a default message is displayed. New messages are displayed in a list box. On selection of a new message from the list box, a new window opens which contains the selected alert message. The case studies section displays links to rule based retrieval of case studies set up by the originator for the prospect. Selecting a case opens a window in which the case study is displayed. A link to show all case studies is available, which retrieves and displays all case studies which agree with the rule. If there are no case studies for the prospect, there are default case studies available for selection and display, including, but not limited to, prospect industry, financing needed and region wise. Case Studies are selected by the originator in the custom setup section of the originator page.

Document Central is a combination of presentations and proposals and contains all communications to prospect direct from originator, like new documents or presentations sent to a prospect by an originator. Example of documents in the document center include pitch presentations, configured as a link to the presentation uploaded by the originator, presented to the prospect in a new window.

Figure 53:
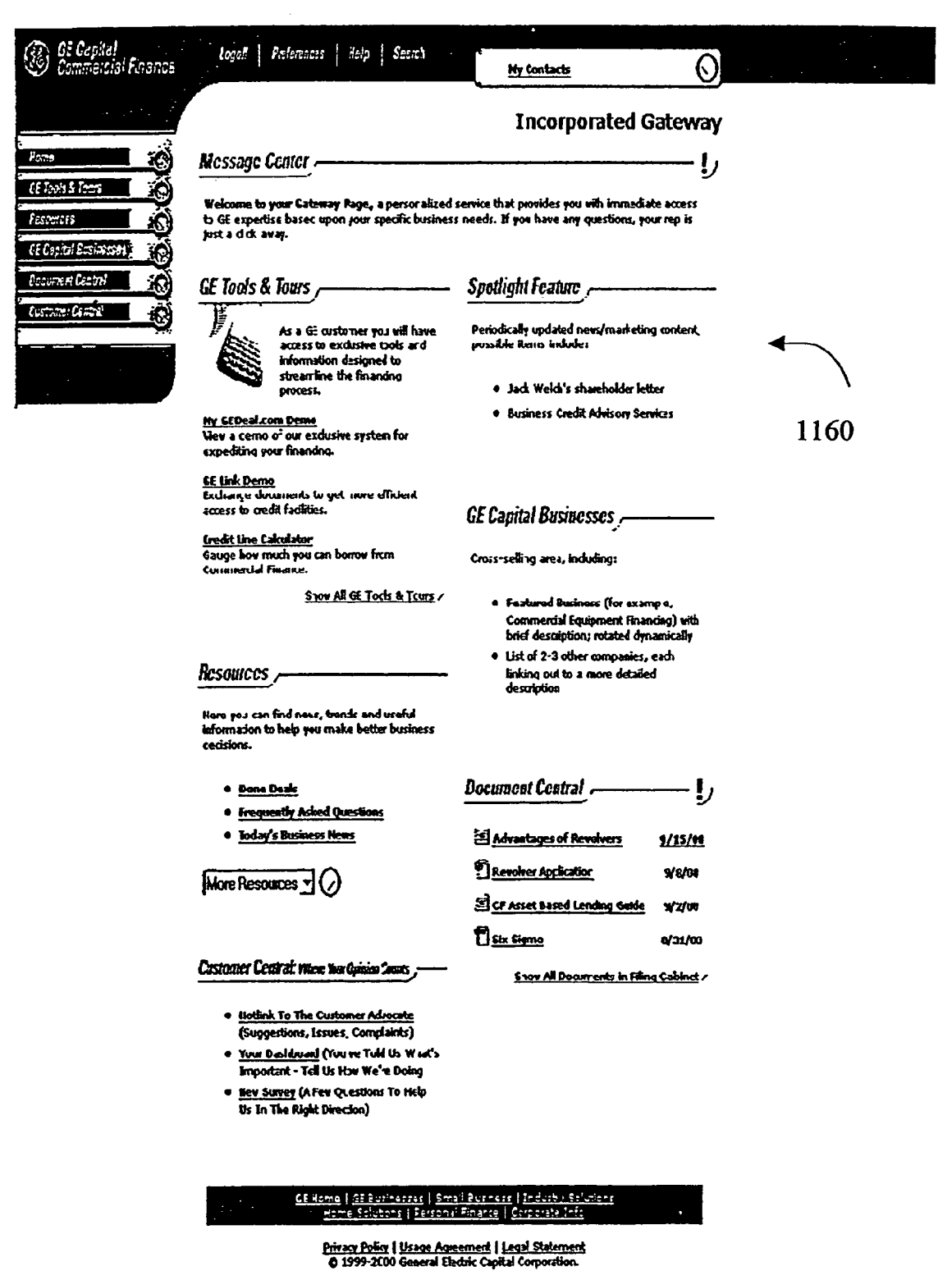

FIG. 53 is an example embodiment of a Customer page 1160. Users that access page 1160 include the customer and a Primary Originator/Account Manager in order to preview the settings made by them for the customer and to check functionality, for example, of message links and welcome links. A customer accesses page 1160 in order to browse through the page, select the various links and view the content, send e-mail to the account contacts, search for content in the gateway, customize their preferences and to log off from the site.

Page 1160, in the embodiment shown in FIG. 53 includes a my contacts link, which; in one embodiment, opens a small popup window with details of the primary originator along with an e-mail address link which enables the customer to send an e-mail to the primary originator. In addition, in one example embodiment, and as shown in the figure, the Customer's Company name is shown page 1160.

In one embodiment, page 1160 is divided into various sections, including a message center, company tools & tours, resources, customer central, spotlight feature, company businesses, and document central.

The message center is a section where if there are any new alert messages, for example, messages sent by the originator in cases like adding new presentations sent by work flow when switching from prospect to qualified prospect. If there are no new messages, a default message is displayed. New messages are displayed in a list box. On selection of a new message from the list box, a new window opens which contains the selected alert message. The company Tools & Tours section shows a number of Tools and Tours, which are allowed to be shown to a customer, as links in the specific sequence set by Originator. If there is no personalized setting for this Customer, then default tools are displayed in a default sequence. The Resources section displays available Resources in a specific sequence set by Originator. If there is no personalized setting for this Customer, then default resources are displayed in a default sequence.

The Customer Central section displays a number of links, one of which enables the customer to send an e-mail to a customer feedback resolution manager. The company businesses section displays a number of the top company businesses per a default sequence (defined by the Content Manager) where the first displayed business is a "Featured Business." At the bottom of the company businesses section there is a "Show all Businesses" link which shows a list of All Businesses page in Content Frame.

Figure 54:
FIG. 54 is an example intermediary home page.

An intermediary page 1180, shown in FIG. 54, includes all of the sections included in customer page 1160 (shown in FIG. 53), and further includes a transaction library where all deals recently closed by the company can be examined. A financial solutions center includes descriptions of financial products offered by the company.

Figure 55:
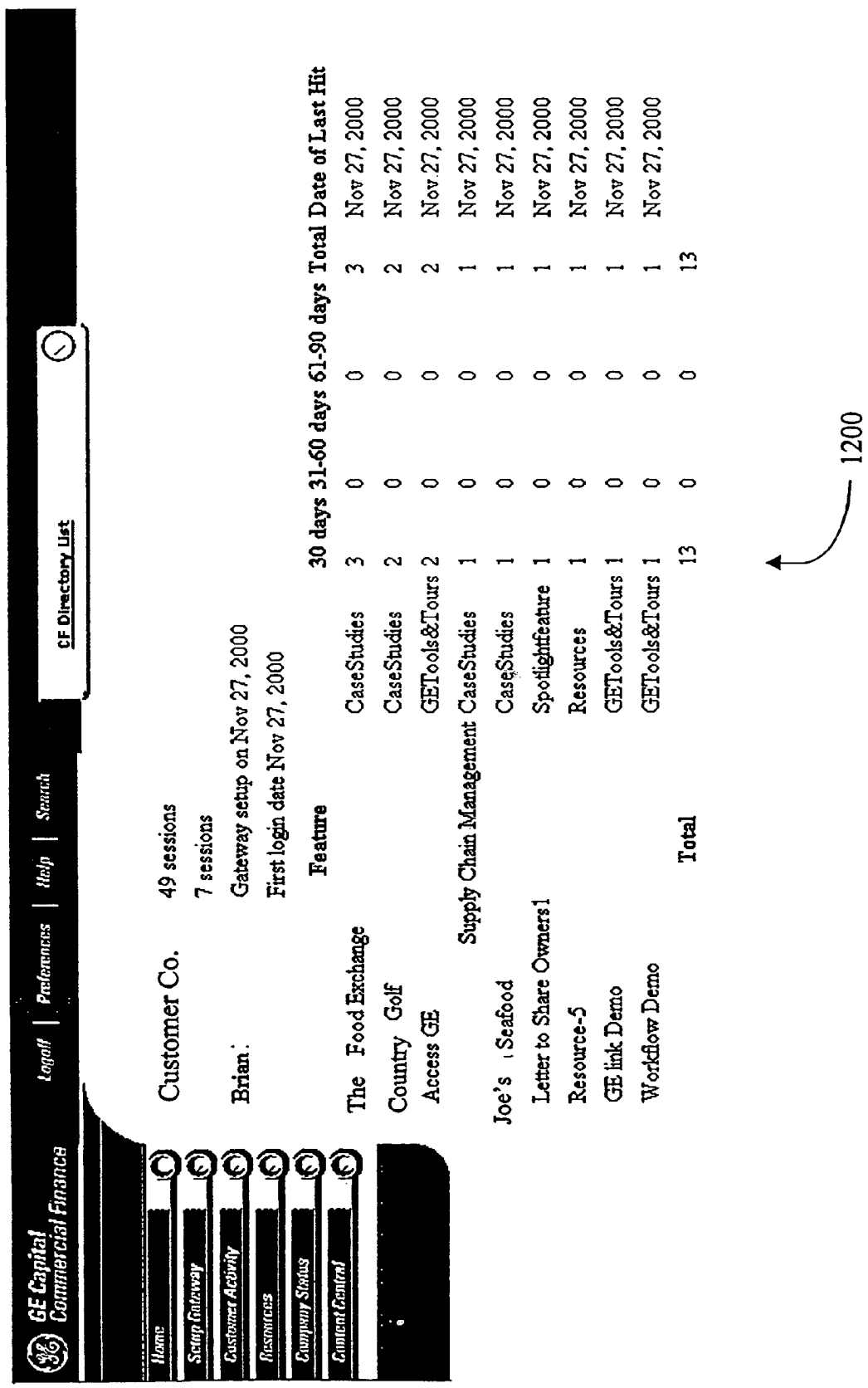
FIG. 55 is an example of a home page activity report.

A home page activity report page 1200, shown in FIG. 55, provides a report which indicates which users at which company are accessing their home pages, how often, when and which of the tools and options available on those pages are being accessed.

Document Approval Process

Figure 56:
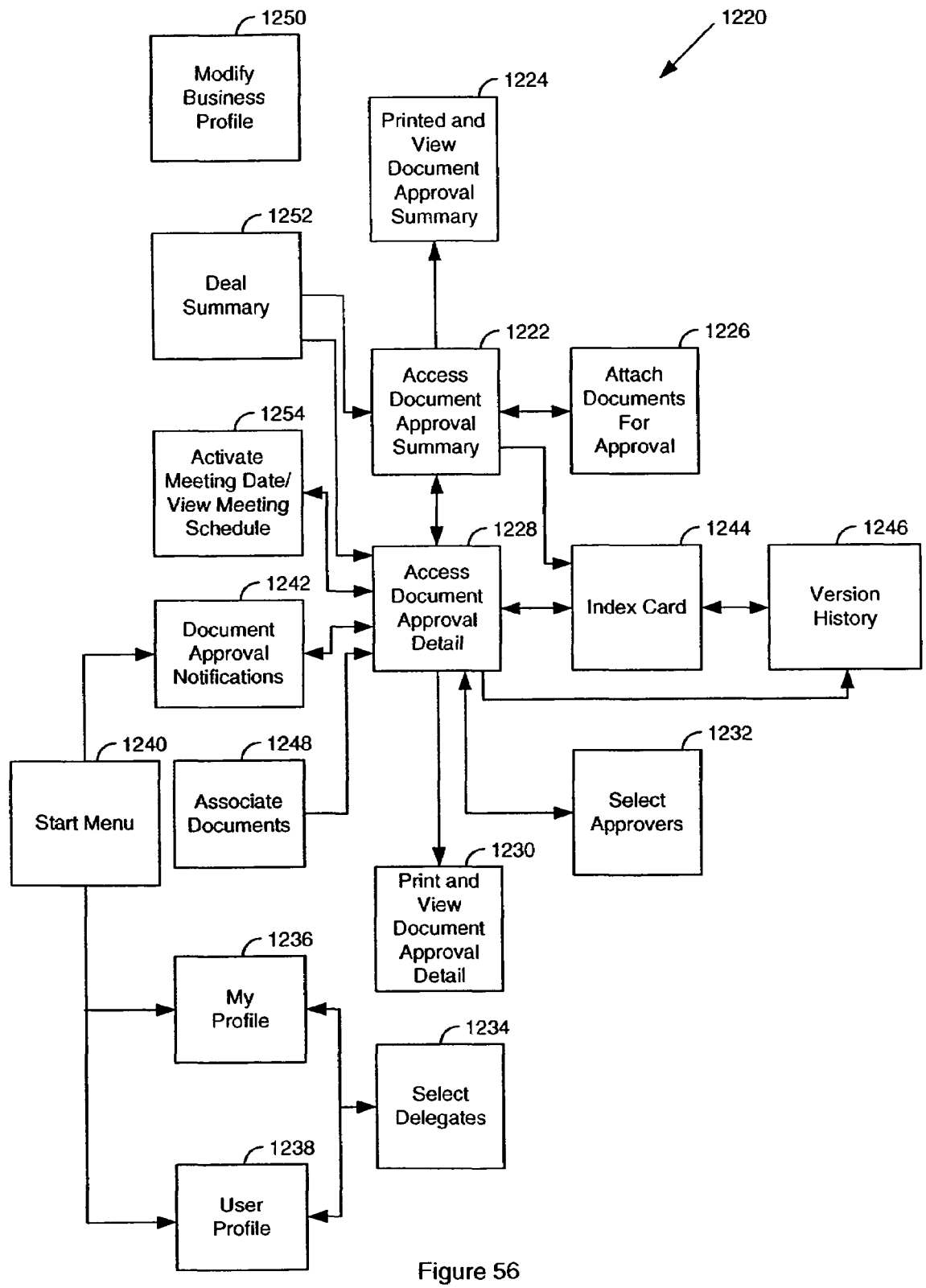
FIG. 56 is a flowchart illustrating a document approval process through functionality of a system shown in FIG. 2.

FIG. 56 is a flowchart 1220 illustrating a document approval process through functionality of system 100. In the example embodiment, a document relating to a deal is approved by accessing 1222 document approval summary screen 199 (shown in FIG. 4). After a user has accessed 1222 document approval summary screen 199, the user may view and print 1224 a document approval summary. Additionally, from document approval summary screen 199, the user may also attach 1226 a document relating to a selected deal such that the attached document may be reviewed and approved. From document approval summary screen 199, the user is then able to access 1228 a document approval detail screen that enables permissioned users to post their reviews of documents as many times as necessary and for other users to view the reviewed status and corresponding comments for these documents. After accessing 1228 document approval detail screen, the user is then able to view and print 1230 a document approval detail report, and select 1232 persons to approve a selected document relating to a selected deal.

System 100 also enables a user to designate 1234 an approver delegate to approve documents that have been submitted to that user for approval. Any user can delegate approval rights to any other user by accessing 1236 My Profile screen (shown in FIG. 21) or by accessing 1238 a User Profile screen (shown in FIG. 22). My Profile screen and User Profile screen are accessed 1240 through a start menu on system 100. The start menu also enables the user to access 1242 document approval notifications. The document approval notifications are system 100 generated notifications that are transmitted by system 100 to the user within the system and in electronic form, e.g., e-mail, during the course of a document approval cycle. The document approval notifications provide the user with a summary of the status of the document approval process for each deal managed by the user.

System 100 also generates 1244 an index card page that contains all of the meta-data for a piece of content that is added into system 100 through the portal. Additionally, all of the major functionality that surrounds a piece of content, i.e., downloading, viewing, checking in/out, editing in place, creating review copies, locking/unlocking, and changing permissions, is controlled on the index card page. From the index card page, the user is able to access 1246 a version history page that enables the user to display all previous versions of the document to be approved and to delete prior document versions of documents that have not gone for approval. From the index card page, the user is also able to request approval of a document and/or reject a document already in the approval process. System 100 also enables the user to upload 1248 associated documents stored on database 108 (shown in FIG. 2) to be attached to objects within system 100 such as alerts, discussions, tasks, subtasks, and deals.

System 100 also includes a Business Profile screen (shown in FIGS. 5A and 5B) that allows a user to modify 1250 a business profile for a business involved in a selected deal, and a Deal Summary page (shown in FIG. 15) that a user can access 1252 to view deal specific information. System 100 also enables the user by accessing 1254 meeting scheduler 183 (shown in FIG. 4 and described in detail below) to access 1228 document approval detail screen for a specific document attached to meeting scheduler 183 and having been submitted for approval.

Example Viewable Screen Shots for Document Approval

FIG. 57 is an example embodiment of a Document Approval Summary screen 1260. Document Approval Summary screen 1260 displays on a single screen an approval status of documents requested for approval within a deal. Document Approval Summary screen 1260 includes a tool bar at the top of the screen that is common to system 100 (shown in FIG. 2) that enables a user to navigate system 100. The tool bar includes a Summary tab, a Deal Team tab, a Task/Timeline tab, an Alerts tab, a Discussions tab, a Library tab, a Profile tab, a Finance tab, and a Document Approval tab. Document Approval Summary screen 1260 also displays a Deal Name 1262, an Attach Doc button 1264, and an Index Card Icon 1266 that enables a user to access an index card screen (shown in FIGS. 66A and 66B) that displays information relating to the document to be approved. Document Approval Summary screen 1260 also displays in chart form the approval status of documents requested for approval within a deal. The chart displays the following information: documents requested for approval, version number of document, format type of document, document type, status of approval of document, last modified date, requested date, and remove check box. A Document Approval Detail Icon 1268 enables a user to access a screen (shown in FIG. 60) that displays additional information relating to the document submitted for approval and enables the user to view the document.

Figure 58:
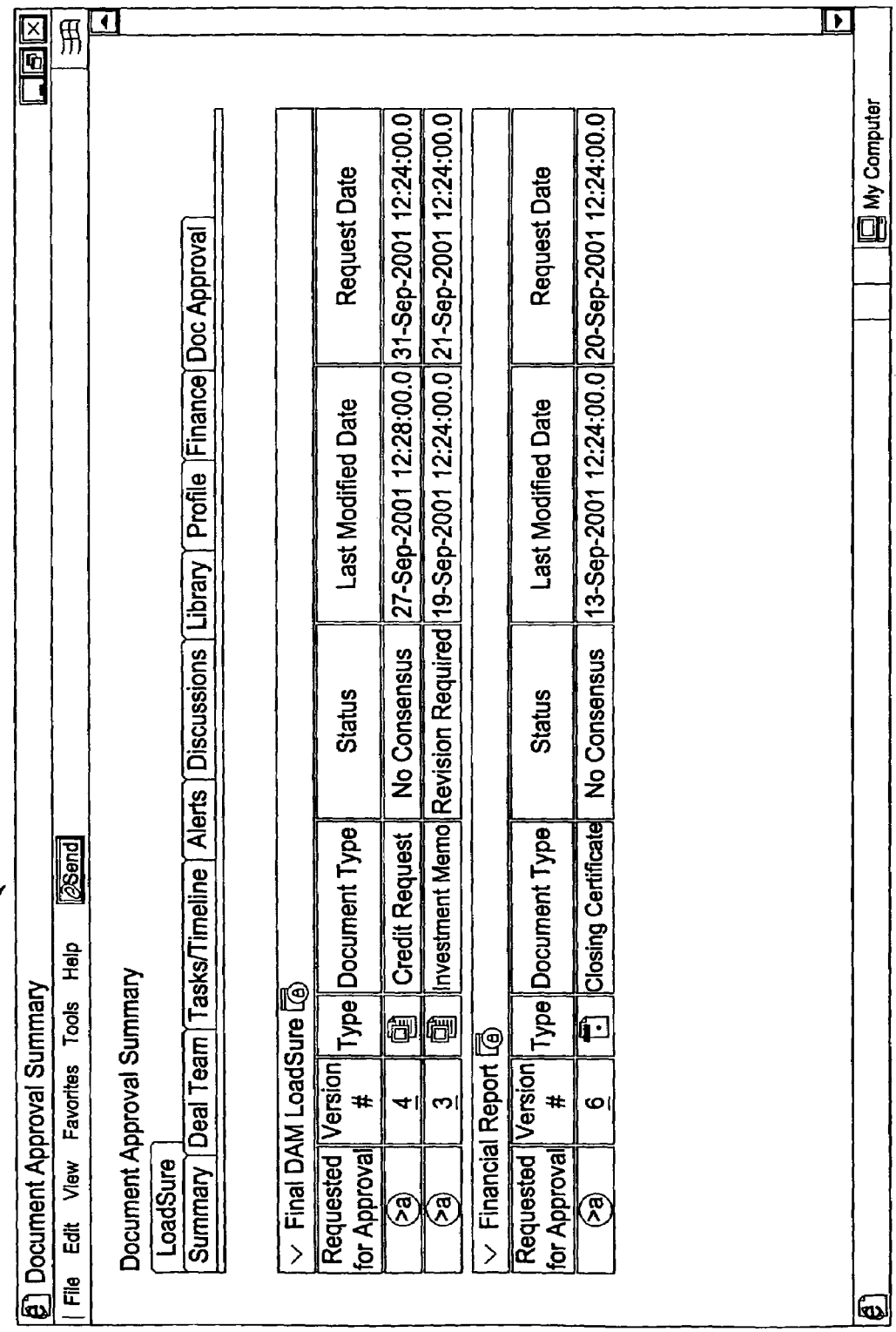
FIG. 58 is an example of a document approval summary print view screen.

FIG. 58 is an example embodiment of a Document Approval Summary Print View screen 1270. The Print View for the Document Approval Summary screen 1260 (shown in FIG. 57) enables the user to print out a summary of documents that have been submitted for approval and/or have been approved without having the header, start menu, or tab graphics and any of the buttons or active links being displayed.

Figure 59:
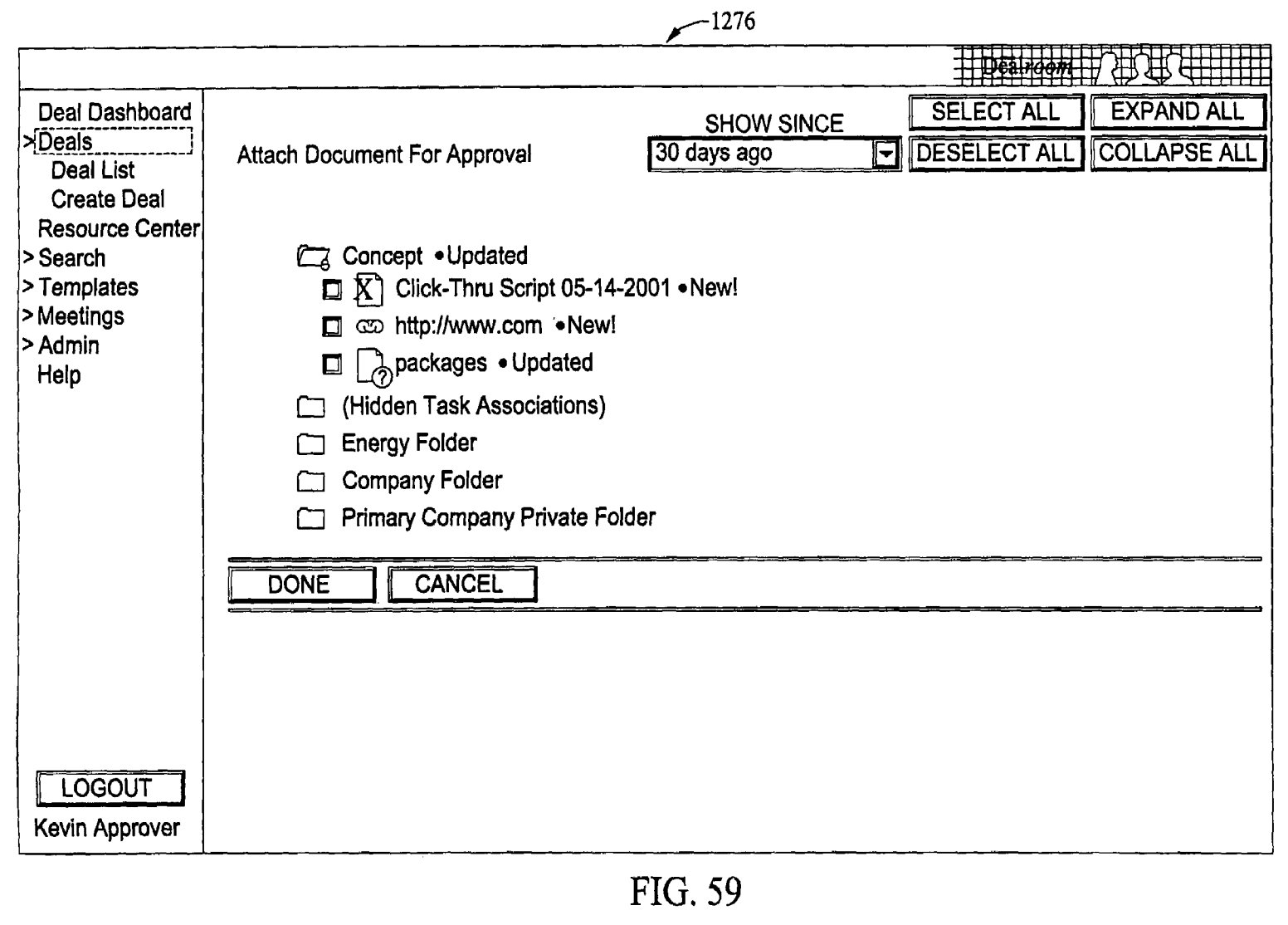

FIG. 59 is an example embodiment of an Attach Document for Approval screen 1276. Attach Document for Approval screen 1276 is accessed by a user when the user selects Attach Doc button 1264 (shown in FIG. 57). Attach Document for Approval screen 1276 includes a tool bar at the side of the screen that enables a user to navigate system 100 (shown in FIG. 2). The tool bar includes a Deal Dashboard link, a Deals link, Resource Center link, a Search link, a Templates link, a Meetings link, an Admin link, and a Help link. Attach Document for Approval screen 1276 enables a user with modify rights on a specific deal to select documents from Deal Library 196 (shown in FIG. 4) and request digital approval on them. Attach Document for Approval screen 1276 also enables a user to select multiple documents at one time.

FIG. 60 is an example embodiment of a Document Approval Detail screen 1280. Document Approval Detail screen 1280 enables permissioned users to post their reviews of documents and for other users to view the reviewed status and corresponding comments for each of these documents. Document Approval Detail screen 1280 displays three sections, an upper, a middle and a lower section, of information relating to the document approval process. The upper section displays the following information: a specific deal name, a document name, a document version number, a document type, a requested by entry, a requested date entry, and a status entry. Users can also view the specific document by clicking on the document name, and can access an index card screen (shown in FIGS. 66A and 66B) that displays information relating to the document to be approved by clicking on an index card icon. The middle section of screen 1280 displays document approval decision information. The lower section displays approvers for the specific document, and a summary chart illustrating whether a document has been reviewed, a date reviewed, and comments relating to the review. The lower sections also displays whether an approver has delegated approval authority to another user.

FIG. 61 is an example embodiment of a Document Approval Detail Print View screen 1290. The Print View for the Document Approval Detail screen 1280 (shown in FIG. 60) enables users to view and print reviews of documents and the reviewed status of the documents. The users are enabled to print out the approval detail with the navigation buttons hidden.

Figure 62:
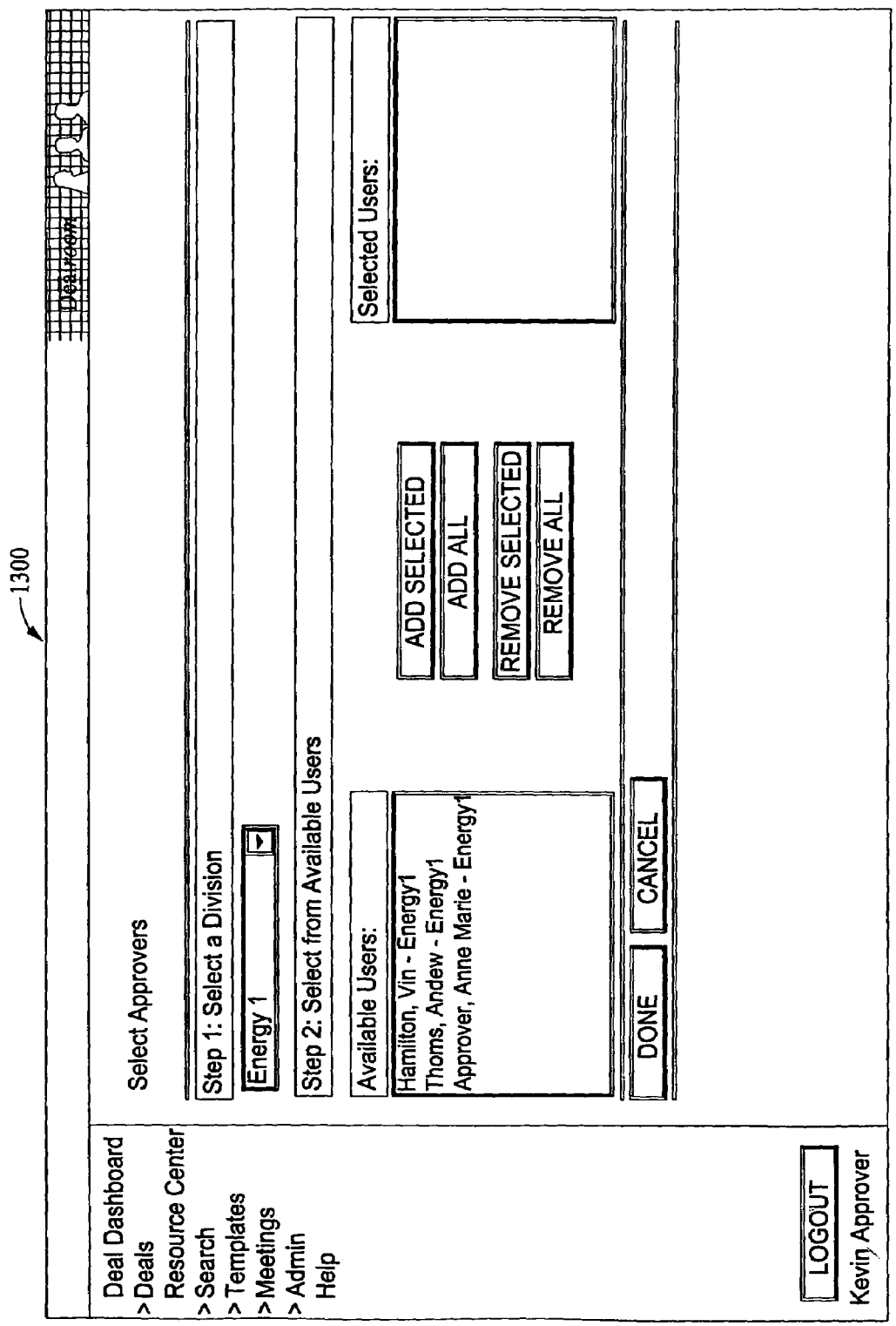
FIG. 62 is an example select approvers screen.

FIG. 62 is an example embodiment of a Select Approvers screen 1300. Select Approvers screen 1300 enables a user to select specific users to review and approve a specific document. In the example embodiment, Select Approvers screen 1300 may be accessed through Document Approval Detail screen 1280 (shown in FIG. 60) by clicking on an Add Approvers button. Select Approvers screen 1300 displays two steps including selecting a division where an approver is assigned and selecting from available approvers. A user can also designate a delegate to approve documents through Select Approvers screen 1300. More specifically, in the example embodiment, a delegate is selected for a specific document on Document Approval Detail screen 1280, after the user selects the original approver from Select Approvers screen 1300. A drop-down list for selecting a delegate will automatically be displayed if the original approver has delegates identified for a specific time period via the approver's Profile screen.

Figure 63:
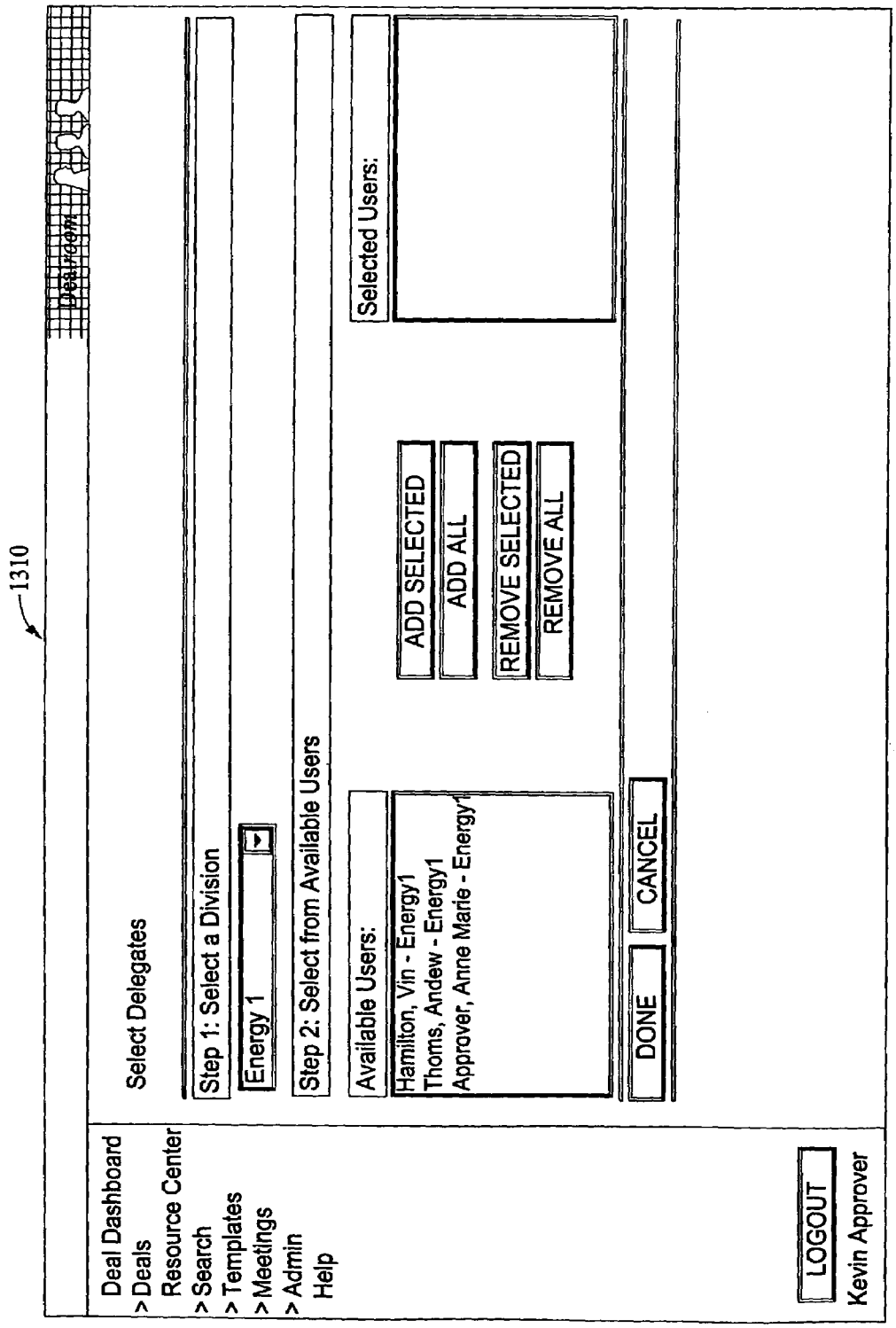
FIG. 63 is an example select delegates screen.

FIG. 63 is an example embodiment of a Select Delegates screen 1310. Select Delegates screen 1310 enables a user that has been designated as an Approver of Documents to delegate document approval authority to another user. In the example embodiment, any user may be selected as a delegate for any other user. In the example embodiment, Select Delegates screen 1310 may be accessed through My Profile screen (shown in FIG. 21) or User Profile Screen (shown in FIG. 22). Select Delegates screen 1310 displays two steps including selecting a division where a delegate is assigned and selecting from available delegates.

Figure 64:
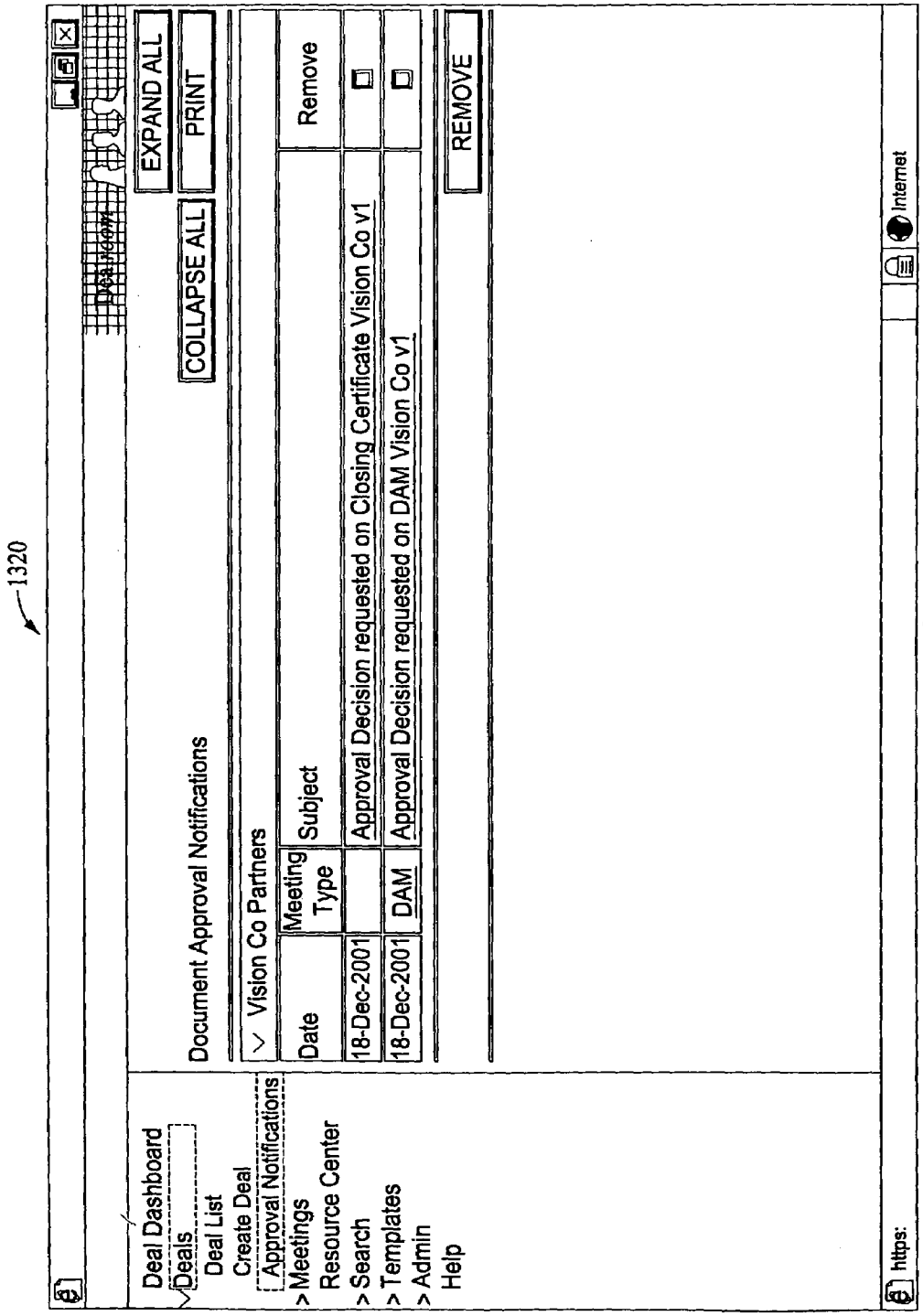
FIG. 64 is an example document approval notifications screen.

FIG. 64 is an example embodiment of a Document Approval Notifications screen 1320. Document Approval Notifications screen 1320 displays on a single page document approval notifications by specific deals. Notifications displayed on Document Approval Notifications screen 1320 are system 100 (shown in FIG. 2) generated and are sent by system 100 during the course of the document approval process. The notifications displayed on screen 1320 are user specific, which means that the notifications sent to the current user logged in to system 100 are viewed on this screen. Document Approval Notifications screen 1320 also displays a date of action taken with respect to each document to be approved, and a subject of the action taken. Screen 1320 also displays a section labeled "Meeting Type" which displays whether a document that is going through the document approval process is or has been associated with a meeting date on meeting scheduler 183 (shown in FIG. 4).

Figure 65:
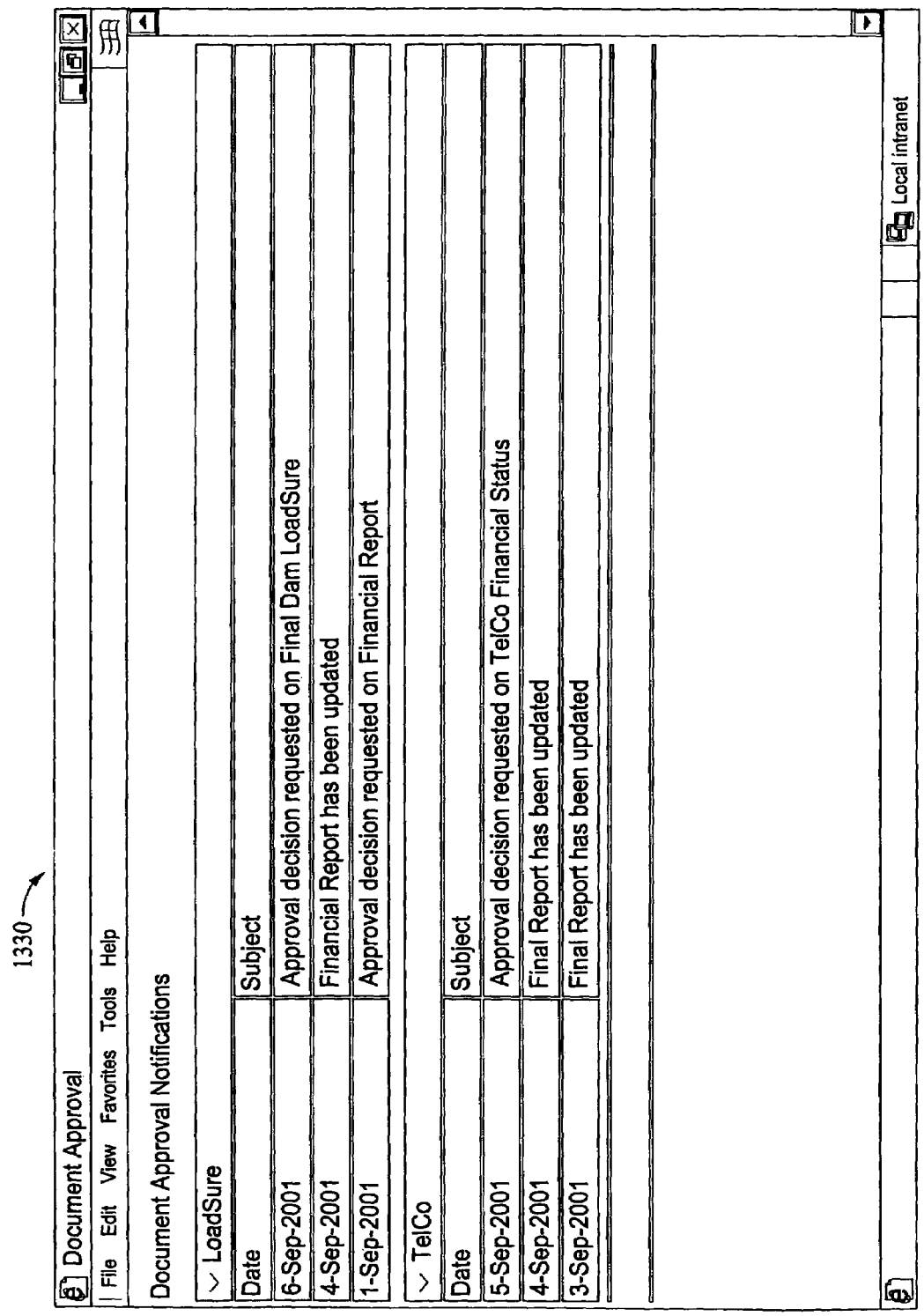
FIG. 65 is an example document approval notifications print view screen.

FIG. 65 is an example embodiment of a Document Approval Notifications Print View screen 1330. The Print View for the Document Approval Notifications screen 1320 (shown in FIG. 64) enables a user to print notifications displayed on screen 1320 and received through the document approval process. The users are enabled to print the document approval notifications with the navigation buttons hidden.

FIGS. 66A and 66B show an example embodiment of a Create/Modify Index Card screen 1340. An index card contains all meta-data for a piece of content that is added into the portal. In addition, the major functionality that surrounds a piece of content, i.e., downloading, viewing, checking in/out, editing in place, creating review copies, locking/unlocking, and changing permissions, is controlled through Create/Modify Index Card screen 1340. Create/Modify Index Card screen 1340 displays at least the following information: summary information relating to the document submitted for approval, parent folder information, version information, association information, permission information, and document approval information.

Summary information includes a Title data field, a Description edit box, a status label, and a File link. Parent folder information provides the folder that contains the specific document information. Version information includes the version number of the document, the type of file, the date the document was last modified, the user that last modified the document, and any comments relating to the document. Version information also includes a "What would you like to do" drop-down list which includes at least one of Check Out, Create Review Copy, Download and Checkout, Download File, Edit in Place, Lock File, Print File, Request Approval, Approve/Reject, and View File command. In the example embodiment, a user may select the Print File command from the drop-down list enabling the user to print a file from Index Card screen 1340. Additionally, from screen 1340, a user is enabled to download and checkout a document in one step. Association information includes an Add Association pull-down list and a association icon. Permission information includes a User Group and a Permissions pull-down list. Document approval information includes the approval status of the document, the date of the last action, and any comments relating to the document.

Figure 67:
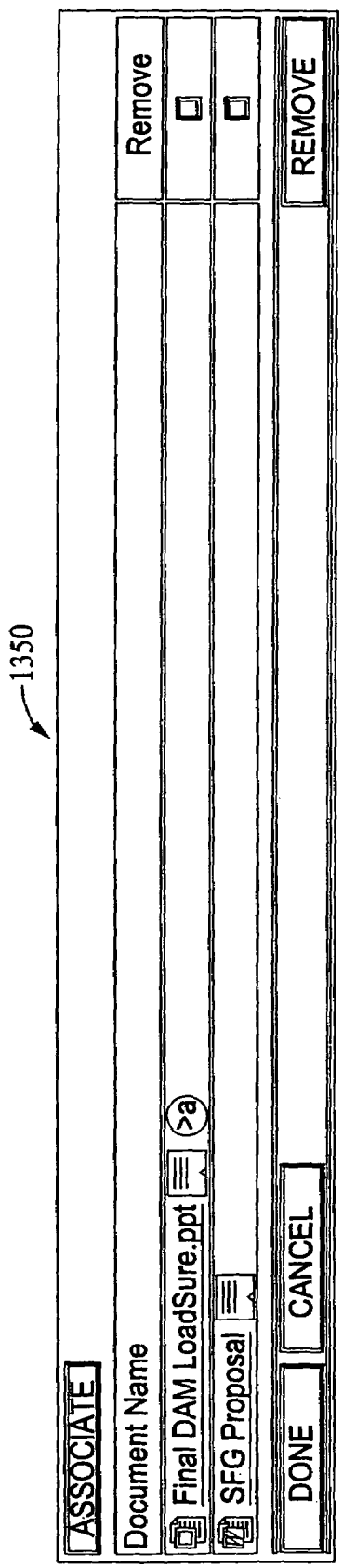
FIG. 67 is an example of a portion of an associate documents screen.

FIG. 67 is an example embodiment of a portion of an Associate Documents screen 1350. Associate Documents screen 1350 enables a user to upload documents stored within database 108 (shown in FIG. 2) and attach the uploaded documents to specific objects, for example alerts, discussions, tasks, subtasks, and deals within system 100 (shown in FIG. 2). In the example embodiment, only users that are permissioned on an associate document can view the associated document.

System 100 further enables a user to upload a document into system 100 by scanning the document and converting the document into a single electronic file, namely a PDF file (also known as an Adobe™ Portable Document Format). (Adobe is a trademark of Adobe Systems Incorporated, San Jose, Calif.). In the example embodiment, system 100 includes a document management component that manages the imaged documents within the system. The document management component enables the system to maintain and manage imaged (i.e., scanned) documents within the system. Documents can then be scanned, converted to a PDF file, indexed, and committed to system 100 where they can be retrieved and managed by system 100. In addition to enabling the scanning of these documents, the document management component will also provide additional document management functionality such as Optical Character Recognition (OCR) of scanned documents and batch printing documents without first opening the documents.

System 100 allows documents to be imaged and inserted into a selected Library and Folder within system 100. An Indexer can then search for a deal, and then select the appropriate Library Folder in which the document is to be inserted. An Indexer may also retrieve a document from the system and add additional pages to the document. System 100 also allows an Administrator to select multiple documents from within a Library and have those documents printed to a networked printer without having to open each document in the browser. System 100 also allows a an Administrator to select a single document from within a Library and have it submitted to an Optical Character Recognition (OCR) service. System 100 also enables a user to extract a document from other systems, convert the document into a single PDF file, and insert the document into system 100. The PDF files produced from this process are imaged based PDFs. Once the documents are posted into system 100, users will have the ability to request that the documents be converted into electronic based PDFs, which then provides for full text searching.

Figure 68:
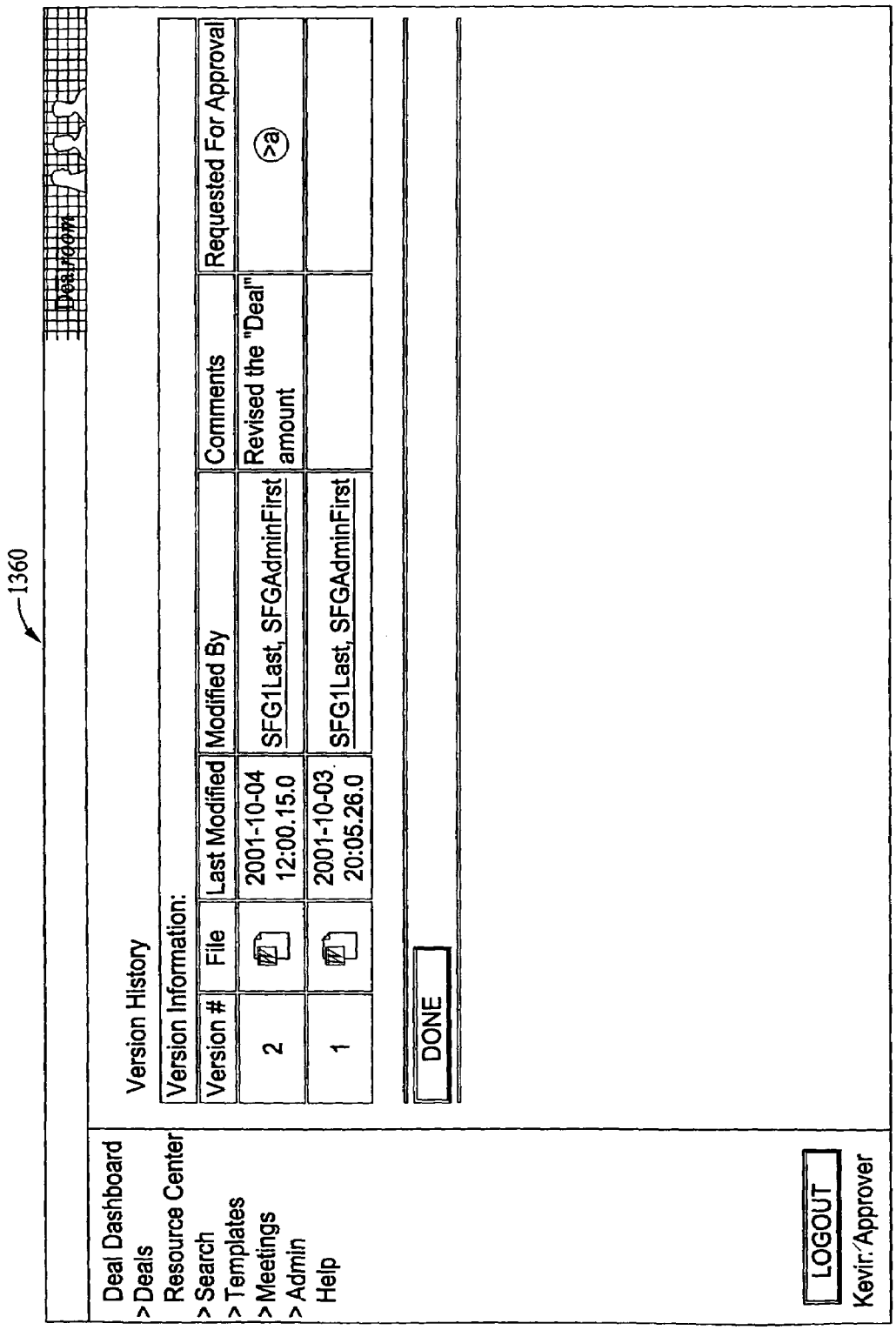
FIG. 68 is an example version history screen.

FIG. 68 is an example embodiment of an Version History screen 1360. Version History screen 1360 enables a user to view all previous versions of a specific document stored in database 108 (shown in FIG. 2). By enabling a user to view each version of a specific document, system 100 (shown in FIG. 2) enables a user to track all changes that have been made over the life of the document. Screen 1360 displays a version number for the document, a type of file, when the document was last modified, who last modified the document, and any comments relating to the document. Additionally, if a document version is selected for document approval, then screen 1360 will display a link to Document Approval Detail screen 1280 (shown in FIG. 60). Version Screen 1360 also enables a user to delete old document versions as long as those versions have not gone through the document approval process.

Meeting Scheduler Process

Figure 69:
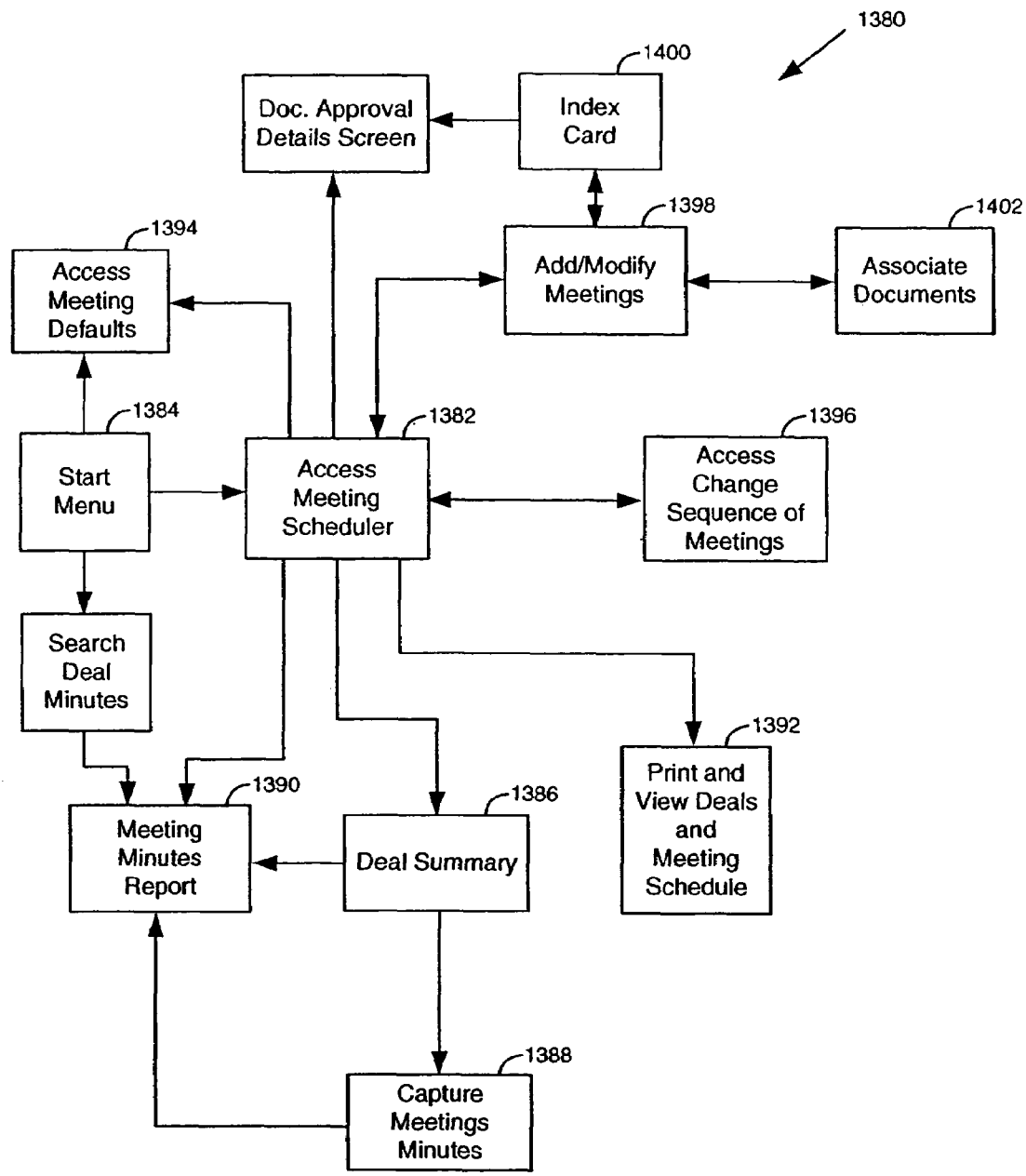
FIG. 69 is a flowchart illustrating a meeting scheduler process through functionality of a system shown in FIG. 2.

FIG. 69 is a flowchart 1380 illustrating a meeting scheduler process through functionality of system 100. In the example embodiment, a meeting is scheduled through meeting scheduler 183 (shown in FIG. 4) to discuss a specific deal. A user accesses 1382 a meeting scheduler screen through start menu screen 1384. Deal summary screen 1386 (shown in FIG. 15) launches a meeting minutes capture screen 1388 and a meeting minutes report 1390. After accessing 1382 meeting scheduler screen, the user may view and print 1392 all deals that the user has permission to view and a meeting schedule for a selected day. From start menu 1384, the user may also access 1394 a meeting default screen that enables the user to manipulate values that are defaulted to in several of the different fields. The values, populated by the defaults, for a specific meeting date can be accessed via the meeting defaults screen by a system administrator. The system administrator may change the default data from the meeting scheduler, but only for that specific meeting date. Additionally, the meeting scheduler screen enables an administrator user to access 1396 a change sequence of meetings screen that allows the administrator user to change the sequence of meetings prior to finalizing a schedule. The user can also add/modify 1398 a meeting from the meeting scheduler screen. After accessing 1382 meeting scheduler screen, the user is enabled to access 1400 an index card page that contains all of the meta-data for a piece of content that is added into system 100 through the portal, and can associate 1402 a document with a scheduled meeting.

Example Viewable Screen Shots for Meeting Scheduler

FIG. 70 is an example embodiment of a Meeting Scheduler screen 1420. Meeting Scheduler screen 1420 enables a user to display a calendar and activate schedule times, view and print a meeting schedule, and view and print documents relating to a specific date and/or deal. Meeting Scheduler screen 1420 also enables a user to add a meeting to a schedule. Meeting Scheduler screen 1420 displays two sections that include a location and detail section, and a meeting summary section. The location and detail section displays: a meeting date, a meeting time, a conference room, a chairperson, a call-in number, comments, a final schedule check box, an available check box, a monthly calendar, an add meeting button, a delete meeting button, a default schedule button, and a change sequence button. The meeting summary section displays for a specific deal or time: a meeting time, a deal name, a meeting type, a division, a presenter, documents associated with the meeting, and a meeting minutes icon.

FIG. 71 is an example embodiment of a Meeting Scheduler Print View screen 1430. The Print View for the Meeting Scheduler screen 1420 (shown in FIG. 70) enables a user to print a schedule for a selected day. Screen 1430 enables the user to print a schedule in an expanded or collapsed mode and is able to view all of the deals the user has permission to view. In the example embodiment, if there is a "Confidential" deal, then the deal name will be listed as a "Confidential Deal."

FIG. 72 is an example embodiment of a Meeting Scheduler Default View screen 1440. Meeting Scheduler Default View screen 1440 may be accessed through the start menu on system 100 (shown in FIG. 2). Screen 1440 enables a user to manipulate values that will be defaulted to in several of the different data fields displayed on Meeting Scheduler screen 1420 including meeting start time, conference room, chairperson, call in number, duration of meeting, and default meeting days of the week. In the example embodiment, meeting start time is defaulted to "8:00 AM" or a value that the time has been changed to previously; time zone is defaulted to "EST" or a value that the time zone has been changed to; conference room is defaulted to "3C-65" or a value that the conference room has been previously changed to; chairperson is defaulted to "R. Lewis" or a value that the chairperson has been previously change to; call in number is defaulted to a value that the call in number has been changed to; and duration of meeting is defaulted to "30 minutes" or a value that the duration has been changed to previously.

Figure 73:
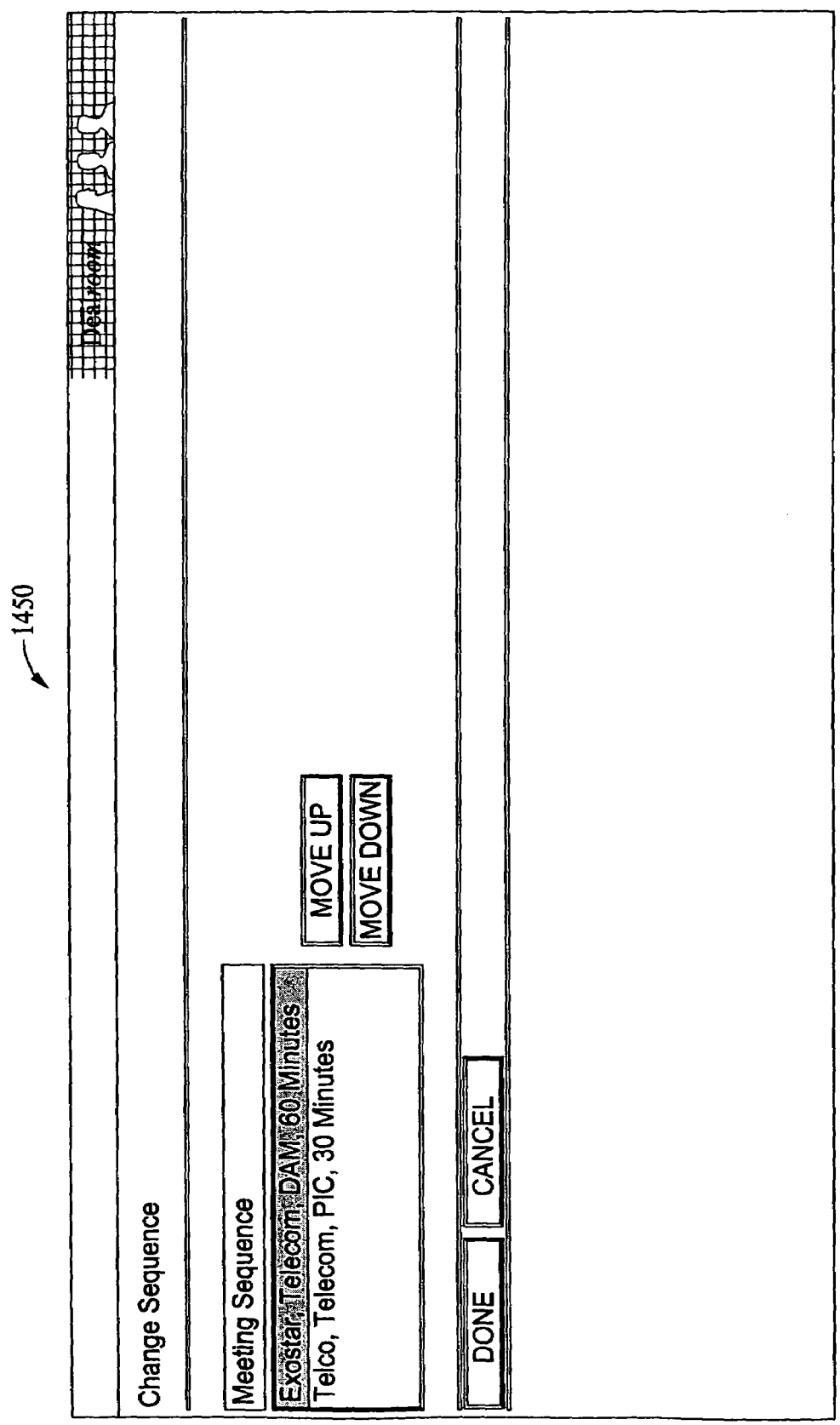
FIG. 73 is an example change sequence screen.

FIG. 73 is an example embodiment of a Meeting Change Sequence screen 1450. Meeting Change Sequence screen 1450 may be accessed through Meeting Scheduler screen 1420 (shown in FIG. 70). Screen 1450 enables an administrator to select and configure a sequence of meetings prior to finalizing a schedule. Additionally, screen 1450 enables the administrator to change a meeting sequence after finalizing a meeting schedule by unchecking a "Final" schedule.

FIG. 74 is an example embodiment of an Add Meeting screen 1460. Add Meeting screen 1460 may be accessed through Meeting Scheduler screen 1420 (shown in FIG. 70) by selecting an Add Meeting button. Add Meeting screen 1460 enables a user to add a meeting to a schedule by entering a start time, a meeting duration, a type of meeting from a pull-down list, a deal name from a pull-down list, and a presenter from a pull-down list. Screen 1460 also enables a user to associate documents for approval with the added meeting.

FIG. 75 is an example embodiment of a Modify Meeting screen 1470. Modify Meeting screen 1470 may be accessed through Meeting Scheduler screen 1420 (shown in FIG. 70). Modify Meeting screen 1470 enables a permissioned user to modify a meeting already scheduled by modifying at least one of a meeting start time, a meeting duration, a type of meeting from a pull-down list, a deal name from a pull-down list, and a presenter from a pull-down list. Screen 1470 also enables a user to associate documents, whether or not they have been submitted for approval, with the modified meeting.

Meeting Minutes Creation and Search Process

Figure 76:
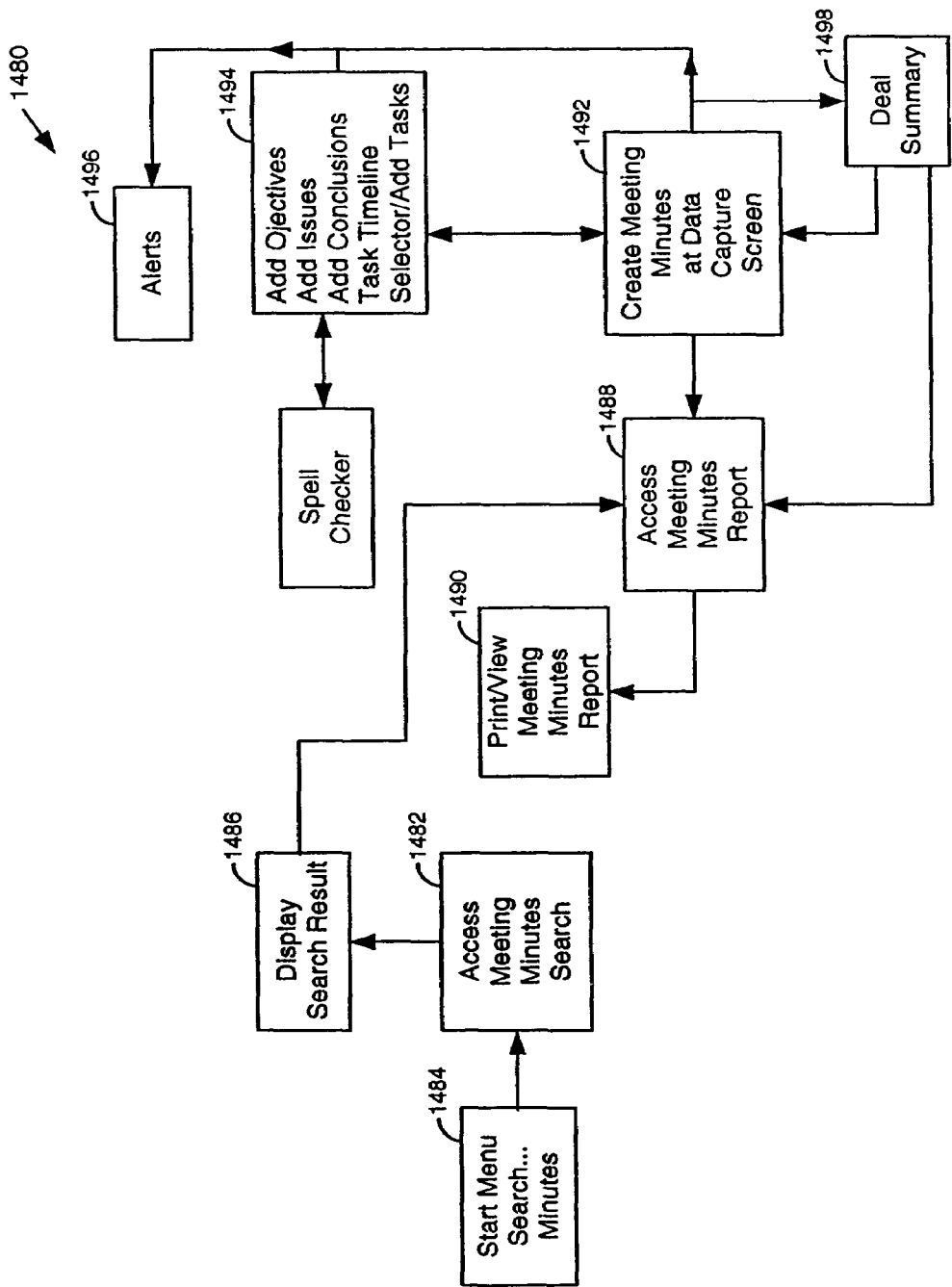
FIG. 76 is a flowchart illustrating a meeting minutes search process through functionality of a system shown in FIG. 2.

FIG. 76 is a flowchart 1480 illustrating a meeting minutes creation and search process through functionality of system 100 (shown in FIG. 2). In the example embodiment, meetings are scheduled relating to deals. Minutes from the meetings are then generated and stored in system 100. Meeting Minutes Creation and Search 187 (shown in FIG. 4) enables a user to create minutes for a meeting, search for deals with existing meeting minutes stored in database 108 (shown in FIG. 2), view the search results, and view selected meeting minutes. A user searches for meeting minutes by accessing 1482 meeting minutes search screen through Start Menu 1484 by selecting a search command. After a user has accessed 1482 meeting minutes search screen, the user may perform a search for meeting minutes by searching by at least one of deal name, company name, user that last modified the minutes, last modified date, division, and reviewer criteria. After conducting the search, the search results are displayed 1486 on computer 104 (shown in FIG. 2). The user then selects a specific deal from displayed 1486 search results. The user then accesses 1488 minutes for all meetings for the selected deal. The user is then enabled to print 1490 the minutes for each of the displayed meetings.

System 100 also enables a user to create meeting minutes for a previously scheduled meeting. The user creates 1492 the meeting minutes at a minutes data capture screen. From the minutes data capture screen, the user creates 1492 meeting minutes that may include adding 1494 objectives, issues, conclusions, and tasks for a selected meeting, and may request 1496 alerts that are transmitted to designated users. The user may access the minutes data capture screen through the Deal Summary screen 1498 (shown in FIG. 15). Meeting minutes that are created 1492 at the minutes data capture screen can then be searched for by accessing 1482 the meeting minutes search screen. System 100 also enables a user to select a reviewer of meeting minutes. Once completed, system 100 transmits a link via electronic mail to system 100 and the meeting minutes for a specific meeting to the selected reviewer for approval.

Example Viewable Screen Shots for Meeting Minutes Creation and Search

Figure 77:
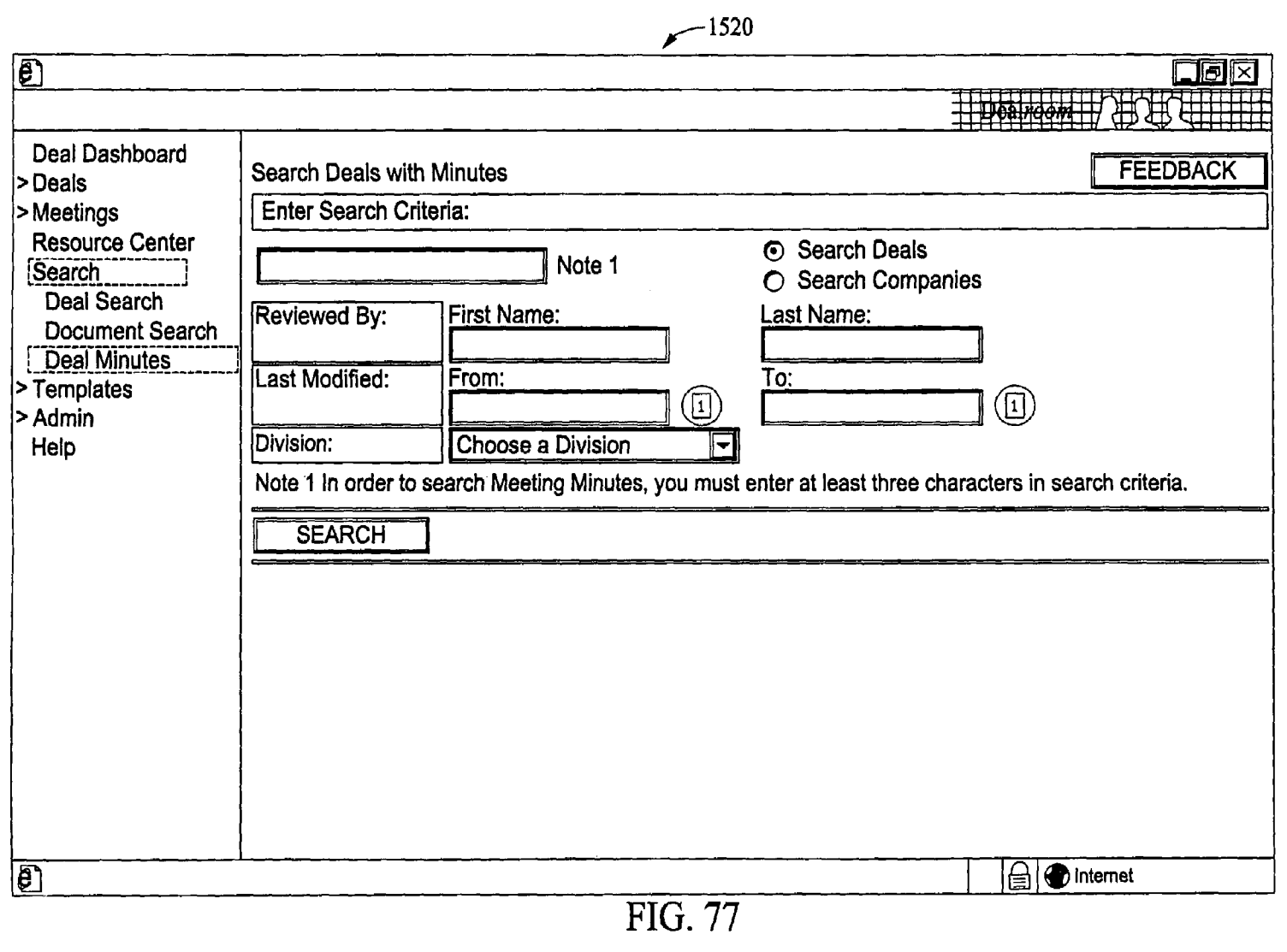

FIG. 77 is an example embodiment of a Search Deals with Minutes screen 1520. Search Deals with Minutes screen 1520 enables a user to search for deals with existing meeting minutes stored in database 108 (shown in FIG. 2). Screen 1520 enables the user to search for minutes for a selected meeting by searching on at least one of a deal name, a company name, a last modified by user, a last modified by date, a division, and a reviewer name.

Figure 78:
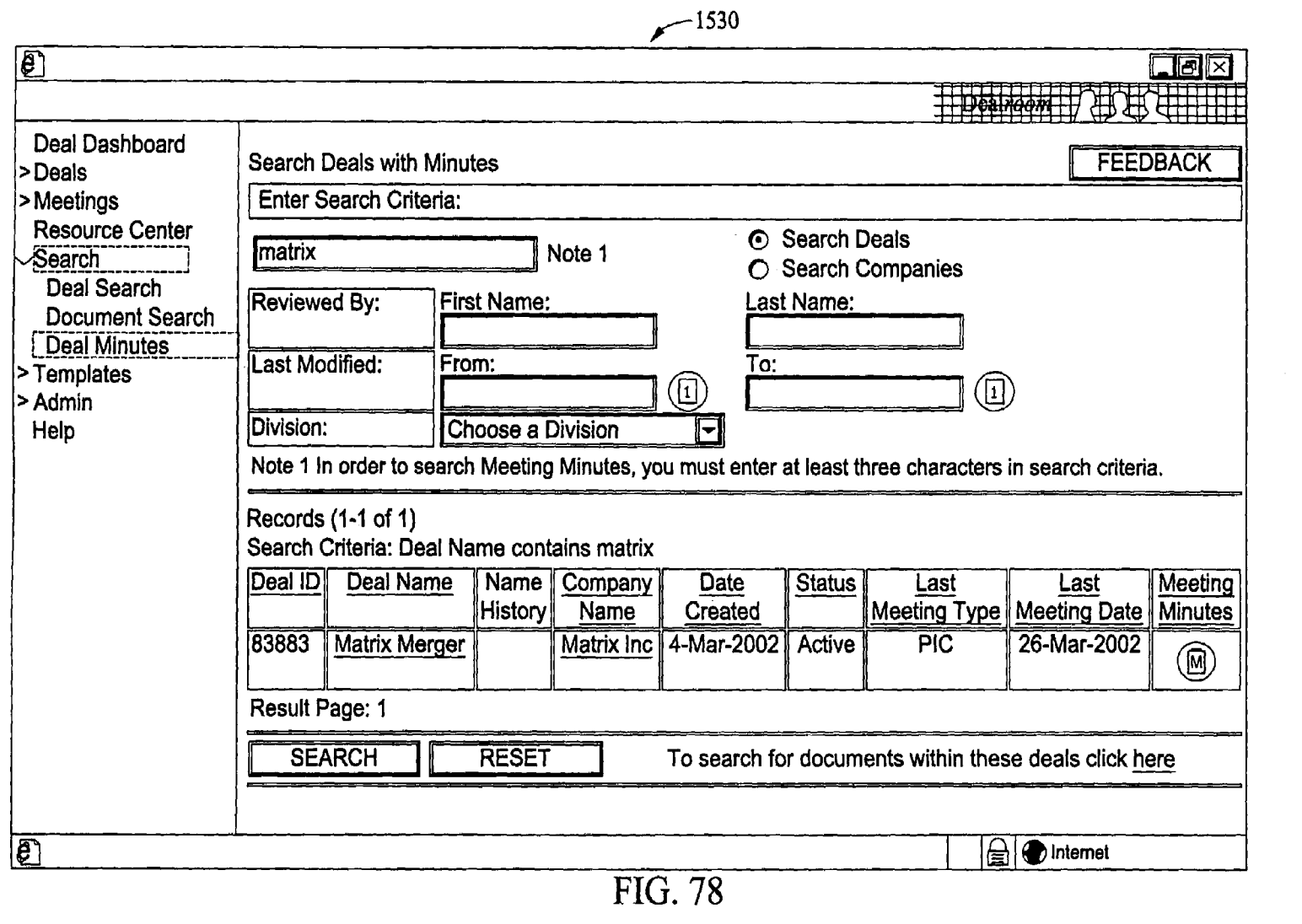

FIG. 78 is an example embodiment of a Search Deals with Minutes screen 1530. Search Deals with Minutes screen 1530 displays a search criteria entered by a user through Meeting Minutes Search screen 1520 (shown in FIG. 77) with search results satisfying the entered search criteria. Screen 1530 displays the search results in chart form including the following column headers: Deal ID, Deal Name, Name History, Company Name, Date Created, Status, Last Meeting Type, Last Meeting Date, and Meeting Minutes. In the example embodiment, the user can access minutes for a specific meeting by clicking on a minutes icon for the specific meeting below the Meeting Minutes column header.

In one embodiment, to prevent a user from having to re-enter search criteria in a meeting minutes search after viewing an index card displaying the search results, the search results are cached. This enables users to more easily navigate back and forth between the search results and the index cards of the meeting minutes returned in the search results.

FIGS. 79A and 79B show an example embodiment of a Meeting Minutes Report screen 1540. Meeting Minutes Report screen 1540 is an aggregate report of all meetings for a specific deal that enables a user to print a report for further analysis. Three sections are displayed on Meeting Minutes Report screen 1540. The first section is entitled Transaction. The second section is labeled Deal Team. The third section is labeled Meeting Discussions. The Transaction section includes at least one of a company field, a reporting region field, a division field, a subdivision field, an approval required field, a sourced amount field, and a retained amount field. The Deal section includes a listing of persons assigned to a deal team working on the selected deal with contact information. The Meeting Discussions section includes at least one of a meeting type field, a prepared by field, a reviewed by field, a last modified field, a completed field, a reviewed field, an attendees field, an objectives field, an issues discussed field, a conclusions field, and a tasks field. The Meetings Discussions section then repeats for each meeting listed for the specific deal.

FIGS. 80A and 80B show an example embodiment of a Meeting Minutes Report Print View screen 1550. The print view screen for the Meeting Minutes Report screen 1550 (shown in FIGS. 79A and 79B) enables a user to view and print a meeting minutes report for a specific deal.

FIG. 81 is an example embodiment of a Meeting Minutes Data Capture screen 1560. Meeting Minutes Data Capture screen 1560 enables a user to create meeting minutes for a previously scheduled meeting. The user adds at least one of objectives, issues, conclusions, and tasks for a give set of meeting minutes. In the example embodiment, once the information is entered into screen 1560, the user can click on a Check Spelling button to check spelling on screen 1560. Screen 1560 displays a Details section that includes at least the following information: meeting type, prepared by, status, last modified, division, and reviewer name. Screen 1560 also displays a data entry box for listing attendees of a meeting.

FIG. 82 is an example embodiment of a Meeting Minutes Data Capture Create Objective screen 1570. Meeting Minutes Data Capture Create Objective screen 1570 may be accessed when a user clicks on Add Objective button on Meeting Minutes Data Capture screen 1560 (shown in FIG. 81). Meeting Minutes Data Capture Create Objective screen 1570 enables the user to create and add an objective to Meeting Minutes Data Capture screen 1560. Spell checking can be invoked from screen 1570. Data added through screen 1570 is stored in database 108 (shown in FIG. 2) after the user clicks a Done button or a Save and Next button on screen 1570.

Figure 83:
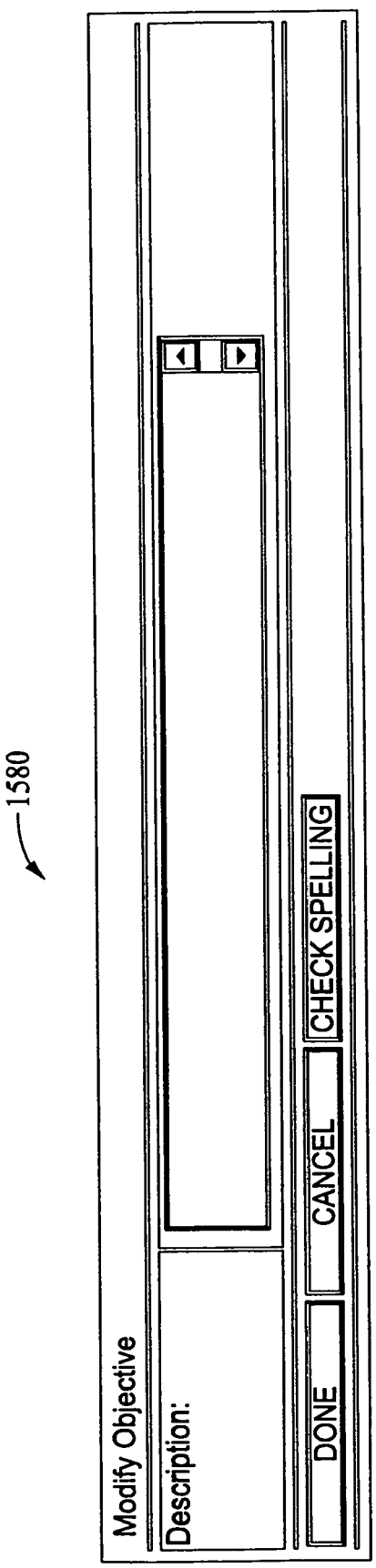
FIG. 83 is an example meeting minutes modify objective screen.

FIG. 83 is an example embodiment of a lower portion of a Meeting Minutes Data Capture Modify Objective screen 1580. Meeting Minutes Data Capture Modify Objective screen 1580 may be accessed when a user clicks on an objective listed on Meeting Minutes Data Capture screen 1560 (shown in FIG. 81). Meeting Minutes Data Capture Modify Objective screen 1580 enables the user to modify an existing objective shown on Meeting Minutes Data Capture screen 1560. Spell checking can be invoked from screen 1580. Data added through screen 1580 is stored in database 108 (shown in FIG. 2) after the user clicks a Done button on screen 1580.

FIG. 84 is an example embodiment of a lower portion of Meeting Minutes Data Capture Create Issue screen 1590. Meeting Minutes Data Capture Create Issue screen 1590 may be accessed when a user clicks on Add Issue button on Meeting Minutes Data Capture screen 1560 (shown in FIG. 81). Meeting Minutes Data Capture Create Issue screen 1590 enables the user to create and add an issue to Meeting Minutes Data Capture screen 1560. Spell checking can be invoked from screen 1590. Data added through screen 1590 is stored in database 108 (shown in FIG. 2) after the user clicks a Done button or a Save and Next button on screen 1590.

Figure 85:
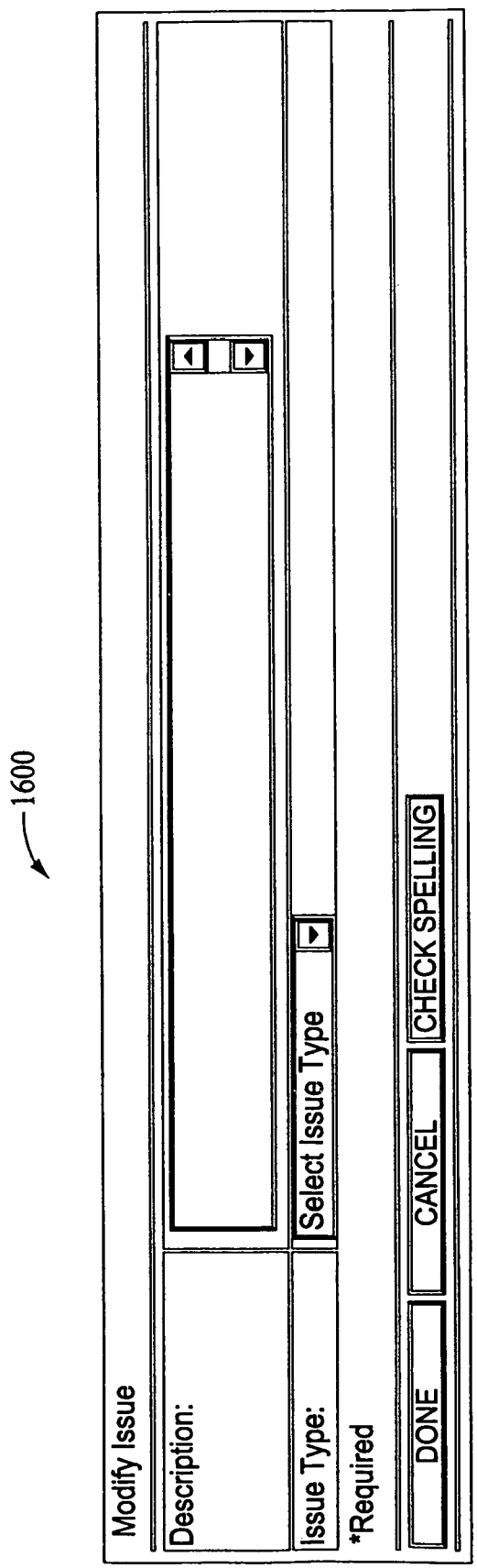
FIG. 85 is an example meeting minutes modify issue screen.

FIG. 85 is an example embodiment of a lower portion of Meeting Minutes Data Capture Modify Issue screen 1600. Meeting Minutes Data Capture Modify Issue screen 1600 may be accessed when a user clicks on an issue listed on Meeting Minutes Data Capture screen 1560 (shown in FIG. 81). Meeting Minutes Data Capture Modify Issue screen 1600 enables the user to modify an existing issue shown on Meeting Minutes Data Capture screen 1560. Spell checking can be invoked from screen 1600. Data added through screen 1600 is stored in database 108 (shown in FIG. 2) after the user clicks a Done button on screen 1600.

Figure 86:
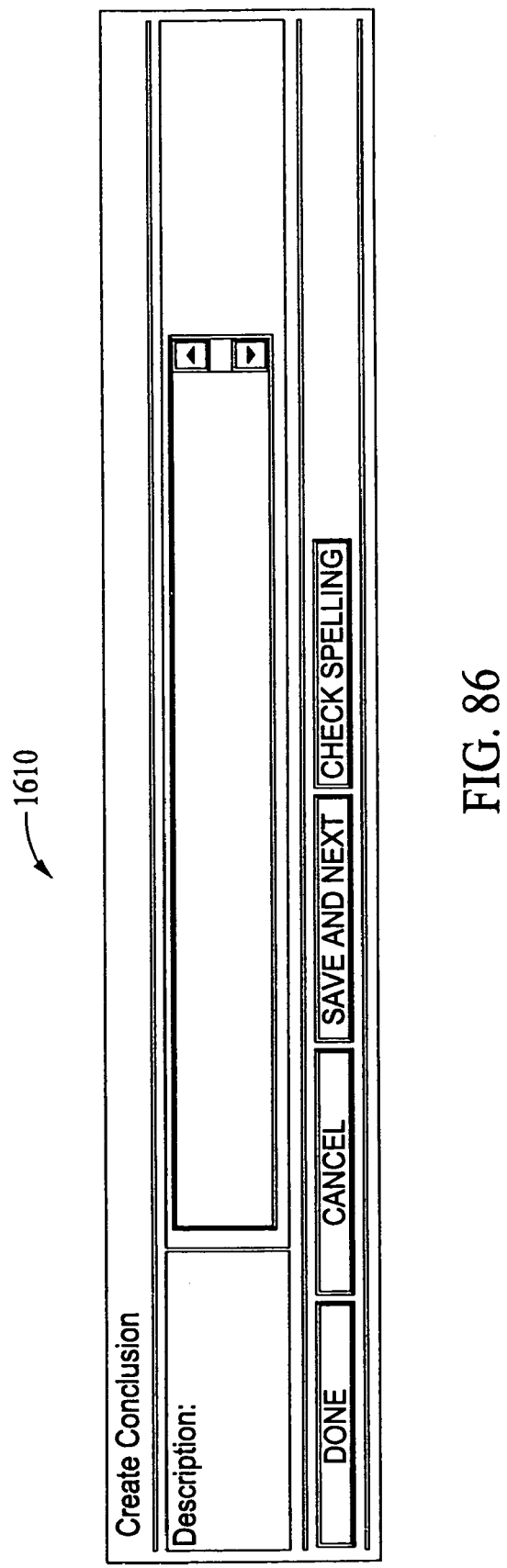
FIG. 86 is an example meeting minutes create conclusion screen.

FIG. 86 is an example embodiment of a lower portion of Meeting Minutes Data Capture Create Conclusions screen 1610. Meeting Minutes Data Capture Create Conclusions screen 1610 may be accessed when a user clicks on Add Conclusion button on Meeting Minutes Data Capture screen 1560 (shown in FIG. 81). Meeting Minutes Data Capture Create Conclusions screen 1610 enables the user to create and add a conclusion to Meeting Minutes Data Capture screen 1560. Spell checking can be invoked from screen 1610. Data added through screen 1610 is stored in database 108 (shown in FIG. 2) after the user clicks a Done button or a Save and Next button on screen 1610.

Figure 87:
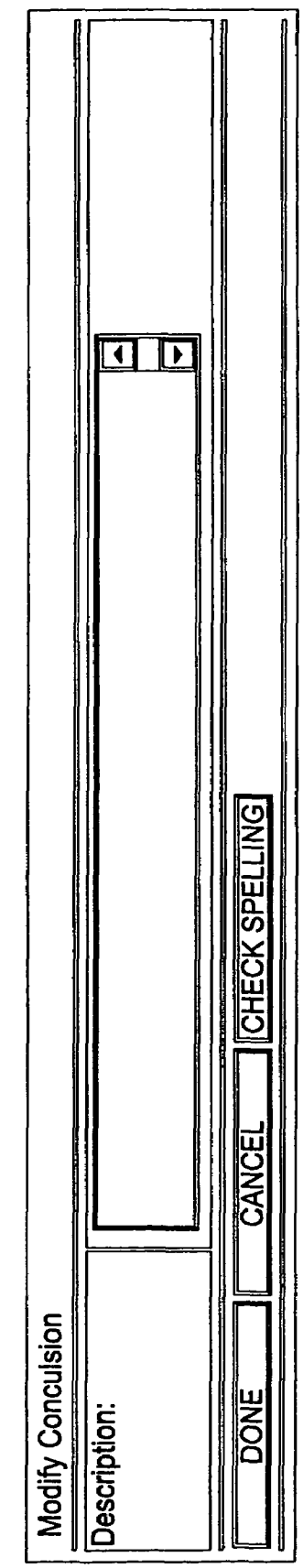
FIG. 87 is an example meeting minutes modify conclusion screen.

FIG. 87 is an example embodiment of a lower portion of Meeting Minutes Data Capture Modify Conclusion screen 1620. Meeting Minutes Data Capture Modify Conclusion screen 1620 may be accessed when a user clicks on a conclusion listed on Meeting Minutes Data Capture screen 1560 (shown in FIG. 81). Meeting Minutes Data Capture Modify Conclusions screen 1620 enables the user to modify an existing conclusion shown on Meeting Minutes Data Capture screen 1560. Spell checking can be invoked from screen 1620. Data added through screen 1620 is stored in database 108 (shown in FIG. 2) after the user clicks a Done button on screen 1620.

FIG. 88 is an example embodiment of a Task Timeline screen 1630. Task Timeline screen 1630 may be accessed when a user clicks on an Add Task button displayed on Meeting Minutes Data Capture screen 1560 (shown in FIG. 81). Task Timeline screen 1630 enables the user to insert a task or subtask that is created during the Meeting Minutes Data Capture process. The task or subtask is then displayed on Meeting Minutes Data Capture screen 1560. Screen 1630 also includes a Filter drop-down box which enables a user to filter tasks.

Task Timeline screen 1630 also displays an Update Tasks button. Selecting the Update Tasks button directs a user to an Update Tasks mode, which creates editable data fields within Task Timeline screen 1630 such that the user may enter task data. Update Tasks mode screen 1632 is shown in FIG. 89. Screen 1632 enables a user to enter a status of a task. In one embodiment, the Status drop-down box includes In Progress, Not Started, and Completed. System 100 is further configured to when all tasks within a Milestone have been completed, the Milestone is automatically set to Completed.

In one particular embodiment, a Deal Finance screen 1640, shown in FIG. 90, within the deal space displays financial information on a deal such as funded amount, match funded indicators, and Actual Fiscal Year information. Users with appropriate permission levels have access to view or modify existing deal information. In one embodiment, non-company users cannot access screen 1640.

Figure 91:
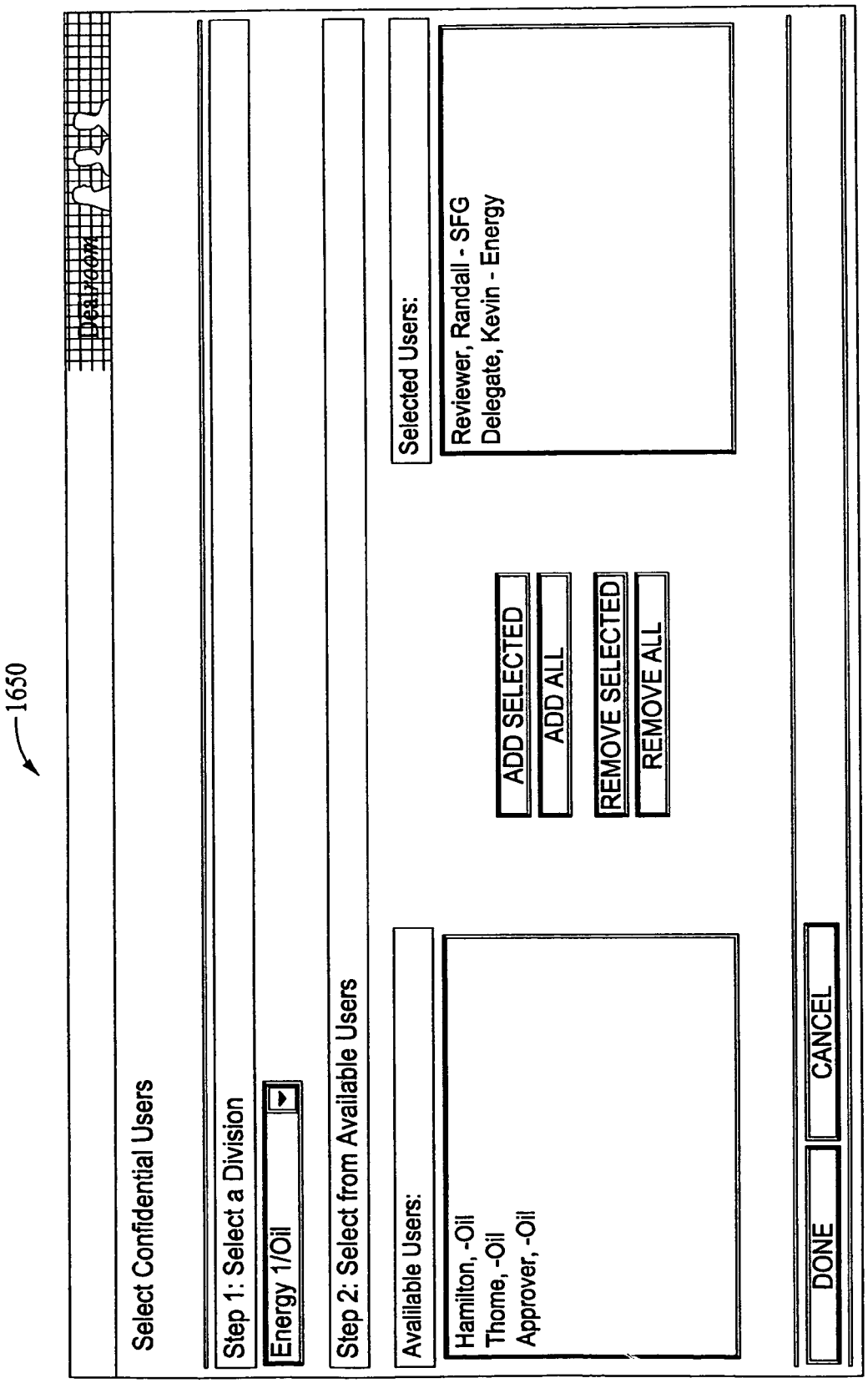
FIG. 91 is an example select confidential users screen.

FIG. 91 is an example embodiment of a Select Confidential Users screen 1650. Select Confidential Users screen 1650 enables active Deal Team Members to select other users, which they would like to give modify permissions to a confidential deal without having them on the deal team or selecting them as approvers for documents. Users that are selected at Confidential Users screen 1650 will be able to view the specified confidential deal on their deal list, the meeting scheduler, and the deal search results. These deals, however, will not be displayed on the user's Deal Dashboard.

Business Reorganization

In one embodiment, system 100 includes an authority level referred to as a Business Superadmin. A Superadmin user has all permissions of a normal Administrator user, and also has the ability to delete Divisions, Deals, Companies, and Users from system 100. A Superadmin user also reorganizes business structure, maintains drop-down lists, configures a Deal Profile page, and creates Milestone Templates. Business Superadmins are also able to access Confidential Deals. Business Superadmins users are managed in the same fashion as other system users are managed. Initial Superadmins for each business are created on installation of system 100; Superadmin passwords are initialized in the same fashion. Superadmins have the ability to create any type of user in system 100, including other Superadmins.

Figure 92:
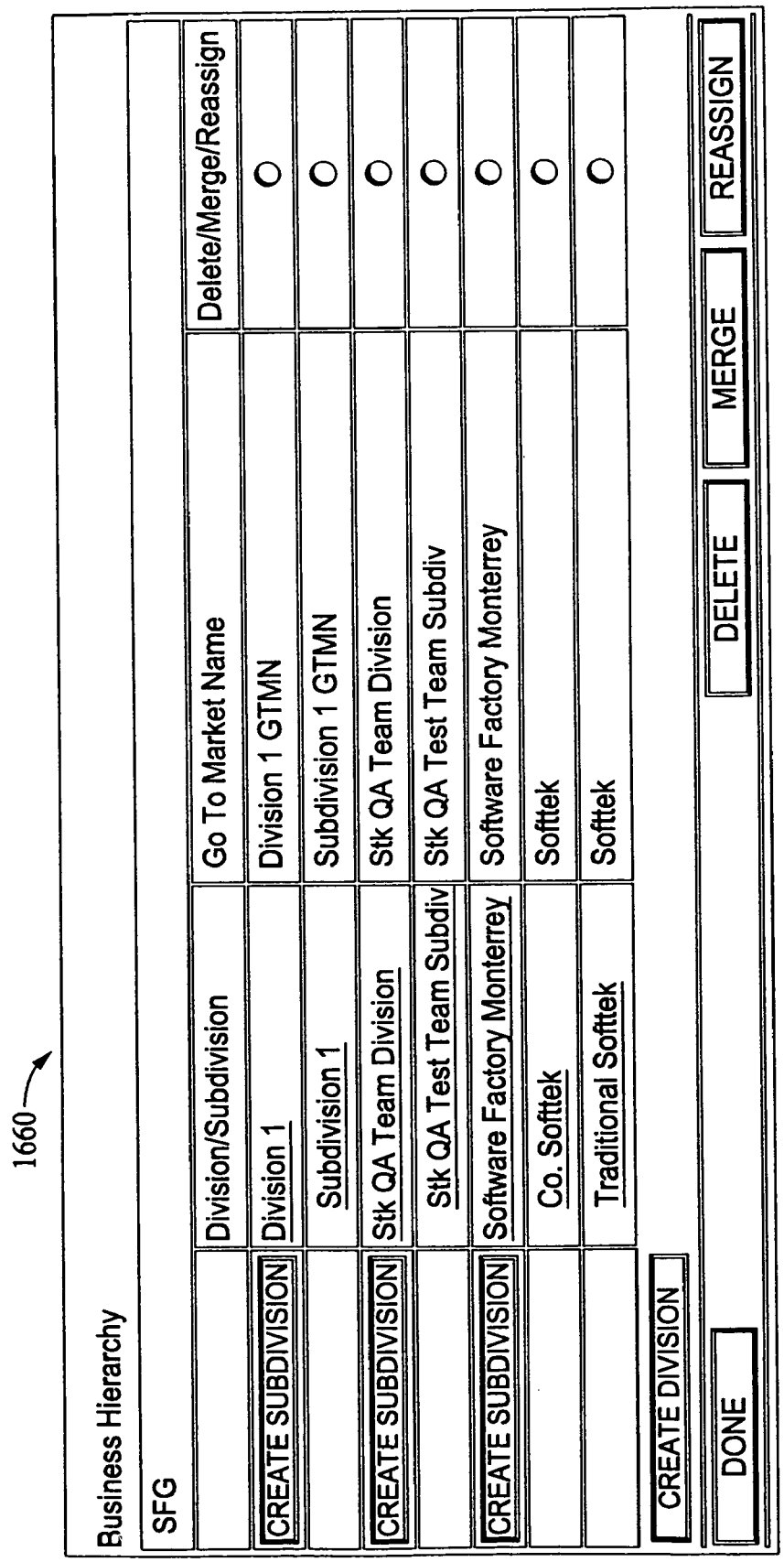
FIG. 92 is an example business hierarchy screen.

FIG. 92 is an example embodiment of a Business Hierarchy screen 1660. Screen 1660 includes a Create Division button, at least one Create Subdivision button, a Delete button, a Merge button, and a Reassign button. Screen 1660 enables a Superadmin user to delete a division or a subdivision within system 100. A Superadmin user may also merge divisions and subdivisions within system 100 by selecting the Merge button through screen 1660. After selecting the Merge button, a user is prompted to select a target mergee. System 100 then merges the selected division or subdivision into the selected target division or subdivision. Additionally, a Superadmin user may also reassign divisions and subdivisions within system 100 by selecting the Reassign button through screen 1660. After selecting the Reassign button, a user is prompted to select a target for reassignment. System 100 then reassigns the selected division or subdivision into the selected target division or subdivision.

FIG. 93 is an example embodiment of a Deal Search Results screen 1670 that includes a Delete button and a Reassign button. The Delete button on screen 1670 enables a permissioned user to delete a deal from within system 100. The Reassigned button on screen 1670 enables a permissioned user to reassign a deal from within system 100.

FIG. 94 is an example embodiment of a Deal List screen 1680 that includes a Delete button and a Reassign button. The Delete button on screen 1680 enables a permissioned user to delete a deal from within system 100. The Reassign button on screen 1680 enables a permissioned user to reassign a deal from within system 100.

FIG. 95 is an example embodiment of a portion of Deal Profile screen 1690 (full screen shown in FIG. 44) when a Deal Status has been designated as "Dead." In this embodiment, screen 1690 displays that a user may select options from a Deal Status drop-down list that include Active, Closed, Dead, Inactive, Matured, Paid Off, and Sold. When a deal is marked Dead, the deal is no longer in progress, external users are deactivated, and all automatic notifications are halted.

FIG. 96 is another example embodiment of a portion of Deal Profile screen 1700 (full screen shown in FIG. 44) when a Deal Status has been designated as "Divested." In this embodiment, screen 1700 displays that a user may select options from a Deal Status drop-down list that include Divested (also known as Dead), Funded, In Process, and Rejected. When a deal is marked Divested, the deal is no longer in progress, external users are deactivated, and all automatic notifications are halted.

FIG. 97 is an example embodiment of a portion of Deal Profile screen 1710 (full screen shown in FIG. 44) when a Deal Status has been designated as "Dead." In this embodiment, screen 1710 displays that a user may select options from a Deal Status drop-down list that include Approved, Awaiting information, Awarded, Conditional Approval, Dead, Declined, Divested, Documentation, In Credit—Active, In Credit Idle, and One Pager. When a deal is marked Dead, the deal is no longer in progress, external users are deactivated, and all automatic notifications are halted.

Blackline Integration

System 100 also enables a user to compare documents and track changes to documents stored within system 100 through a blacklining function. A user accesses the blackline function by navigating to an Index Card of a document with multiple versions to which the user has edit permission. FIGS. 98A and 98B show an example embodiment of a Modify Index Card screen 1720 showing the blackline command. (Another embodiment of a Modify Index Card screen is shown in FIGS. 66A and 66B.) Modify Index Card screen 1720 displays at least the following information: summary information relating to the document submitted for approval, parent folder information, version information, association information, and permission information.

Summary information includes a Title data field, a Description edit box, a Status label, and a File link. Parent folder information provides the folder that contains the specific document information. Version information includes the version number of the document, the type of file, the date the document was last modified, the user that last modified the document, and any comments relating to the document. Version information also includes a "What would you like to do" drop-down list which includes at least one of Check Out, Create Review Copy, Download File, Edit in Place, Lock File, View File, Print File, and Blackline command. In the example embodiment, a user may select the Blackline command to compare different versions of a document or track changes to a document. The resulting blackline document is then automatically uploaded into system 100 and assigned its own Index Card.

FIG. 99 is an example embodiment of a Blackline Selector screen 1730. After the user selects the Blackline command on screen 1720 (shown in FIGS. 98A and 98B), system 100 displays Blackline Selector screen 1730 which displays all document versions, including the current version, associated with the selected Index Card. More specifically, screen 1730 displays a chart that includes a Select column, a Version Number column, a File column, a Last Modified column, a Modified By column, and a Comments column. Screen 1730 also includes a Blackline button, and a Cancel button. A user creates a blackline comparison of two versions of a document by clicking on a Select check box next to the two document versions that the user wishes to compare. The user then clicks on the Blackline button.

FIG. 100 is an example embodiment of Blackline Comparison screen 1740. After the user selects the two document versions to be compared and clicks on the Blackline button on screen 1730 (shown in FIG. 99), system 100 generates a blackline comparison document. In the example embodiment, the blackline comparison document is generated through a known and commercially available software program that is installed on a hard drive on the user's computer system. In the example embodiment, the known and commercially available software program is the DeltaView® software (DeltaView is a registered trademark of and the DeltaView software is commercially available from Workshare Technology, Inc., San Francisco, Calif.). The resulting blackline document is then automatically uploaded into system 100 and assigned its own Index Card.

FIGS. 101A and 101B show an example embodiment of a Modify Index Card screen 1750 for a blackline document. After creating a blackline comparison document as shown in FIG. 100, the resulting blackline document is automatically uploaded into system 100 and assigned its own Index Card. System 100 then displays screen 1750 which displays the Index Card for the resulting blackline document. In the example embodiment, screen 1750 shows that the document assigned to this Index Card is a blackline comparison of Version 5 and Version 2 of a Resume.

Profile Configuration

System 100 also includes a Profile Configuration function that enables a user to reconfigure the Deal Profile screen (shown in FIG. 44) depending upon the needs of the user. The Profile Configuration function allows for custom, flexible Deal Profile page definition with levels of control defined at both the cross-business level and at the level in which deals are owned. More specifically, the Profile Configuration function enables a Superadmin user to create mandatory data fields that are displayed on the Deal Profile screen. The Profile Configuration function also facilitates the need for Deal Profile page development efforts each time a new business is added to system 100. The Profile Configuration function necessitates the entry of required profile attributes, provides the ability to define custom profile fields for reporting purposes across multiple businesses, and provide the ability to define custom profile fields for multiple deal types.

FIG. 102 is an example embodiment of a Profile Master Field List screen 1760. Screen 1760 allows a Superadmin user and a Report Admin user to view and manage all data fields that will be available at a level at which deals are owned and shared for creating custom Deal Profile configurations. The fields defined on screen 1760 are the fields available for selection when creating the custom section of the Deal Profile tab for a given Deal Type. In the example embodiment, screen 1760 is utilized to define the database schema that will be used to support custom Deal Profile fields for a business. In the example embodiment, screen 1760 includes a Group Filter pull-down list, an Add Field button, an Add Group button, a Group column, a Field Name column, a Description column, and a Remove column that includes check boxes.

Figure 103:
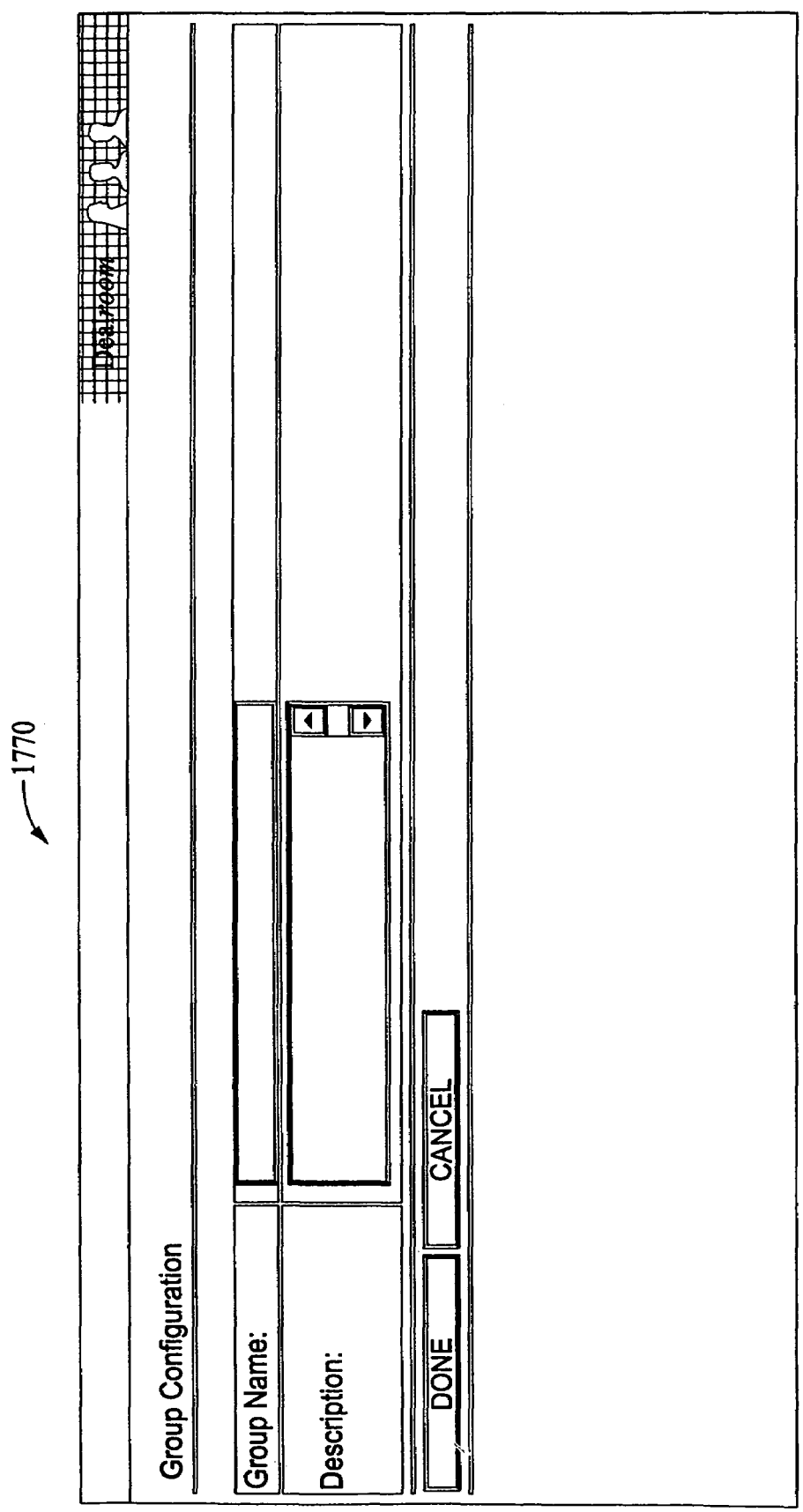
FIG. 103 is an example embodiment of a create/modify profile field group screen.

FIG. 103 is an example embodiment of a Create/Modify Profile Field Group screen 1770. Screen 1770 allows a user to create, modify, or delete the groups used to organize data fields within the Profile Field Master List shown in FIG. 102. A user navigates to this feature by clicking on the Add Group button on the Profile Field Master List screen, clicking on the name of an existing group on the Profile Field Master List screen, or clicking on the name of a group on the Select Profile Master Field screen.

FIG. 104 is an example embodiment of a Field Configuration screen 1780. Screen 1780 allows a user to create, modify, or delete the data fields within the Profile Field Master List shown in FIG. 102. A user navigates to this feature by clicking on the Add Field button on the Profile Field Master List screen, clicking on the name of an existing data field on the Profile Field Master List screen, or clicking on the name of a field on the Select Profile Master Field screen.

FIG. 105 is an example embodiment of a Profile Configuration screen 1790. Screen 1790 allows an Administrator to add and remove rows and fields to the custom section of the Deal Profile tab for a given Deal Type at the level at which Deals are owned and shared in a business. The Administrator may also modify page layout by moving rows vertically and moving fields horizontally.

Figure 106:
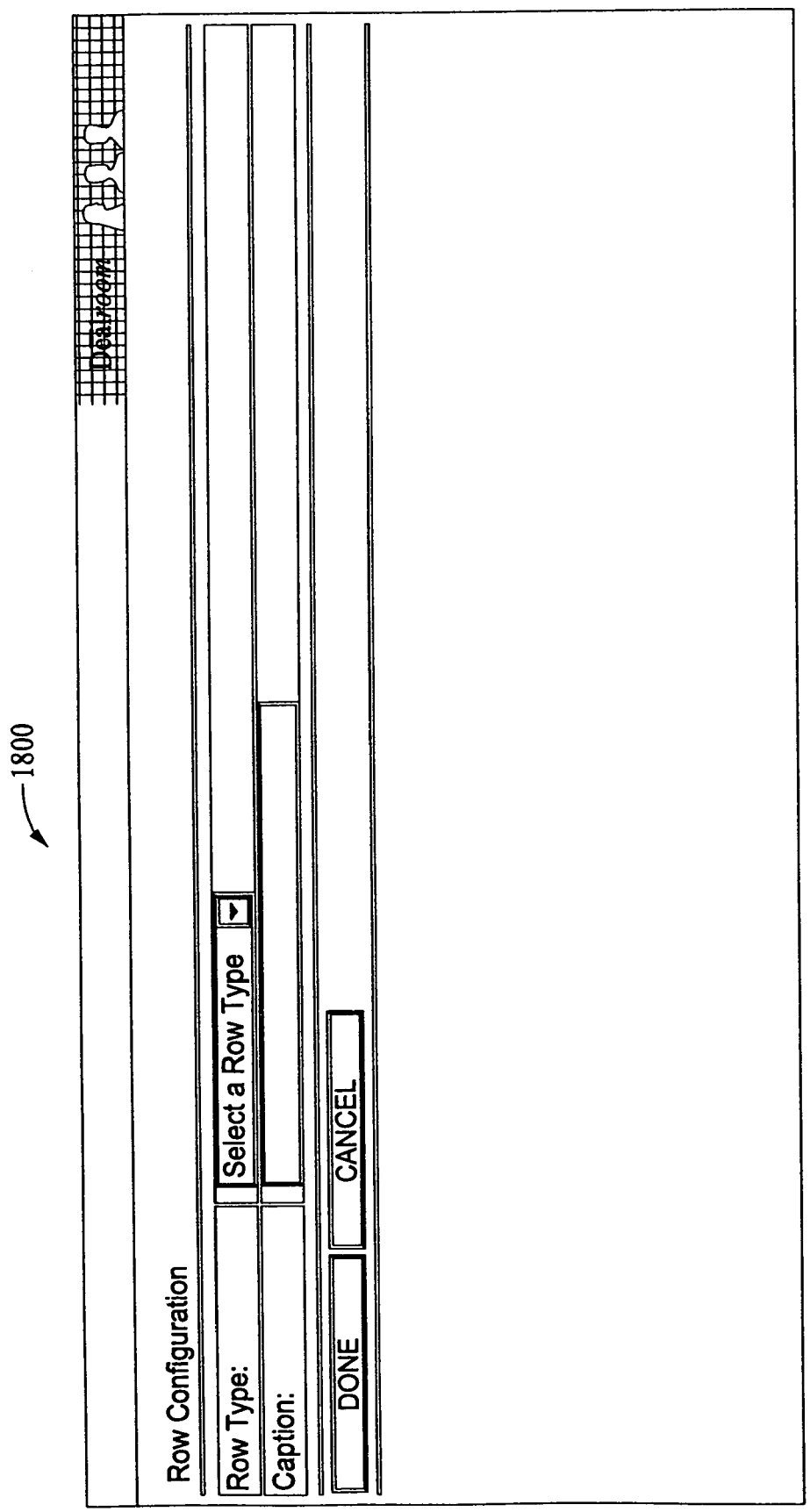
FIG. 106 is an example embodiment of a row configuration screen.

FIG. 106 is an example embodiment of a Row Configuration screen 1800. Screen 1800 allows a user on Profile Configuration screen 1790 (shown in FIG. 105) to select the attributes of a new or existing row. A user navigates to this feature by clicking on an Add Row button on the Profile Configuration screen, or clicking on the label of a Section Header row on the Profile Configuration screen.

FIG. 107 is an example embodiment of a Field Configuration screen 1810. Screen 1810 allows a user on Profile Configuration screen 1790 (shown in FIG. 105) to select the attributes of a new or existing field. A user navigates to this feature by clicking on an Add Field button on the Profile Configuration screen, or clicking on the name of a field on the Profile Configuration screen.

FIG. 108 is an example embodiment of a Data Source Selector screen 1820. Screen 1820 allows a user defining a custom Profile field to select a Data Source for a Drop-down, List Box, Radio Button group, or Checkbox. The user will have the ability to select an existing data set, or to create a new one as needed. A user navigates to this feature by clicking on the Select Data Source button on the custom Profile Field Configuration screen 1810 (shown in FIG. 107).

Figure 109:
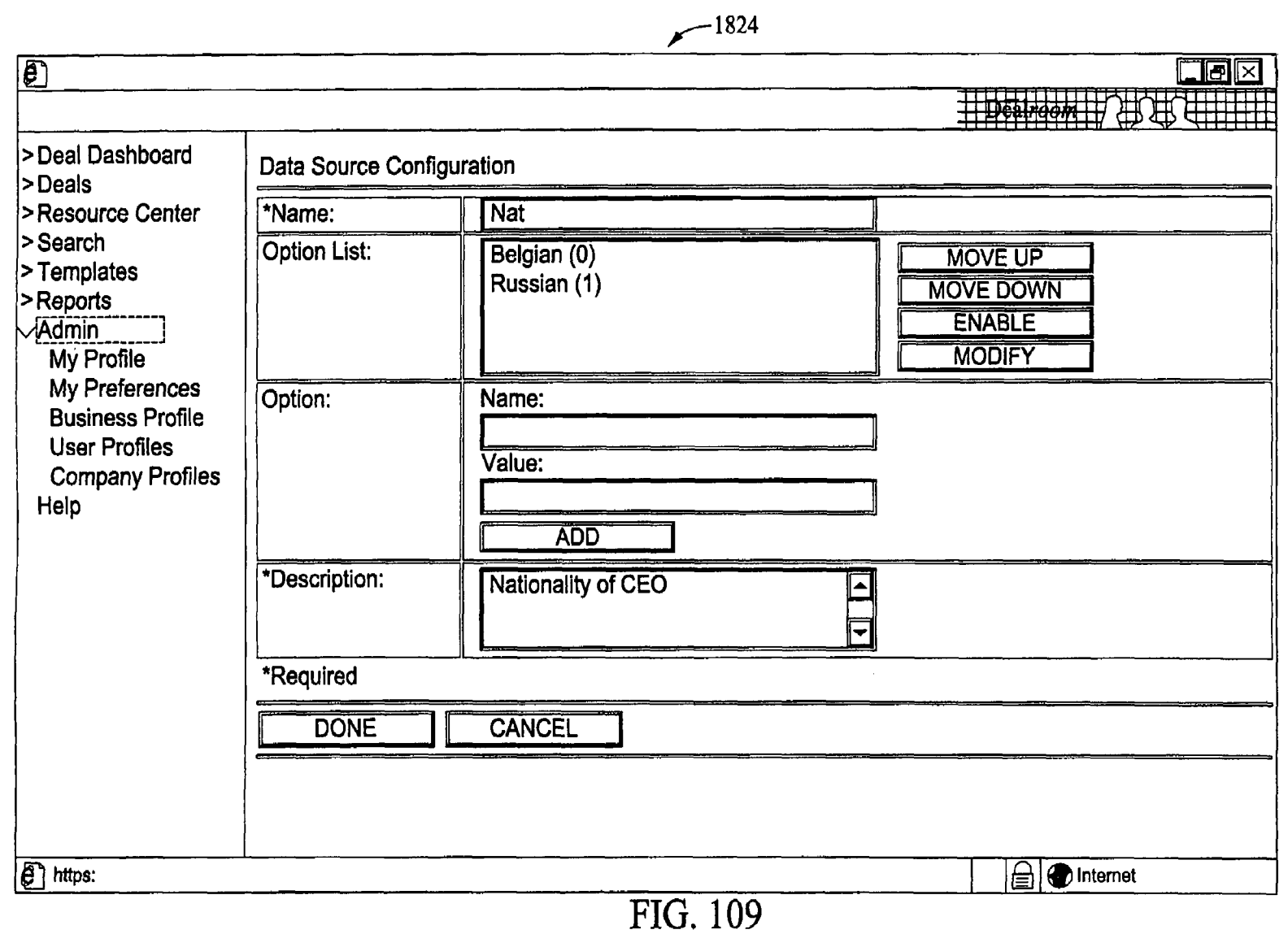

FIG. 109 is an example embodiment of an Option List screen 1824. Screen 1824 allows a user to select a required option relating to a specific data field. Screen 1824 includes a Name data field, an Option List data box, and Option Name data field, an Option Value data field, and a Description data box.

FIG. 110 is an example embodiment of a Master Field Selector screen 1830. Screen 1830 allows a user to view all available Profile Master Fields, Groups, and descriptions that are defined for a business. A user may select an available master field from this page to associate with a custom profile field. Screen 1830 provides a greater level of detail about a Master Field than can be obtained through the Master Field dropdown list on Profile Field Configuration screen 1810 (shown in FIG. 107) or on the Report Field Configuration screen. A user navigates to this feature by clicking on the Master Field button on the Profile Field Configuration screen.

Figure 111:
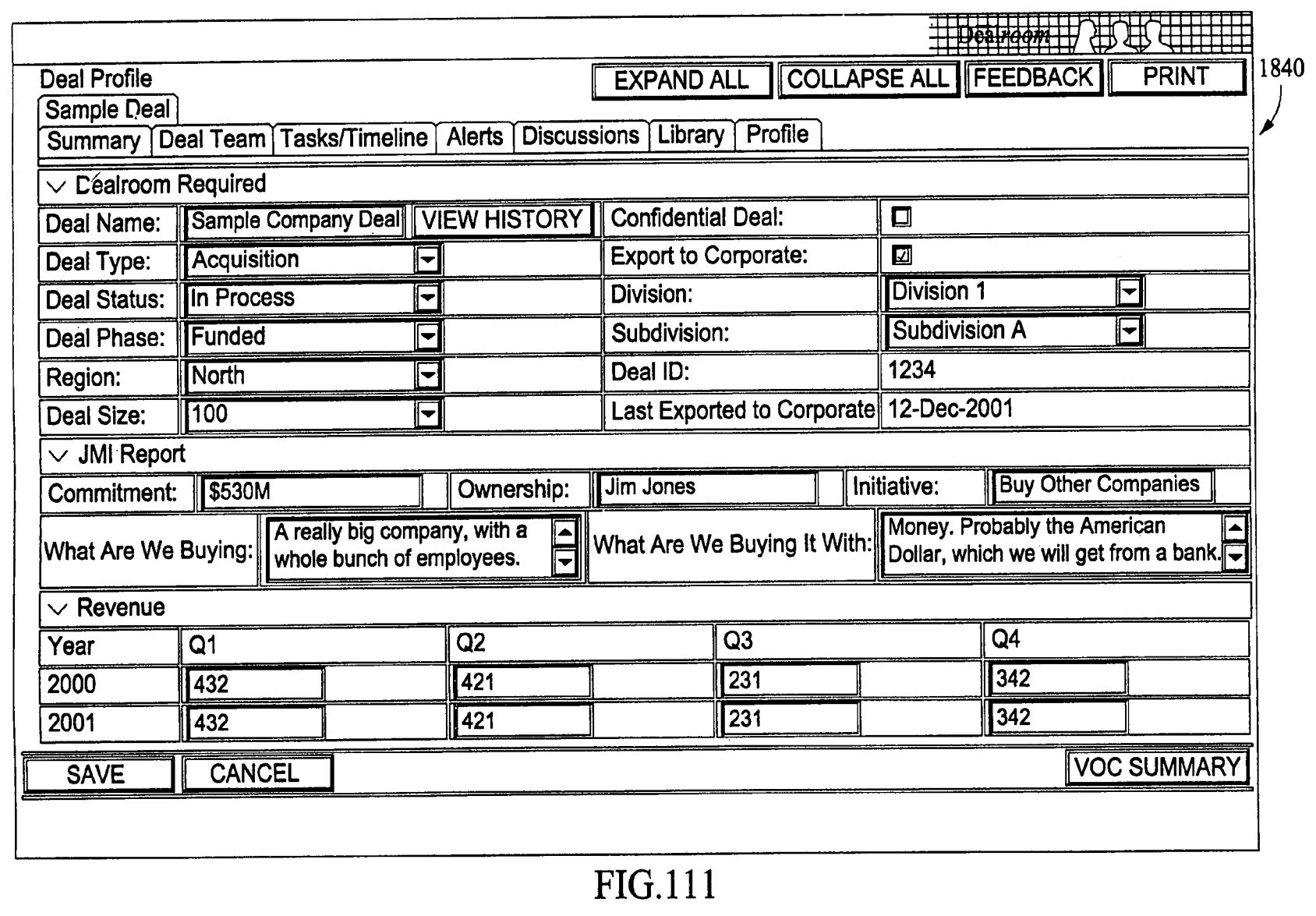

FIG. 111 is an example embodiment of a Configured Deal Profile screen 1840. Deal Profile is a tab available in the Deal workspace that provides read-only and modify access to deal profile data. The layout of rows and columns is determined by the layout defined for the business's Deal Type on Profile Layout Configuration screen 1790 (shown in FIG. 105). The display characteristics for each field are determined by the settings defined on Profile Field Configuration screen 1780 (shown in FIG. 104).

Figure 112:
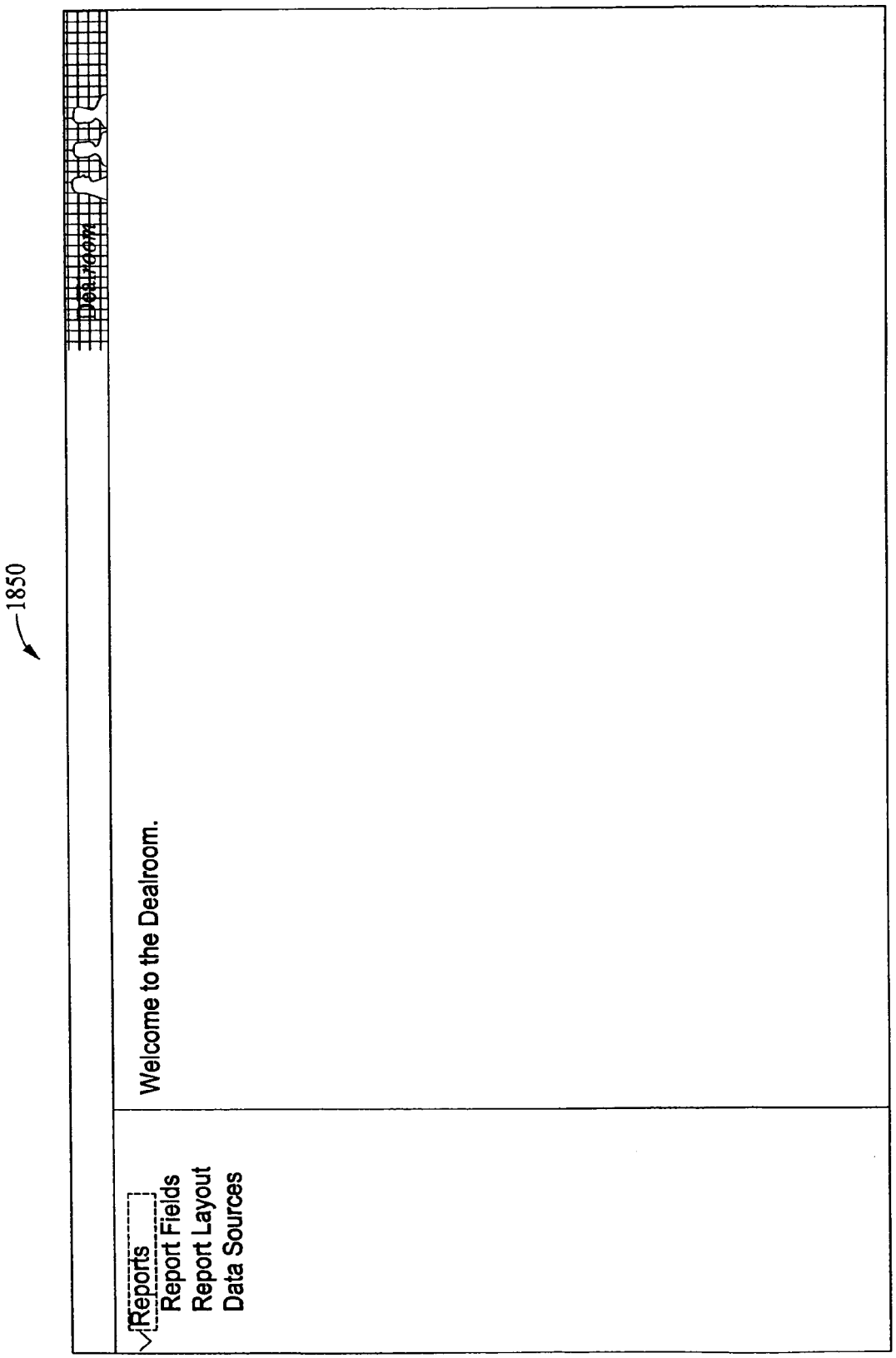
FIG. 112 is an example embodiment of a super-user start menu screen.

FIG. 112 is an example embodiment of a Super User Start Menu screen 1850. The Start Menu for the Super-user differs from the Start Menu for normal system users. Because the Super-User is not part of a business and therefore not involved with any deals, the normal Deal-oriented Start Menu items are not displayed for the Super-User. Start Menu 1850 is limited to the options for defining a Report fields, creating Report layouts, and defining custom Data Sources for the Reports (discussed below).

Figure 113:
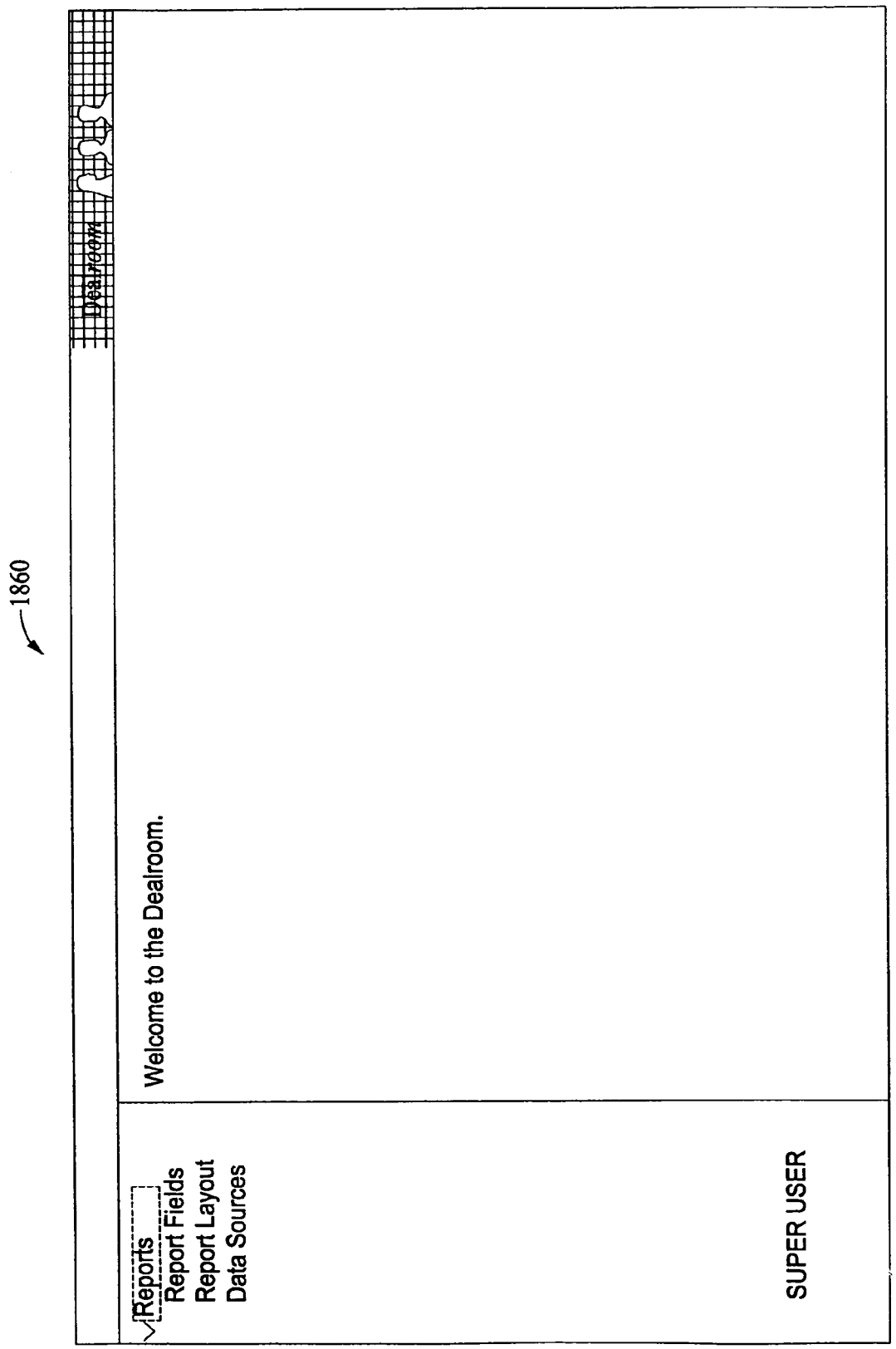
FIG. 113 is an example embodiment of a welcome screen that is displayed for super-users when they log into the system shown in FIG. 2.

FIG. 113 is an example embodiment of a Welcome screen 1860 that is displayed for Super-Users when they log into system 100 (shown in FIG. 2). It replaces the Deal Dashboard screen 600 (shown in FIG. 26) that normally displays for Business users. In the example embodiment, screen 1860 only contains a welcome message, as all Super-User functionality is contained in the Start Menu shown in FIG. 112.

FIGS. 114A and 114B show another embodiment of a Business Profile screen 1870. A Business Profile screen is also shown in FIGS. 5A and 5B. Screen 1870, however, displays certain additional information for the user. Screen 1870 also displays a Due Diligence Module section, a Reports section, and a Data Management section. In another embodiment of screen 1870, screen 1870 also displays a Blackline section that includes a Blackline checkbox.

In operation, a Superadmin selects Data Management icon on Business Profile screen 1870 (shown in FIGS. 114A and 114B). For a cross-business level, a Report Admin user has been set-up to create mandatory cross-business data fields (shown in FIGS. 112 and 113). To create a custom profile section, the Superadmin user or the Report Admin user clicks on a Profile Field button displayed on screen 1870 to create the Profile Field Groups shown in FIG. 103. Within each Profile Field Group, the Superadmin and the Report Admin can create a Profile Field as shown in FIG. 104. The result is a Profile Field Master List as shown in FIG. 102. For data fields that require multiple options, the Superadmin or the Report Admin click on the Data Sources button shown on Business Profile screen 1870. After clicking on the Data Sources button, the Data Source List will be displayed enabling the Superadmin or the Report Admin to create options for the required data fields as shown in FIG. 108. The Superadmin and Report Admin may also create a lay-out of the Deal Profile screen (shown in FIG. 44) that displays the selected data fields. The Superadmin and the Report Admin can add rows to the lay-out page as shown in FIG. 106, and then fill the rows with data fields as shown in FIG. 107. The Superadmin and the Report Admin may also select the data fields to be displayed in the rows by selecting the data fields from the Master Field Selector shown in FIG. 110. The Superadmin and the Report Admin may then finalize the lay-out by selecting the Done button shown in FIG. 105. The final result is a custom Deal Profile screen as shown in FIG. 111.

Reports Function

System 100 further includes a Reports function that enables a user to generate Deal Pipeline, Milestone Progress Summary, Custom Deal List, Profile Export, and Origination Export reports. In the example embodiment, users will have the ability to define report criteria from a single page, and to save that criteria as a default for future reports. A report is generated by expanding on a Report section included on the Deal Dashboard (shown in FIG. 121). Upon clicking the report section on the Deal Dashboard, the user is prompted to select a report type from a generate report screen. Upon selecting the report type, the screen refreshes and a selection criteria appears for the selected report type.

FIG. 115 is an example embodiment of a Generate Report screen 1880 for a Deal Pipeline report. Generate Report screen 1880 enables a user to select filter/search criteria and select the type of report they would like to create. Clicking on a Generate button creates the report with the criteria that was selected. Screen 1880 includes a Report Type pull-down list, a Division pull-down list, a Subdivision pull-down list, a Region pull-down list, a Deal Type pull-down list, a Deal Status pull-down list, a Deal Phase pull-down list, an Exported to Corporate pull-down list, a User Role pull-down list, a User data filed, a Deal Revenue section, a Deal Created By section, and a Group Results By pull-down list. The system also includes other embodiments of Generate Report screen 1880 for each type of report generated by the system. These other embodiments of screen 1880 may include a variety of filter/search criteria. The type of report that may be generated from screen 1880 includes a Deal Pipeline, a Milestone Progress Summary, a Custom Deal List, a Profile Export, and an Origination Export report.

FIG. 116 is an example embodiment of a Deal Pipeline Report screen 1890. Deal Pipeline Report screen 1890 displays Deals by phases for which a user is permissioned. Screen 1890 also illustrates an average number of days and a total revenue of all the Deals in a given phase as well as collectively across phases. Deal Pipeline Report screen 1890 may be accessed from the Generate Report screen 1880 (shown in FIG. 115) or directly from the Main Menu. When accessed from Generate Report screen 1880, Deal Pipeline Report screen 1890 will display the records that match the selected filter criteria. When accessed directly from the Main Menu, Deal Pipeline Report screen 1890 will display the records that match the user's default view criteria. A user may define a default view by clicking on a Default View button on the report screen. To view the detail for any particular Deal, a user can click on a hyperlinked deal name. In the example embodiment, the Deal Pipeline report will not be available to outside users of system 100 (shown in FIG. 2).

FIG. 117 is an example embodiment of a Milestone Progress Summary Report screen 1900. Milestone Progress Summary Report screen 1900 enables a user to quickly assess the progress of a Deal against its defined Milestones. Milestone Progress Summary Report screen 1900 displays the Milestones for a given Milestone Template by Deal and by selected User Role. Milestone Progress Summary Report screen 1900 may be accessed from the Generate Report screen 1880 (shown in FIG. 115) or directly from the Main Menu. When accessed from Generate Report screen 1880, Milestone Progress Summary Report screen 1900 will display the records that match the selected filter criteria. To insure the integrity of the report, a user must select a Milestone Template to report upon. When accessed directly from the Main Menu, Milestone Progress Summary Report screen 1900 will display the records that match the user's default view criteria. A user may define a default view for the Milestone Progress Summary report by clicking on a Default View button on the report screen. To view the detail for any particular Deal, a user can click on a hyperlinked deal name.

Figure 119:
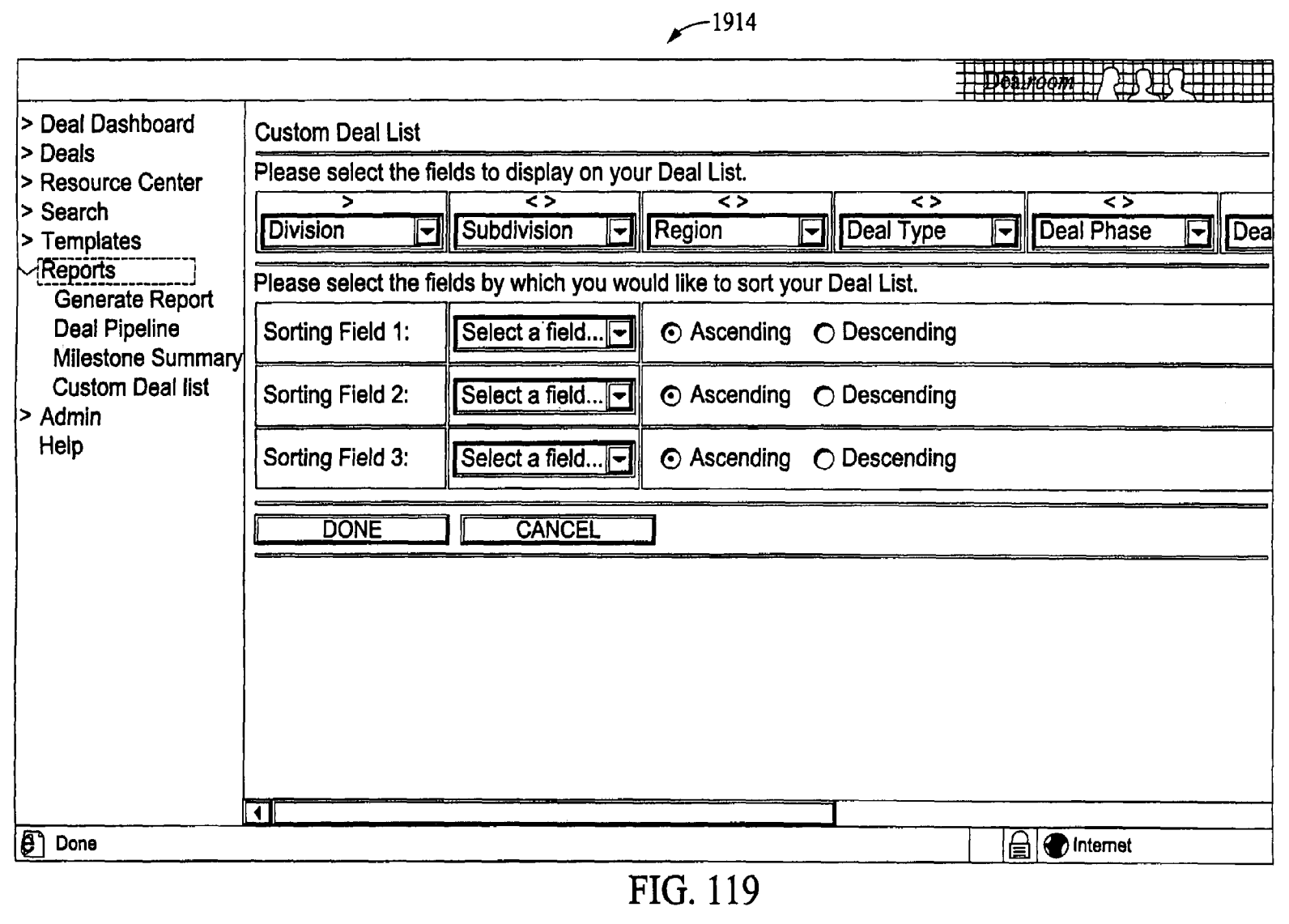

FIG. 118 is an example embodiment of a Custom Deal List screen 1910. Deal List screen 1910 displays the required profile information of deals returned from a search criteria. Users have the option to configure and customize the Deal List by clicking on a Configure Deal List button. After clicking on the Configure Deal List button, a screen 1914, shown in FIG. 119, is displayed that enables a user to customize the Custom Deal List Report by selecting the data fields to be displayed. The data fields from the Profile section may be selected and the fields may be sorted. Additionally, the Custom Deal List can be exported to an Excel™ spreadsheet by selecting an Export to Excel button on screen 1910 (Excel is a trademark of Microsoft Corporation, Redmond, Wash.).

Figure 120:
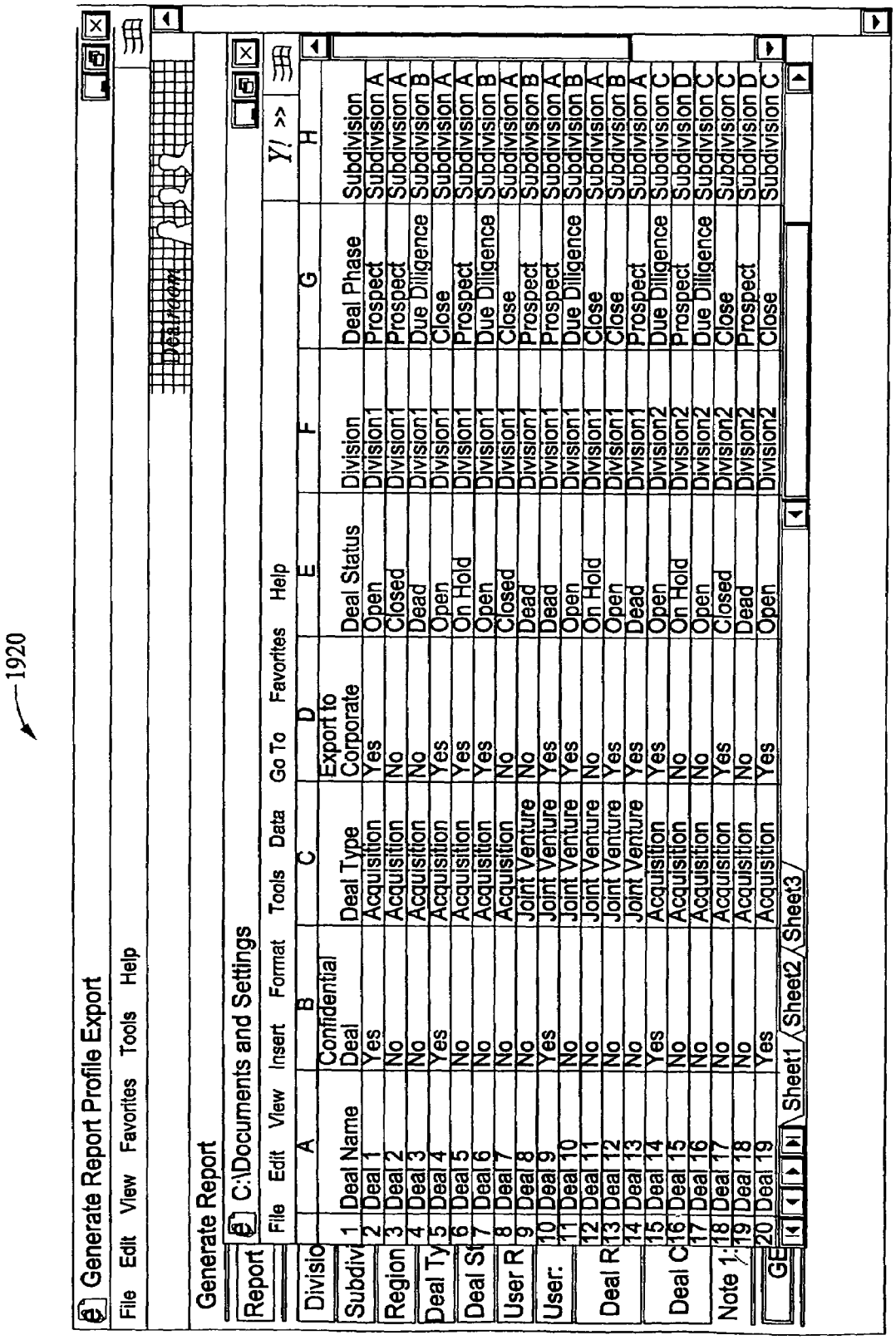
FIG. 120 is an example embodiment of a profile export screen.

FIG. 120 is an example embodiment of a Profile Export screen 1920. Profile Export screen 1920 enables a user to retrieve all data that is displayed on Deal Profile screen 1840 (shown in FIG. 111) for all deals that satisfy the criteria defined on Generate Report screen 1880 (shown in FIG. 115). In the example embodiment, the data is returned to a known and commercially available spreadsheet computer software program, for example an Excel™ spreadsheet, that displays in a popup window. (Excel is a trademark of Microsoft Corporation, Redmond, Wash.)

Origination Export report enables a user to retrieve mandatory data that is displayed in the Deal Profile screen and data from the Task Timeline screen 1630 (shown in FIG. 88) for all deals that satisfy the criteria defined on Generate Report screen 1880 (shown in FIG. 115).

In addition, system 100 includes a business administrator account for each business. In the example embodiment, system 100 is preloaded with a business's table with three businesses. A Business Profile (as shown in FIGS. 114A and 114B) will load to a particular business of the business administrator when the business administrator logs in. Each business administrator is prohibited from creating a new Business Profile, however the business administrator has the ability to set up and maintain his or her own business's structure. The business administrator can then further customize the page layouts by attaching header graphics for the business, divisions, and subdivisions. All business administrators have the ability to turn some specific features "on and off" in order to control the functionality that is available to users within the business. System 100 also enables an Administrator to define the divisions and subdivision within each business. System 100 does not limit the number of divisions or subdivisions that can be created.

Figure 121:
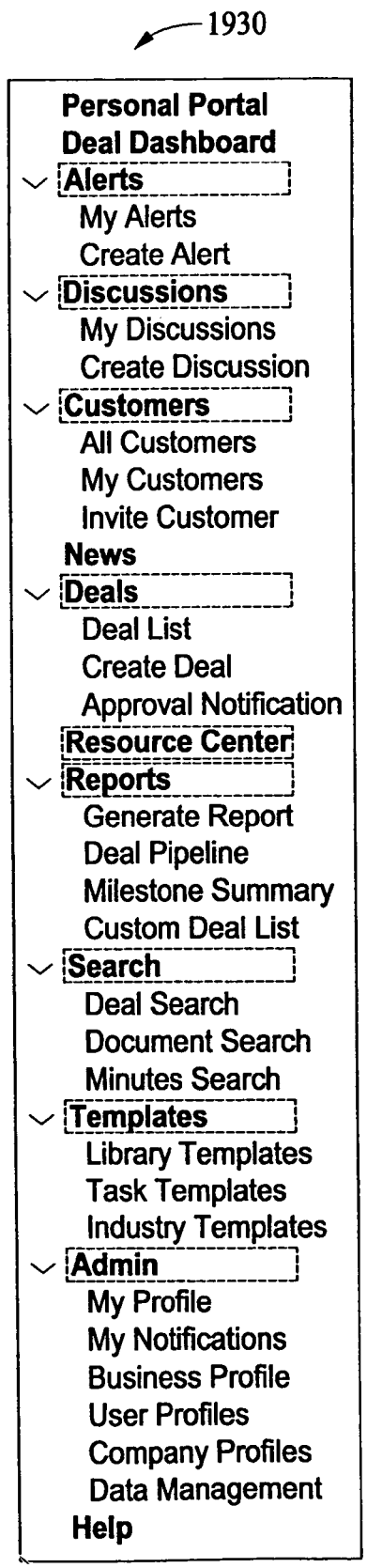
FIG. 121 is another embodiment of a deal dashboard screen.

FIG. 121 is another embodiment of a Deal Dashboard screen 1930. A Deal Dashboard screen is also shown in FIG. 26. Screen 1930, however, displays certain additional functionalities for the user. Screen 1930 displays a tree-like navigation aid for accessing all of the system components. Screen 1930 integrates with system 100 framework through a known and commercially available portal framework, namely PortalworkX™ security model, showing only the applications and functions each user is allowed to see (PortalworkX is a trademark of Radnet, Inc., Wakefield, Mass.). Screen 1930 enables a user to link to applications from the Deal Dashboard items. System 100 also provides interfaces for custom applications to display menu items.

In the example embodiment, screen 1930 includes an Alerts hyperlink, a Discussion hyperlink, a Customers hyperlink, a Deals hyperlink, a Reports hyperlink, a Search hyperlink, a Templates hyperlink, and an Admin hyperlink.

In one embodiment, objects within system 100 are modified by permissioned users through Extensible Markup Language (XML) messages. System 100 receives the XML messages, executes the proper inserts or updates within the system, and provides status back to the calling source application. In the example embodiment, the XML messages are received by system 100 which enables system 100 to perform at least one of creating a deal, modifying a deal, creating a user, modifying a user, creating an external company, and modifying an external company.

The methods and systems described above for identifying prospective customers and managing deals provide a commonality amongst transactional businesses which include pooling of resources, sharing of achieved progress and alignment of on going work to bring about cost savings and the leveraging of resources across divisions within a company while also driving a common platform for deal initiation, tracking and processing not found in known systems.

While the invention has been described in terms of various specific embodiments, those skilled in the art will recognize that the invention can be practiced with modification within the spirit and scope of the claims.

What is claimed is:

1. A method for managing a deal process using a server system coupled to a database and at least one client system, said method comprising:

identifying a prospective customer of a business entity based on prospect information already stored within the database;

creating a deal for the business entity to propose to the identified prospective customer, the proposed deal is specifically created and targeted by the business entity to the identified prospective customer and includes at least one of a loan, a lease, an equity stake, and a common equity;

creating a business profile including at least one of a web page and a portal customized for attracting the identified prospective customer to the proposed deal, wherein the at least one customized web page and portal includes a link to the proposed deal specifically created and targeted to the identified prospective customer, and wherein the at least one customized web page and portal is stored within the database;

displaying on the at least one client system for the prospective customer the at least one of the web page and portal customized for attracting the prospective customer to the proposed deal proposed by the business entity including purchasing at least one of a product and service offered by the business entity;

prompting a user associated with the business entity to create a deal and a deal library between the business entity and the prospective customer after the prospective customer has selected the proposed deal;

designating the prospective customer as a customer of the business entity, the deal created at the server representing a financial transaction between the customer and the business entity, the created deal library representing a portion of the database for storing documents created as part of the financial transaction;

prompting a user associated with the business entity to select a task and milestone template stored in the database for the created deal, each task and milestone template is associated with a specific type of deal and is programmed to recommend tasks and subtasks to be performed with corresponding milestones for completing the created deal;

assigning members to a deal team for the created deal between the business entity and the customer, the deal team members include users associated with the business entity who will perform the tasks for completing the deal;

prompting a user to schedule at least one meeting relating to a specific deal;

recording minutes from each meeting, wherein the minutes are stored in a deal library created for the specific deal such that an aggregate report of all meetings for a specific deal is generated;

notifying members of the deal team of tasks to be performed and milestones accomplished;

prompting a user associated with the business entity to attach a document to the created deal, select an approver and a delegate to approve the document, and submit the attached document for approval, wherein a list of predetermined approvers and delegates is displayed for the created deal to prompt the selection thereof; and submitting for approval documents relating to the deal.

2. A method according to claim 1 further comprising generating at least one report including at least one of a deal pipeline report, a milestone progress summary report, a custom deal list report, a profile export report, and an origination export report.

3. A method according to claim 1 wherein prompting a user to create a deal further comprises prompting a user to create at least one of a deal summary, a deal timeline, a deal menu, a deal workspace, a deal discussions area, a deal library, a deal profile, and a document approval summary.

4. A method according to claim 1 wherein prompting a user to create a deal further comprises prompting a user to create a deal profile that is reconfigurable such that a permissioned user is enabled to select data fields displayed on a deal profile for at least one of a specific deal, a group of deals, a subdivision, a division, a business, and a group of businesses.

5. A method according to claim 1 wherein prompting a user to create a deal further comprises prompting a deal team member to select another user to view and modify information relating to a deal designated as confidential.

6. A method according to claim 1 wherein prompting a user to schedule at least one meeting further comprises:

providing a user with a meeting calendar such that the user can schedule at least one of a date, a time, a location, and a chairperson for at least one meeting relating to a specific deal; and providing the user with a meeting summary such that the user can view meetings scheduled involving the user by at least one of a meeting date and a deal name.

7. A method according to claim 1 wherein prompting a user to schedule at least one meeting further comprises prompting a user to manipulate default deal data for scheduling a meeting including manipulating at least one of a meeting start time, a conference room, a chairperson, a call-in-number, and a duration of meeting.

8. A method according to claim 1 wherein prompting a user to schedule at least one meeting further comprises prompting an administrator to manage a sequence of scheduled meetings prior to finalizing a meeting schedule.

9. A method according to claim 1 wherein prompting a user to schedule at least one meeting further comprises:

prompting a user to add new meeting information to a meeting calendar, and prompting a user to modify existing meeting information in the meeting calendar, meeting information includes at least one of a type of meeting, a deal name, meeting start time, a conference room, a chairperson, a call-in-number, a duration of meeting, and documents associated with a meeting.

10. A method according to claim 1 wherein recording minutes from each meeting further comprises recording minutes from each meeting such that a user can search existing meeting minutes by at least one of a deal name, a company name, a last modified by user, a last modified date, a division, and a reviewer name.

11. A method according to claim 10 wherein searching existing meeting minutes comprises:

entering data to be searched for including at least one of a deal name, a company name, a last modified by user, a last modified date, a division, and a reviewer name;

storing the search data; and displaying search results in response to the search data wherein the search data is stored to facilitate navigation between the search data and the search results.

12. A method according to claim 1 wherein recording minutes from each meeting further comprises:

providing a user with a meeting minutes summary for all meetings for a specific deal including transaction information, deal team information, a meeting type, meeting minutes prepared by, meeting minutes reviewed by, a meeting minutes last modified date, meeting attendees, meeting objectives, issues discussed at meeting, conclusions from meeting, and tasks assigned at the meeting;

prompting a user to create minutes for a specific meeting including at least one of deal status, division, reviewer name, meeting attendees, meeting objectives, issues discussed at meeting, conclusions from meeting, and tasks assigned at the meeting; and prompting a user to modify existing minutes from a specific meeting including at least one of deal status, division, reviewer name, meeting attendees, meeting objectives, issues discussed at meeting, conclusions from meeting, and tasks assigned at the meeting.

13. A method according to claim 1 wherein recording minutes from each meeting further comprises prompting a user to add at least one of a task and a subtask to a task timeline, the task timeline includes at least one of a specific task, a specific subtask, a milestone, an owner, a customer request date, a current due date, an actual completion date, and a status of a deal.

14. A method according to claim 1 wherein said step of notifying members of a deal team further comprises the steps of:

providing a deal status to deal team members; and prompting a user for feedback.

15. A method according to claim 1 wherein submitting for approval documents relating to the deal further comprises providing a user with a document approval summary that displays an approval status of each document submitted for approval for a specific deal.

16. A method according to claim 1 wherein submitting for approval documents relating to the deal further comprises:

providing access to documents relating to a specific deal for approval that may include compound documents; and enabling a user designated to approve documents for a specific deal to view a document that may include compound documents.

17. A method according to claim 1 wherein submitting for approval documents relating to the deal further comprises:

providing access to documents relating to a specific deal for approval, the documents include a plurality of versions of at least one document; and enabling a user designated to approve documents for a specific deal to select at least two versions of a document to be compared through a comparison function that visually displays differences between the selected document versions for document approval purposes.

18. A method according to claim 1 wherein submitting for approval documents relating to the deal further comprises:
enabling a user to attach a document to a specific deal such that the attached document is submitted for approval;
enabling the user to select an approver to review a document relating to a specific deal;
enabling the document approver to designate a delegate to review specific documents relating to a specific deal; and
notifying a specific user as to a status of a document submitted for approval.

19. A method according to claim 1 further comprising providing a plurality of authority levels for users managing a deal, the authority levels include at least one of a user, a manager, an administrator, and a Superadmin.

20. A computer apparatus comprising:
a user interface;
a database for storing data including prospect information; and
a processor configured to execute computer-executable instructions for:
prompting a user to create business profiles including identifying deal team members;
identifying a prospective customer of a business entity based on the prospect information already stored within the database;
creating a deal for the business entity to propose to the identified prospective customer, the proposed deal is specifically created and targeted by the business entity to the identified prospective customer and includes at least one of a loan, a lease, an equity stake, and a common equity;
creating at least one of a web page and a portal customized for attracting the identified prospective customer to the proposed deal, wherein the at least one customized web page and portal includes a link to the proposed deal specifically created and targeted to the identified prospective customer, and wherein the at least one customized web page and portal is stored within the database;
displaying on at least one client system for the prospective customer the at least one of the web page and portal customized for attracting the prospective customer to the proposed deal proposed by the business entity including purchasing at least one of a product and service offered by the business entity;
prompting a user associated with the business entity to create a deal and a deal library between the business entity and the prospective customer after the prospective customer has selected the proposed deal;
designating the prospective customer as a customer of the business entity, the deal created at a server system representing a financial transaction between the customer and the business entity, the created deal library representing a portion of the database for storing documents created as part of the financial transaction;
prompting a user associated with the business entity to select a task and milestone template stored in the database for the created deal, each task and milestone template is associated with a specific type of deal and is programmed to recommend tasks and subtasks to be performed with corresponding milestones for completing the created deal;
assigning members to a deal team for the created deal between the business entity and the customer, the deal team members include users associated with the business entity who will perform the tasks for completing the deal;
scheduling at least one meeting relating to a specific business deal including providing a meeting calendar to the user for scheduling at least one of a date, a time, a location, and a chairperson for at least one meeting relating to a specific deal;
storing minutes from each meeting in a deal library created for the specific deal to generate an aggregate report of all meetings for a specific deal for accessing, viewing and printing a meeting minutes report for a specific deal;
notifying members of a deal team of tasks to perform and milestones accomplished;
attaching a document to a specific deal and submitting the attached document for approval;
receiving documents relating to the deal for approval by an approver; and
providing access to the deal documents for approval by the approver.

21. Apparatus according to claim 20 further comprising a processor configured to execute computer-executable instructions for creating and storing a deal, including at least one of a deal summary, a deal workgroup, a deal timeline, a deal menu, a deal workspace, a deal discussions area, a deal library, a deal profile, a deal status, and a document approval summary.

22. Apparatus according to claim 20 further comprising a processor configured to execute computer-executable instructions for creating a deal profile that is reconfigurable such that a permissioned user is enabled to select data fields displayed on a deal profile for at least one of a specific deal, a group of deals, a subdivision, a division, a business, and a group of businesses.

23. Apparatus according to claim 20 further comprising a processor configured to execute computer-executable instructions for prompting a user to:
add new meeting information to a meeting calendar, and
modify existing meeting information in said meeting calendar, meeting information includes at least one of a type of meeting, a deal name, meeting start time, a conference room, a chairperson, a call-in-number, a duration of meeting, and documents associated with said meeting.

24. Apparatus according to claim 20 further comprising a processor configured to execute computer-executable instructions for recording minutes from each meeting such that a user can search existing meeting minutes by at least one of a deal name, a company name, a last modified by user, a last modified date, a division, and a reviewer name.

25. Apparatus according to claim 20 further comprising a processor configured to execute computer-executable instructions for providing a user with a meeting minutes summary for all meetings for a specific deal that includes transaction information, deal team information, a meeting type, meeting minutes prepared by, meeting minutes reviewed by, a meeting minutes last modified date, meeting attendees, meeting objectives, issues discussed at a meeting, conclusions from meeting, and tasks assigned at a meeting.

26. Apparatus according to claim 20 further comprising a processor configured to execute computer-executable instructions for prompting a user to:
create minutes for a specific meeting including at least one of deal status, division, reviewer name, meeting attendees, meeting objectives, issues discussed at meeting, conclusions from meeting, and tasks assigned at said meeting; and modify existing minutes from a specific meeting including at least one of deal status, division, reviewer name, meeting attendees, meeting objectives, issues discussed at meeting, conclusions from meeting, and tasks assigned at said meeting.

27. Apparatus according to claim 20 further comprising a processor configured to execute computer-executable instructions for:

providing access to documents relating to a specific deal for approval, said documents include a plurality of versions of at least one document; and enabling a user designated to approve documents for a specific deal to select at least two versions of a document to be compared through a comparison function that visually displays differences between the selected document versions for document approval purposes.

* * * * *